United States Patent
Lane

(10) Patent No.: US 9,724,629 B2
(45) Date of Patent: Aug. 8, 2017

(54) BOTTLE SYSTEM AND METHOD FOR FILTERING OR TREATING A BEVERAGE

(71) Applicant: Marvin Lane, Wheeling, IL (US)

(72) Inventor: Marvin Lane, Wheeling, IL (US)

(73) Assignee: Thermos L.L.C., Schaumburg, IL (US)

(*) Notice: Subject to any disclaimer, the term of this patent is extended or adjusted under 35 U.S.C. 154(b) by 278 days.

(21) Appl. No.: 14/170,133

(22) Filed: Jan. 31, 2014

(65) Prior Publication Data

US 2014/0339177 A1  Nov. 20, 2014

Related U.S. Application Data

(60) Provisional application No. 61/825,209, filed on May 20, 2013.

(51) Int. Cl.
  *B01D 35/02* (2006.01)
  *C02F 1/00* (2006.01)
  (Continued)

(52) U.S. Cl.
  CPC .............. *B01D 35/02* (2013.01); *A45F 3/18* (2013.01); *B01D 29/11* (2013.01); *B65D 25/42* (2013.01);
  (Continued)

(58) Field of Classification Search
  CPC ........ A45F 3/16; A45F 3/18; A45F 2003/163; B01D 29/15; B01D 29/17; B01D 35/02; B01D 29/11; B01D 29/13; B01D 29/31; B01D 29/336; B01D 33/74; B01D 33/742; B01D 35/027; B01D 35/0276; B01D 2201/04; B01D 2201/0415; B01D 2201/0423; B01D 2201/0469;
  (Continued)

(56) References Cited

U.S. PATENT DOCUMENTS

| | | | |
|---|---|---|---|
| 523,344 A | 7/1894 | Hancock | |
| 1,904,091 A | 4/1933 | Shoop | |

(Continued)

FOREIGN PATENT DOCUMENTS

| | | |
|---|---|---|
| CA | 2872680 | 7/2014 |
| CN | 2633075 Y | 8/2004 |

(Continued)

OTHER PUBLICATIONS

European Application No. 14169129.5 Extended Search Report mailed Sep. 18, 2014 (5 pages).

(Continued)

*Primary Examiner* — Joseph Drodge
(74) *Attorney, Agent, or Firm* — Polsinelli PC

(57) ABSTRACT

A beverage filter or treatment bottle system has a bottle, lid, and a beverage improvement component such as a filter element. A filter element may be positioned to separate the interior space of the bottle into a filtered beverage compartment and an unfiltered beverage compartment. A tube passes through the filter into fluid communication with the filtered beverage compartment. The tube extends through the unfiltered beverage compartment to a nozzle in the lid of the bottle. A lid cover is fastenable onto the lid to enclose and close the nozzle. A filter cartridge may be provided. A UV sterilizer may be provided. An air bypass may be provided.

53 Claims, 68 Drawing Sheets

(51) Int. Cl.
*A45F 3/18* (2006.01)
*B65D 25/42* (2006.01)
*B01D 29/11* (2006.01)
*A45F 3/16* (2006.01)

(52) U.S. Cl.
CPC .............. *C02F 1/002* (2013.01); *C02F 1/003* (2013.01); *A45F 2003/163* (2013.01); *B01D 2201/04* (2013.01); *B01D 2201/301* (2013.01); *C02F 2307/02* (2013.01)

(58) Field of Classification Search
CPC ...... B01D 2201/0484; B01D 2201/301; B01D 2201/302; B65D 25/38; B65D 25/42; B65D 2501/0009; B65D 2501/0063; C02F 1/002; C02F 1/003; C02F 2307/02; B67D 7/76; B67D 7/766; B67D 2210/0002; B67D 2210/0005; B67D 2210/0001
USPC .......... 210/437, 438, 497.01, 767, 464, 472, 210/473, 474, 477, 482; 222/189.06, 222/189.1, 190; 215/200, 228, 229, 387, 215/388; 206/217
See application file for complete search history.

(56) References Cited

U.S. PATENT DOCUMENTS

| | | | |
|---|---|---|---|
| 2,153,156 A | 4/1939 | Pollnow | |
| 2,914,207 A | 11/1959 | Moore | |
| 2,948,453 A | 8/1960 | Drown | |
| 3,018,804 A * | 1/1962 | Granier | B67C 3/2614 141/286 |
| 3,438,527 A | 4/1969 | Gamblin | |
| 3,757,979 A | 9/1973 | Berghahn | |
| 3,944,101 A | 3/1976 | Landen et al. | |
| 4,399,926 A | 8/1983 | Eidels-Dubovoy | |
| D272,324 S | 1/1984 | Mumford et al. | |
| D295,355 S | 4/1988 | Leung | |
| 4,735,716 A * | 4/1988 | Petrucci | B01D 24/105 210/232 |
| 4,742,928 A | 5/1988 | Bruan | |
| 4,892,234 A | 1/1990 | Bennett | |
| 4,948,505 A * | 8/1990 | Petrucci | B01D 35/30 210/238 |
| RE33,564 E | 4/1991 | Ford | |
| 5,045,195 A * | 9/1991 | Spangrud | C02F 1/002 210/266 |
| 5,122,272 A * | 6/1992 | Iana | A45F 3/16 210/244 |
| 5,139,666 A | 8/1992 | Charbonneau et al. | |
| 5,186,830 A | 2/1993 | Rait | |
| 5,203,468 A | 4/1993 | Hsu | |
| 5,213,236 A | 5/1993 | Brown et al. | |
| 5,238,576 A | 8/1993 | Alfonso | |
| 5,244,113 A | 9/1993 | Stymiest | |
| 5,282,541 A | 2/1994 | Chen | |
| 5,301,845 A | 4/1994 | Labonte | |
| 5,310,081 A | 5/1994 | McCabe | |
| 5,337,918 A | 8/1994 | Wang | |
| 5,339,982 A | 8/1994 | Tardie | |
| 5,439,143 A | 8/1995 | Brown et al. | |
| 5,513,762 A | 5/1996 | Janani | |
| 5,545,315 A | 8/1996 | Lonneman | |
| 5,560,513 A | 10/1996 | Jarrell | |
| 5,738,786 A | 4/1998 | Winnington-Ingram | |
| D396,638 S | 8/1998 | Demarest | |
| D405,654 S | 2/1999 | Moran | |
| 5,900,143 A | 5/1999 | Dalton et al. | |
| 5,984,141 A | 11/1999 | Gibler | |
| D426,159 S | 6/2000 | Briere et al. | |
| 6,079,589 A | 6/2000 | Matsuyama et al. | |
| 6,116,458 A | 9/2000 | Dark | |
| 6,119,888 A | 9/2000 | Goto et al. | |
| 6,153,096 A * | 11/2000 | Nonren, Jr. | C02F 1/003 210/238 |
| D436,862 S | 1/2001 | Witt et al. | |
| 6,253,947 B1 | 7/2001 | Yang | |
| 6,273,306 B1 | 8/2001 | Takagawa | |
| 6,276,560 B1 | 8/2001 | Belcastro | |
| 6,279,773 B1 | 8/2001 | Kiyota | |
| D451,023 S | 11/2001 | Kitamura et al. | |
| D451,392 S | 12/2001 | Kitamura et al. | |
| D455,611 S | 4/2002 | Kitamura et al. | |
| D456,218 S | 4/2002 | Hatsumoto | |
| 6,379,544 B1 | 4/2002 | Chen | |
| 6,395,170 B1 | 5/2002 | Hughes | |
| 6,405,638 B1 | 6/2002 | Chen | |
| 6,405,885 B1 | 6/2002 | Elliott | |
| D463,280 S | 9/2002 | Brozell | |
| 6,458,303 B1 | 10/2002 | Fuehrer et al. | |
| 6,484,895 B2 | 11/2002 | Montgomery et al. | |
| 6,523,711 B1 | 2/2003 | Hughes et al. | |
| D474,376 S | 5/2003 | Kitamura et al. | |
| 6,569,329 B1 | 5/2003 | Nohren, Jr. | |
| D485,132 S | 1/2004 | Ohno et al. | |
| 6,733,669 B1 | 5/2004 | Crick | |
| D492,597 S | 7/2004 | Norris et al. | |
| 6,915,961 B2 | 7/2005 | Renz et al. | |
| D514,446 S | 2/2006 | Choi | |
| D515,921 S | 2/2006 | Marroncles | |
| D518,335 S | 4/2006 | Naft et al. | |
| D524,650 S | 7/2006 | Sitomer | |
| 7,073,678 B1 | 7/2006 | Dibdin et al. | |
| D528,862 S | 9/2006 | Li | |
| D529,339 S | 10/2006 | Carreno et al. | |
| D533,061 S | 12/2006 | Li et al. | |
| D536,975 S | 2/2007 | Smith et al. | |
| D538,110 S | 3/2007 | Kitamura et al. | |
| D539,141 S | 3/2007 | Penfold et al. | |
| D547,184 S | 7/2007 | Kim et al. | |
| D547,607 S | 7/2007 | Forsman | |
| 7,267,769 B2 | 9/2007 | Baird | |
| D553,914 S | 10/2007 | Wahl | |
| D555,000 S | 11/2007 | Bunce et al. | |
| D557,076 S | 12/2007 | Wahl | |
| D557,994 S | 12/2007 | Wahl | |
| 7,311,231 B2 | 12/2007 | Noell et al. | |
| D571,147 S | 6/2008 | Rohe | |
| D572,981 S | 7/2008 | Carreno | |
| 7,427,355 B2 | 9/2008 | Chau | |
| 7,464,637 B1 | 12/2008 | Lin | |
| D586,184 S | 2/2009 | Miller et al. | |
| D587,533 S | 3/2009 | Carreno | |
| D587,534 S | 3/2009 | Carreno | |
| D587,969 S | 3/2009 | Gilbert | |
| D588,411 S | 3/2009 | Watanabe | |
| D589,743 S | 4/2009 | Pearson | |
| D590,661 S | 4/2009 | Kitamura et al. | |
| D590,667 S | 4/2009 | Trombly | |
| D592,012 S | 5/2009 | Carreno | |
| 7,533,783 B2 | 5/2009 | Choi | |
| D593,372 S | 6/2009 | Carreno | |
| D593,811 S | 6/2009 | Carreno | |
| D596,460 S | 7/2009 | Nezu | |
| D600,071 S | 9/2009 | Carreno | |
| 7,585,409 B2 | 9/2009 | Bommi et al. | |
| D608,640 S | 1/2010 | Carreno | |
| D609,093 S | 2/2010 | Wisniewski et al. | |
| D609,964 S | 2/2010 | Lane | |
| D610,402 S | 2/2010 | Carreno | |
| D610,454 S | 2/2010 | Lohrman et al. | |
| D614,961 S | 5/2010 | Thomas et al. | |
| D615,412 S | 5/2010 | Thomas et al. | |
| 7,735,665 B2 | 6/2010 | Robinson | |
| D619,418 S | 7/2010 | Nezu et al. | |
| D622,554 S | 8/2010 | Carreno | |
| D623,473 S | 9/2010 | Chen | |
| D623,896 S | 9/2010 | Wahl et al. | |
| D624,357 S | 9/2010 | George | |
| D625,146 S | 10/2010 | George et al. | |
| D629,657 S | 12/2010 | Carreno | |

(56) References Cited

U.S. PATENT DOCUMENTS

| | | |
|---|---|---|
| D630,093 S | 1/2011 | Bardet |
| D631,347 S | 1/2011 | Rudolph et al. |
| D634,161 S | 3/2011 | Roth et al. |
| D634,628 S | 3/2011 | Goto et al. |
| D634,972 S | 3/2011 | Staton |
| D636,672 S | 4/2011 | Lohrman et al. |
| D639,660 S | 6/2011 | Carreno |
| 7,997,442 B2 | 8/2011 | Pinelli |
| D650,672 S | 12/2011 | Krallmann |
| D652,256 S | 1/2012 | Eyal |
| D653,082 S | 1/2012 | George |
| 8,097,159 B1 | 1/2012 | Peng |
| D655,131 S | 3/2012 | Nilsson |
| D655,580 S | 3/2012 | Kotani |
| D655,581 S | 3/2012 | Kotani |
| D656,360 S | 3/2012 | Miller et al. |
| 8,142,654 B2 | 3/2012 | Kohl |
| D656,787 S | 4/2012 | Phillips et al. |
| D657,994 S | 4/2012 | Wahl et al. |
| D658,072 S | 4/2012 | Davis et al. |
| D660,081 S | 5/2012 | Gilbert |
| 8,197,771 B2 | 6/2012 | Maiden |
| D663,209 S | 7/2012 | Mass et al. |
| D667,268 S | 9/2012 | Pallotto |
| D667,269 S | 9/2012 | Pallotto |
| D668,503 S | 10/2012 | Kotani |
| D669,310 S | 10/2012 | Barreto et al. |
| D675,059 S | 1/2013 | Carreno |
| D675,865 S | 2/2013 | Wahl |
| D675,873 S | 2/2013 | Miller et al. |
| D676,278 S | 2/2013 | Wong |
| D676,708 S | 2/2013 | Lane |
| 8,376,182 B2 | 2/2013 | Lepage |
| D678,729 S | 3/2013 | Peeters et al. |
| D686,871 S | 7/2013 | Lane |
| D690,557 S | 10/2013 | Carreno |
| D690,558 S | 10/2013 | Lane |
| D692,270 S | 10/2013 | Lapsker |
| D695,069 S | 12/2013 | Lane |
| 2002/0040909 A1 | 4/2002 | Goto et al. |
| 2002/0158069 A1 | 10/2002 | Yoneoka et al. |
| 2003/0034323 A1 | 2/2003 | Smith et al. |
| 2004/0144711 A1* | 7/2004 | Cluff ................. C02F 1/002 210/244 |
| 2004/0217139 A1 | 11/2004 | Roth et al. |
| 2005/0029271 A1 | 2/2005 | McDonough |
| 2005/0051476 A1 | 3/2005 | Chen et al. |
| 2005/0092373 A1 | 5/2005 | Schafer et al. |
| 2005/0133475 A1 | 6/2005 | Goto et al. |
| 2005/0133519 A1 | 6/2005 | McDonough |
| 2005/0252844 A1* | 11/2005 | Chau ................. C02F 1/002 210/282 |
| 2005/0279768 A1 | 12/2005 | Chatrath |
| 2006/0043052 A1 | 3/2006 | Lin |
| 2006/0226160 A1 | 10/2006 | Elsaden et al. |
| 2007/0108214 A1 | 5/2007 | Maher |
| 2011/0049169 A1 | 3/2011 | Rosnak et al. |
| 2011/0056386 A1 | 3/2011 | Taketani |
| 2011/0170807 A1 | 7/2011 | Khubani |
| 2011/0233119 A1 | 9/2011 | Nelson |
| 2011/0284479 A1* | 11/2011 | O'Brien ............... C02F 1/002 210/764 |
| 2011/0309078 A1 | 12/2011 | Rathbone et al. |
| 2012/0055862 A1 | 3/2012 | Parekh et al. |
| 2012/0132573 A1* | 5/2012 | Lautzenheiser ......... C02F 1/008 210/85 |
| 2013/0056467 A1 | 3/2013 | Shepard et al. |
| 2013/0140309 A1 | 6/2013 | George |
| 2013/0319915 A1* | 12/2013 | Gellibolian ............. C02F 1/002 210/87 |
| 2016/0031721 A1* | 2/2016 | Kellam .................. C02F 1/003 210/244 |

FOREIGN PATENT DOCUMENTS

| | | |
|---|---|---|
| CN | 201982547 U | 9/2011 |
| CN | 102556483 A | 7/2012 |
| CN | 200739535 U | 2/2013 |
| CN | 202739535 U | 2/2013 |
| DE | 11 472 C | 11/1880 |
| DE | 41 17 220 C1 | 5/1992 |
| DE | 298 20 689 U1 | 2/1999 |
| DE | 201 18 188 U1 | 2/2002 |
| DE | 102006060143 B3 | 7/2008 |
| EP | 321064 B1 | 12/1993 |
| EP | 2423167 A1 | 2/2012 |
| EP | 2805921 A1 | 11/2014 |
| JP | S57-36139 U | 2/1982 |
| JP | S62-123294 U1 | 8/1987 |
| JP | 2000128218 A | 5/2000 |
| JP | 2003205958 A | 7/2003 |
| JP | 2004345742 A | 12/2004 |
| JP | 2007320618 A | 12/2007 |
| JP | 2011-050607 A | 3/2011 |
| JP | 2012111498 A | 6/2012 |
| WO | 9624533 A1 | 8/1996 |
| WO | 01/09040 A1 | 2/2001 |
| WO | 2009-073994 A1 | 1/2009 |
| WO | 2010/025521 A1 | 3/2010 |
| WO | 2011030830 A1 | 3/2011 |
| WO | 2014/189958 A2 | 11/2014 |

OTHER PUBLICATIONS

Author unknown; Contigo-Autospout addison Water Bottle—24 oz . print out of web page at http://www.gocontigo.com/autospout-addison-water-bottle.html; printed Jun. 20, 2012; 2 pages.

Author unknown; Zojirushi product—Stainless Steel Vacuum Bottle Model No. ST-KA12 print out of web page at http://www.zojirushi.com/products/stka; printed Jul. 26, 2011; one page.

Thermos catalog of Kids Lunch Kits and Food Storage; 2007; page showing Thermos FUNtainer bottle and lid, item 24227BA 006 and four photographs showing the FUNtainer lid.

PCT/US2014/038826 International Search Report and Written Opinion mailed Dec. 17, 2014 (16 pages).

Whitehead; "Pure Water Technology"; Copyright 2010; retrieved on Nov. 13, 2014; Retrieved from the internet: <URL: http//www.purewatertechnology.co.uk/innovation.html>.

Australian patent application 2014202683 Examination Report mailed Nov. 17, 2015, (4 pages).

Canadian patent application No. 2,851,875 Office Action mailed Jun. 5, 2015, (3 pages).

Chinese patent application No. 201410214008.8 Office Action mailed Jul. 3, 2015, (22 pages).

Japanese patent application No. JP 2014-103475 Reason for Refusal dated Oct. 25, 2016 (8 pages) with machine translation.

Mexican patent application No. MX/a/2014/006080 Official Action dated Aug. 2, 2016 (3 pages) translation.

Canadian patent application No. 2,851,875 Office Action dated Oct. 26, 2016 (4 pages).

Singapore patent application No. 10201402468U Written Opinion dated Oct. 17, 2016 (8 pages).

* cited by examiner

BOTTLE SYSTEM AND METHOD FOR FILTERING OR TREATING A BEVERAGE

CROSS REFERENCE TO RELATED APPLICATION

This application claims the benefit of U.S. Provisional Patent Application Ser. No. 61/825,209, filed May 20, 2013, which is incorporated herein by reference.

FIELD OF THE INVENTION

The present invention relates generally to a beverage bottle system for filtering or treating a beverage, and more particularly, to a beverage bottle system for filtering or treating a beverage that includes a filter or treatment element mounted in the bottle.

BACKGROUND OF THE INVENTION

People often seek to stay hydrated while exercising, commuting, working, hiking, traveling, relaxing, or at other times. To facilitate this process, people may carry around a water bottle.

For example, people may purchase disposable water bottles. Some water sold in disposable bottles is spring water, but it also may be tap water that has been filtered, possibly, for improved shelf life and taste. After consuming the water from the disposable bottle, people often discard the bottle. Accordingly, the next time they wish to consume water, they may purchase another disposable water bottle. Purchasing water in disposable bottles can become expensive for the consumer. Also, commercial water-bottling typically requires expenditures for equipment and the expenditure of energy and other resources to bottle the water, transport the bottles to a retail store, and recycle the often single-use bottles. In addition, when not recycled, single-use bottles contribute to landfill waste. Clearly, there are a number of disadvantages associated with single-use disposable water bottles.

To overcome some of the disadvantages of single-use water bottles, many people have begun utilizing reusable water bottles. However, when the reusable water bottles are filled with ordinary tap water, the disadvantages of ordinary tap water remain. For example, some people do not like the taste of tap water. Also, certain tap water contains contaminants or impurities. Some people may install complex or sizeable water filtering systems in their home or office to permit to pre-filtering the water before pouring it into a reusable bottle. However, if the user does not have access to such a complex or sizeable system, the user may not have access to pre-filtered water.

To facilitate the filtering process, some reusable bottles have been adapted to include a water filter. A common type of water filter includes a filter element positioned at the inlet of the drinking tube such that as the user draws water into the drinking tube, the water is drawn through the filter and into the tube for drinking. Such known water bottle filters may require that the user exert sufficient sucking force to draw the water through the filter. The user may tire this action and possibly drink less water. Also, because the water is not filtered until the user starts drawing the water out, the filtration process may slow the rate at which the water exits the bottle possibly such that the water flow is not continuous, which may frustrate the user.

There is a need for a unitary system and methods for treating and consuming a beverage that does not require the user to draw the water through the filter while drinking. At least certain embodiments of the present invention satisfy this need.

SUMMARY OF THE INVENTION

Certain embodiments of the present invention include a beverage filtering or beverage treatment system having at least a bottle body, a lid, a beverage filtering or treatment or conditioning or improvement component, and a passageway component.

A bottle body may be configured to contain a liquid substance, such as a beverage, one example of which is water. A bottle body may be sized and shaped to be portable such that a user can easily carry it around for convenient personal access. Certain embodiments of a bottle body include a bottom body wall and a side body wall. Generally, the bottom body wall and the side body wall define an interior space, which may be further subdivided into compartments. The lower end of the side body wall may be connected to the bottom body wall to form a lower body intersection. The upper end of the side body wall may terminate to form an upper body edge defining a body mouth.

A lid may be configured to meet with the bottle body and possibly to cover all or a portion of the body mouth to minimize spilling of the beverage from the bottle body. The lid may be removable to provide access to the interior space, for example, to pour a beverage into the interior space. The lid may include a drinking opening, which may include one or more of an aperture, nozzle, tube or straw, configured to permit the user to consume the beverage while the lid is removably attached to the bottle body. The drinking opening may be defined by a drinking edge.

In certain embodiments, a lid may include a lower lid and a lid cover. A lid cover may be mounted on the lower lid for optionally covering the drinking opening when the user is not drinking from the bottle. The lid cover may have a latch to hold the lid cover in a closed position. In certain embodiments, the lid has a button release configured to release the lid cover from the closed position.

A beverage improvement component may be configured to filter or treat or condition a beverage while it is stored in the bottle body. A beverage improvement component may be positioned within the bottle body and may separate the interior space into two or more beverage compartments, for example, a first beverage compartment and a second beverage compartment. A first beverage compartment may be configured to store untreated beverage and, in such embodiments, is called an "untreated beverage compartment". A second beverage compartment may be configured to store treated beverages and, in such embodiments, is called a "treated beverage compartment". In certain embodiments, the beverage improvement component is positioned such that the untreated beverage compartment is above the treated beverage compartment when the bottle body is in an upright position. In such embodiments, gravity draws the beverage through the beverage improvement component and into the treated beverage compartment.

Examples of a beverage improvement component include a filter, purifier, flavoring element, or liquid conditioning element. A filter may be configured to remove certain contaminants such as dirt, organic materials, chlorine, iron and other minerals, and bacteria, protozoa, and other microbes from the beverage. A purifier may be configured to remove certain contaminants such as such as dirt, organic materials, chlorine, iron and other minerals, and bacteria, protozoa, viruses, and other microbes. A flavoring element may be configured to add flavor to the beverage, e.g., add lemon flavor or cucumber flavor to water. A liquid conditioning element may be configured to add or remove vitamins, sweeteners, coloring agents, particles, and/or other substances to or from the beverage. For example, the liquid conditioning element may treat the beverage so that it sparkles such as by including glitter or other materials, so that it glows in the dark, or so that it releases vapor with the result that the user appears to release steam from their mouth when they drink the treated liquid. Other conditioning of the beverage may be provided as well. Certain beverage improvement component embodiments may be configured for use only with water, only with beverages other than water, only with beverages configured to be consumed, only with non-consumable liquids, or with another group of liquids.

The beverage improvement component (e.g., filter) may be easily replaced by a user to extend the life of the beverage improvement or treatment system.

The beverage treatment system also may include a passageway component. Certain embodiments of a passageway component include a transfer tube and, possibly, a vent tube.

A transfer tube is configured to permit transfer of the treated beverage from the treated beverage compartment to the drinking opening. More specifically, a transfer tube may define a beverage flow channel configured to provide fluid communication between the treated beverage compartment and the drinking opening in the lid. The transfer tube may be configured to prevent or minimize the untreated beverage from entering the beverage flow channel. A first end of the transfer tube may be affixed to a filter holder disposed in the bottle body and a second end of a transfer tube may be disposed in a sleeve of the lid in fluid communication with the drinking opening when the lid is fastened onto the bottle body. In certain embodiments, tipping the bottle up into a drinking position causes the treated beverage to flow from the treated beverage compartment to a nozzle, tube, straw or other drinking opening. In certain embodiments, the transfer tube may extend generally through the center of the interior space to a generally central opening in a ring-shaped beverage filter. In other embodiments, the transfer tube may be positioned in an off-center position within the interior space.

A vent tube may define a vent channel configured to permit air to flow to the treated beverage compartment as the user is drinking a beverage. Such a vent tube may assist with releasing pressure from the treated beverage compartment.

Certain embodiments of the system have a bottle body formed from at least two discrete components, a first bottle body component and a second bottle body component. The first bottle body component may be sized and shaped to form an untreated beverage compartment, or portion thereof, and the second bottle body component may be sized and shaped to form a treated beverage compartment, or portion thereof. The bottle body components may be configured to be removably connectable relative to each other. In other embodiments, the system has a single bottle body defining an interior space, which may still be divided into compartments. In such embodiments, the treated beverage compartment is unitarily formed with the untreated beverage compartment. The bottle body may be insulated or may be uninsulated.

The embodiments of the present invention and its attributes and advantages will be further understood and appreciated with reference to the detailed description below of certain contemplated embodiments, taken in conjunction with the accompanying drawings.

DETAILED DESCRIPTION

Figure 1:
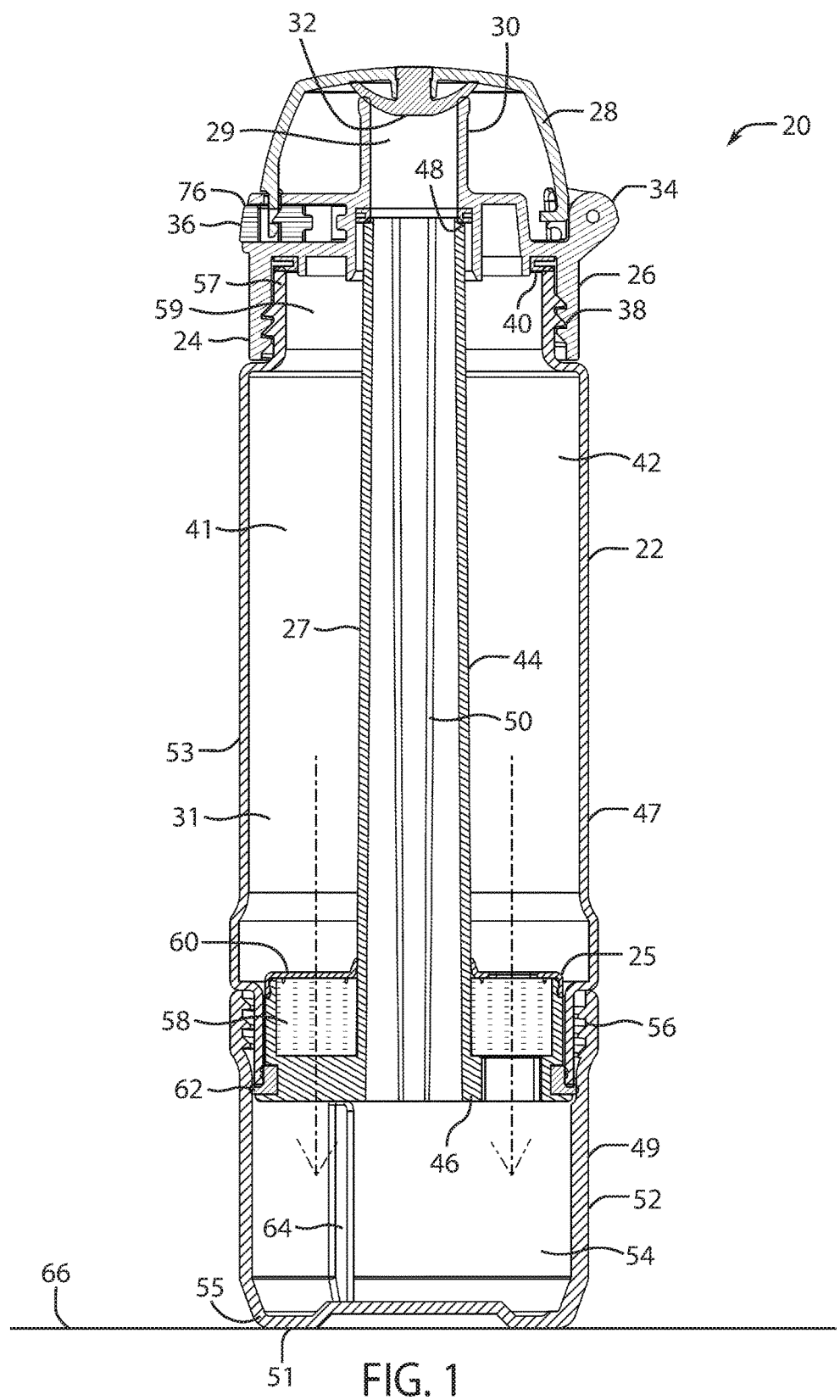
FIG. 1 is side cross-sectional view of a first embodiment of a beverage treatment system according to the present invention, wherein the cross section is along an axis of the bottle as indicated by line A-A in FIG. 2.

With respect to the drawings in general and for example as shown in FIG. 1, certain embodiments of a beverage filtering or treatment system 20, also referred to herein as a beverage bottle system, include a bottle body 22, a lid 24, a beverage filtering or treatment or conditioning or improvement component 25, and passageway component 27.

A bottle body 22 may be configured to contain a liquid substance, such as a beverage. Certain embodiments of a bottle body 22 include a bottom body wall 51 and a side body wall 53. Generally, the bottom body wall 51 and the side body wall 53 define an interior space 41. The lower end of the side body wall 53 may be connected to the bottom body wall 51 to form a lower body intersection 55. The upper end of the side body wall 53 may terminate to form an upper body edge 57 defining a body mouth 59.

The bottle body 22 may be a generally cylindrical body and elongated to provide the interior space 41 that may form two or more beverage compartments 31. The bottle body 22 may be of rigid or flexible material and may be opaque, translucent, or transparent. The bottle body 22 may be of a single color or material or formed from multiple materials in a single color or multiple colors. When formed of a flexible material, the bottle body 22 may be squeezed by a user to facilitate drinking and/or filtering of the beverage.

A lid 24 may be configured to affix to the bottle body 22 and possibly to cover all or a portion of the body mouth 59 to minimize spilling of the beverage from the bottle body 22. The lid 24 may be removable to provide access to the interior space 41, for example, to pour a beverage into the interior space 41. The lid 24 may include a drinking opening 29 configured to permit the user to consume the beverage while the lid 24 is removably attached to the bottle body 22.

In certain embodiments, a lid 24 may include a lower lid 26 and a lid cover 28. The lid cover 28 may be mounted on the lower lid 26 for optionally covering the drinking opening 29 when the user is not drinking from the bottle. The lid cover 28 may have a latch 36 to hold the lid cover 28 in a closed position. In certain embodiments, the lid 24 has a latch button 76 configured to release the lid cover 28 from the closed position.

More specifically, in certain embodiments, the drinking opening of the lower lid 26 includes a nozzle 30 from which a user may drink water or other beverages or fluids from the beverage bottle system 20. The nozzle 30 is closable by a nozzle stopper 32 in the lid cover when the lid cover 28 is in the closed position as shown. The nozzle stopper 32 is preferably made of a rubber material or other material that provides a fluid tight seal by pressing against the nozzle 30. The lid cover 28 may be attached to the lower lid 26 by a hinge 34 which permits the lid cover 28 to pivot to an open position to provide access to the nozzle 30 or pivot to a closed position to cover the nozzle 30. The latch 36 is provided to secure the lid cover 28 in the closed position when the latch 36 is engaged. The latch 36 is operable by the user—e.g., by pushing the latch button 76 or otherwise operating the latch—to release the lid cover 28 from the closed position so that the lid cover 28 may pivot to the open position. The lower lid 26 may be removably attached to the bottle body 22 by a threaded connecting portion 38 or another removable connecting structure. A lid gasket 40 is provided between the lower lid 26 and the bottle body 22, which is configured to provide a fluid-tight seal between the lower lid 26 and the bottle body 22.

The beverage filtering or treatment system 20 also may have a passageway component 27, which may include a transfer tube 44 and, possibly, a vent tube 50. A transfer tube 44 may define a beverage flow channel configured to provide fluid communication between the filtered or treated beverage compartment 54 to the drinking opening 29 in the lid. In certain embodiments, tipping the bottle up into a drinking position causes the filtered or treated beverage to flow from the treated beverage compartment 54 to the nozzle 30 or other drinking opening. In certain embodiments, the transfer tube 44 may extend through the center of the interior space 41 to a generally central opening in a beverage filter or other beverage improvement component 58. In other embodiments, the transfer tube 44 may be positioned in an off-center position within the interior space 41. The vent tube 50 may be configured to define a vent channel to permit air to flow to the filtered or treated beverage compartment 54 as the user is drinking a beverage.

Where the present specification refers to drinking of a beverage from the beverage bottle, the scope of the present invention also extends to pouring the beverage from the bottle or otherwise dispensing the beverage for consumption or other use.

More specifically, in the embodiment illustrated in FIG. 1, the transfer tube 44 is connected in fluid communication, either directly or indirectly, to the nozzle 30 or other drinking opening at one tube end, and at a second tube end, the transfer tube 44 is connected in fluid communication, either directly or indirectly, to a filter holder 46. The transfer tube 44 extends approximately to the body mouth of the bottle body so that the upper end of the transfer tube may be connected in fluid communication with the drinking opening in the lid. The transfer tube upper end may extend to the body mouth or extend beyond the body mouth or may be short of the body mouth, so long as the fluid communication with the drinking opening can be established. A gasket 48 may be disposed between the second end of the transfer tube 44 and the nozzle 30. The transfer tube 44 may be at least partially hollow so as to form a fluid flow passageway along its length and, in this embodiment, includes the vent tube 50 positioned within the transfer tube 44.

Certain embodiments of the system 20 have a bottle body 22 formed from at least two discrete components, a first bottle body component 47 and a second bottle body component 49. The first bottle body component 47 may be sized and shaped to form an unfiltered or untreated beverage compartment 42, and the second bottle body component may be sized and shaped to form a treated beverage compartment 54. The bottle body components 47 and 49 may be configured to be removably connectable relative to each other. In other embodiments, the system 20 has a single bottle body defining an interior space, which may still be divided into compartments. In such embodiments, the treated beverage compartment is unitarily formed with the untreated beverage compartment.

In certain embodiments of the present invention, the second body component 49 is configured as a base 52 formed from the bottom body wall 51 and a portion of the side body wall 53. The base 52 has a generally hollow interior which defines the treated beverage compartment 54, or, more specifically, in embodiments in which the treatment is filtration, a filtered beverage compartment 54. The base 52 is configured to retain a beverage and may be connected to the body 22 by a threaded connecting portion 56 or other removable connection configuration.

The first bottle body component 47 may be configured as an intermediate element formed from a portion of the side body wall 53. The intermediate element 47 may have a generally hollow interior and generally cylindrical shape. The intermediate element 47 may be configured to fasten to the lid 24 near one end and fasten to the base 52 near the other end.

As described above, the beverage filter or improvement component 58 may be positioned to separate the untreated beverage compartment 42 from the treated beverage compartment 54. In certain embodiments of the present invention, the beverage improvement component is a filter. When such embodiments are described in this application, these descriptions are not limiting. Certain filter-based embodiments may be used with other beverage improvement components merely by replacing the filter with another type of beverage improvement component. Other embodiments within the scope of this invention may be configured specifically for use with a non-filter beverage improvement component.

Certain embodiments of the present invention include a beverage improvement component retainer 46 configured to position the beverage improvement component relative to the bottle body 22. For example, a beverage improvement component retainer may be a filter holder 46 that may be positioned within the bottle body 22 and may define the boundary between the untreated beverage compartment, e.g., unfiltered beverage compartment 42 and the treated beverage compartment, e.g., filtered beverage compartment 54. The filter holder 46 is configured to contain a filter element 58.

A cover, such as a filter cover 60, may be fastened on top of the filter element 58, when the system is in an upright position. A filter holder gasket 62 is configured to provide a fluid tight seal between the unfiltered beverage compartment 42 and the filtered beverage compartment 54. The filter holder gasket 62 of the illustrated embodiment is configured to provide a seal against a lower rim of the bottle body 22. A support flange or support element 64 within the filtered beverage compartment 54 presses the filter holder 46 into place at the lower end of the bottle body 22 and is configured to seal the filter holder gasket 62 against the lower rim of the bottle body 22. The support flange or support element 64 may be formed as a support projection from the interior wall of the base 52 or may be a ridge configuration 260 (as illustrated in another embodiment). One or a plurality of such support flanges 64 may be provided.

The filter cover 60 may include openings that permit water or another beverage in the unfiltered beverage compartment 42 to flow through to the filter element 58 or other beverage improvement component. The filter element 58 is porous and filters the beverage which flows through the filter element 58. The lower end of the filter holder 46 includes openings through which filtered beverage can flow from the filter element 58. As such, an unfiltered beverage in the unfiltered beverage compartment 42 flows through the filter as indicated by the arrows illustrated in FIG. 1 under the force of gravity when the system is standing or being held upright as shown and becomes a filtered beverage in the filtered beverage compartment 54.

The bottle body 22 has a lower end and bottom body wall 51 shaped as a supporting surface to support the bottle body 22 on a substantially horizontal surface 66, such as a table top, counter or desk, to position the unfiltered beverage compartment 42 above the filtered beverage compartment 54, referred to herein as an upright position. The bottle body 22 may take other shapes to maintain the system 20 in an upright position, such as being shaped to fit into a holder, or being shaped to permit being held in an upright position by a user. The system 20 may be hung from a support in an upright position, affixed to a support in an upright position, positioned in a holder in an upright position, or otherwise disposed in an upright position with the unfiltered beverage compartment 42 above the filtered beverage compartment 54 so that gravity draws the beverage through the filter 58. Gravity may act alone to draw the beverage through the filter 58 or may be assisted by one or more other forces such as centrifugal force, by reducing or increasing the pressure in one or the other beverage compartment. For example, the user may whirl the system 20 about while holding the carry loop to cause more rapid filtering of the beverage, or may exert a squeezing force on the bottle body 22 to cause more rapid beverage filtering.

Figure 2:
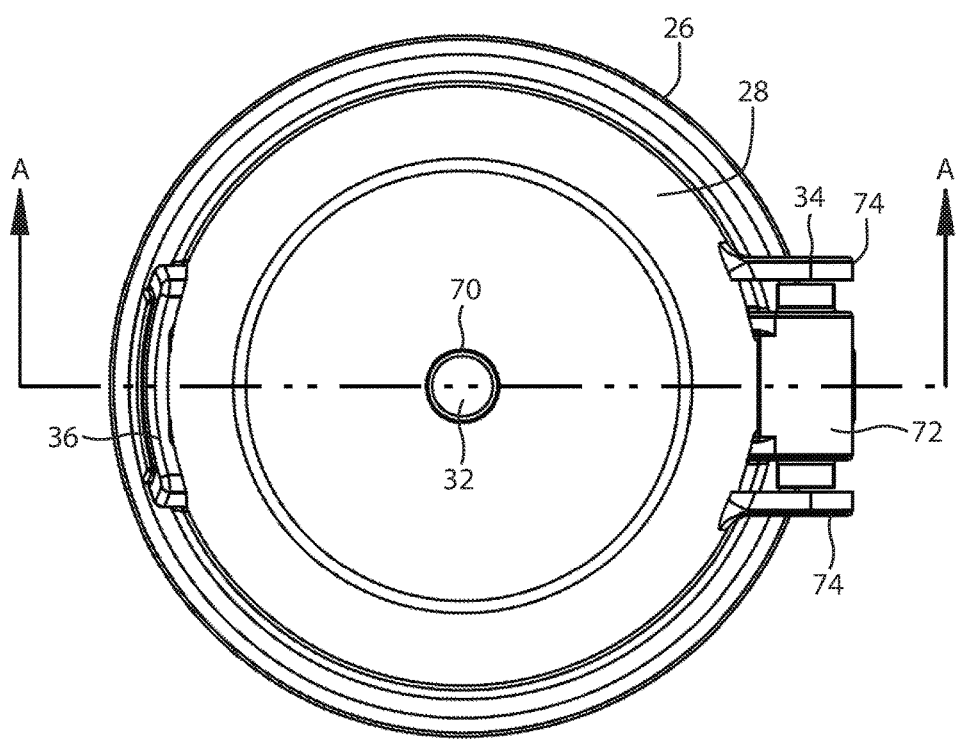
FIG. 2 is a top plan view of the beverage treatment system of FIG. 1 in which the line A-A is indicated.

Turning to FIG. 2, a lid cover 28 may have a nozzle-aligned opening 70 within which a nozzle stopper 32 may be secured. The nozzle stopper 32 in certain embodiments has a mushroom or umbrella shape with the "stem" of the mushroom secured in the opening 70 of the lid cover 28 and the "cap" portion of the mushroom shape pressed into sealing engagement with the opening of the nozzle 30 when the lid cover is in a closed position, as can be seen by comparing FIGS. 1 and 2. In the illustrated embodiment, the nozzle stopper 32 is over the top of the transfer tube 44, which extends through the center of the bottle 20.

The lid cover 28 may be connected to the lower lid 26 by a hinge 34. The hinge 34 includes a central hinge element 72 connected to the lower lid 26 that has a central hinge pin opening. At opposing ends of the central hinge element 72, side hinge elements 74 are provided that are mounted on the lid cover 28. A hinge pin (not shown in this view) extends through the central hinge pin opening, as is known.

Opposite the hinge 34 may be the latch 36. By releasing the latch 36, the user may pivot the lid cover 28 to an open position. The latch 36 of the illustrated embodiment is a push button latch, where the latch button is pressed to operate the latch to a disengaged condition. A biasing element may be included in the latch 36 to bias the latch to an engaged condition when the lid cover 28 is pressed to a closed position.

Figure 3:
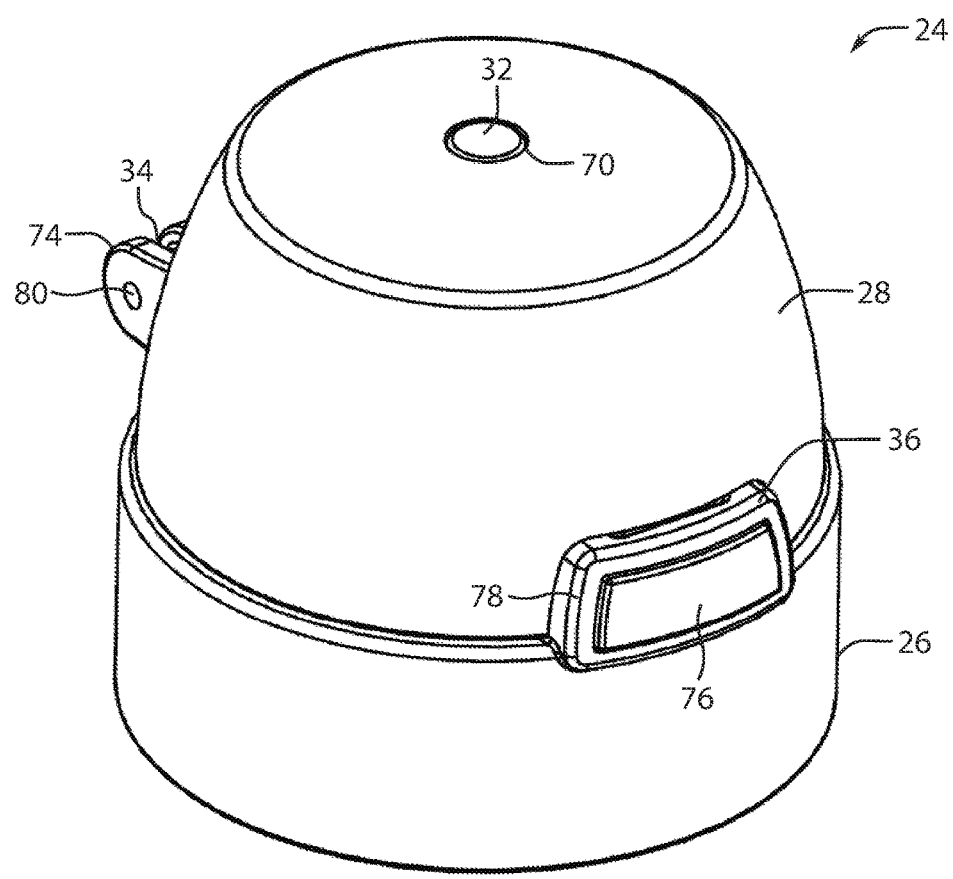
FIG. 3 is a top perspective view of a lid with a hinged lid cover of the beverage treatment system of FIG. 1, the illustrated lid having been removed from the bottle.

FIG. 3 shows the lid 24 removed from the bottle body 22. The nozzle stopper 32 is secured in the opening 70 in the lid cover 28. The lid cover 28 is in the closed position on the lower lid 26 and is held there by the latch 36. The latch 36 includes a latch button 76 that is pressed by a user to release the latch and permit the lid cover 28 to be opened. The latch button 76 is surrounded by collar 78 to prevent or inhibit inadvertent release of the latch.

The hinge 34 at the back of the lid 24 has a hinge pin 80 extending through the outer hinge elements 74 and the central hinge element 72. The lid cover 28 is smaller in overall diameter than the lower lid 26 in the illustrated embodiment, although this need not be so in all embodiments.

Figure 4:
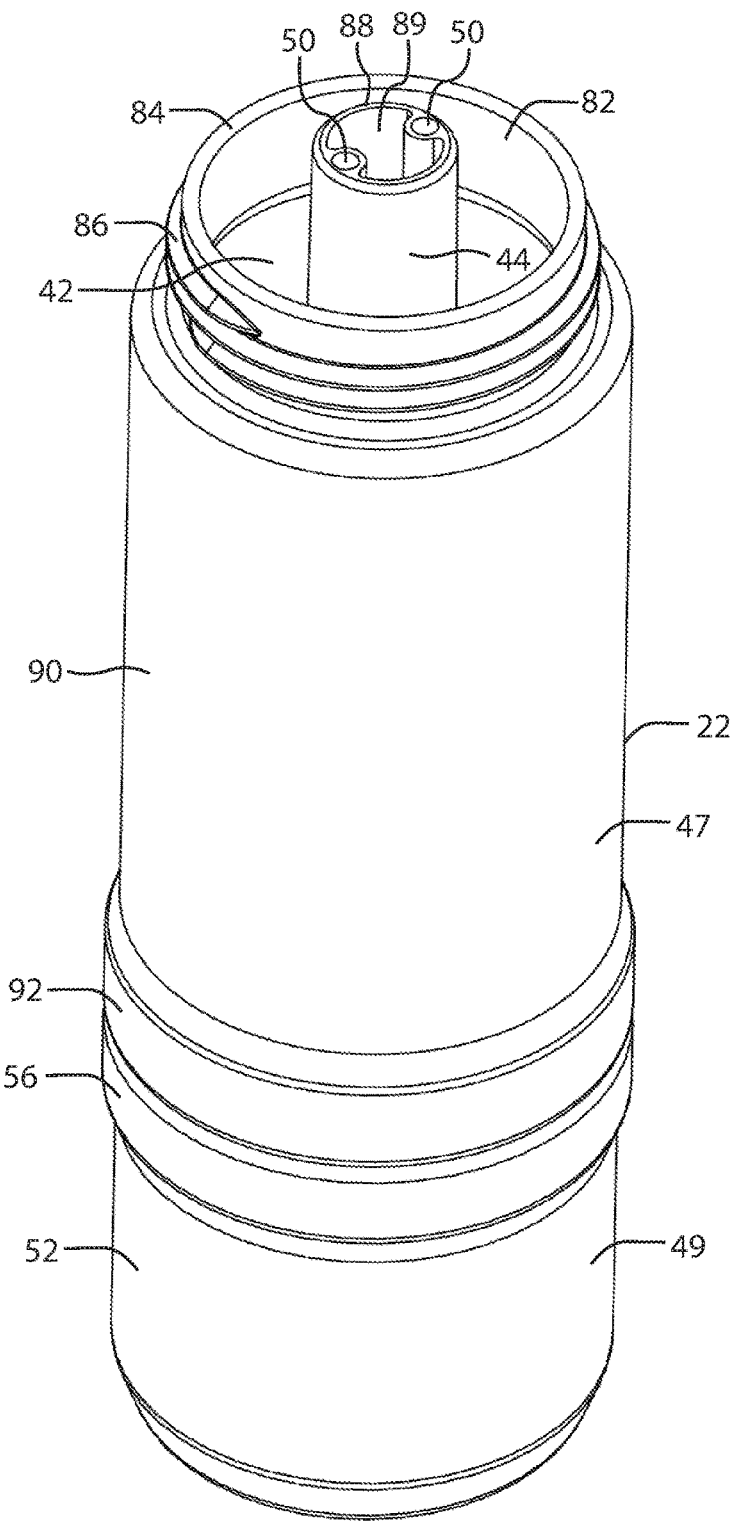
FIG. 4 is atop perspective view of the beverage treatment system of FIG. 1, the lid having been removed from the illustrated bottle.

With reference to FIG. 4, the bottle body 22 has a body mouth 59, an embodiment of which is atop opening 82, configured to provide access to the unfiltered beverage compartment 42. The top opening 82 is surrounded by an upper body edge 57, an embodiment of which is an upper rim 84, which presses against the gasket 40 within the lid 24 when the lid and body are secured to one another. Below the rim 84 is a threaded collar 86 that cooperates with threads within the lid 24 to form the threaded connecting portion 38. The transfer tube 44 is disposed within the center of the top opening 82 and has a tube rim 88 that seals against the gasket 48 in the lid 24. The transfer tube 44 has a central passage 89 through which filtered beverage flows for drinking and two vent tubes or passages 50 through which air flows to the filtered beverage compartment while the user is drinking from the bottle 20.

The bottle body 22 includes a generally cylindrical outer body wall 90 with an enlarged diameter portion 92 at the lower end. Below the enlarged diameter portion 92 is the threaded connecting portion 56 by which the body 22 connects to the base 52. The base 52 and bottle body 22 form a beverage holding container.

Figure 5:
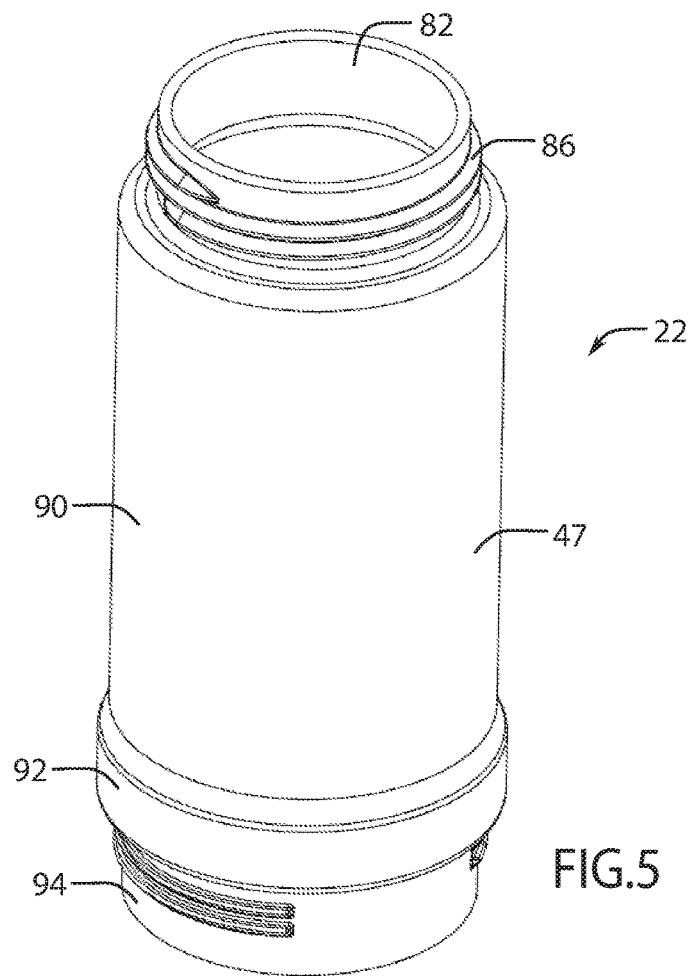
FIG. 5 is a top perspective view of a bottle body having a detachable lower compartment, which is shown detached from the upper compartment in the beverage treatment system of FIG. 1.

FIG. 5 shows the bottle body 22 with the threaded collar 86 at the top. The base 52 has been removed to reveal the lower threaded collar 94 that extends below the enlarged diameter portion 92. The lower threaded collar 94 is shown with interrupted threads, although continuous threads may be provided in some embodiments. Other connector structures may be provided instead within the scope of this invention.

Figure 6:
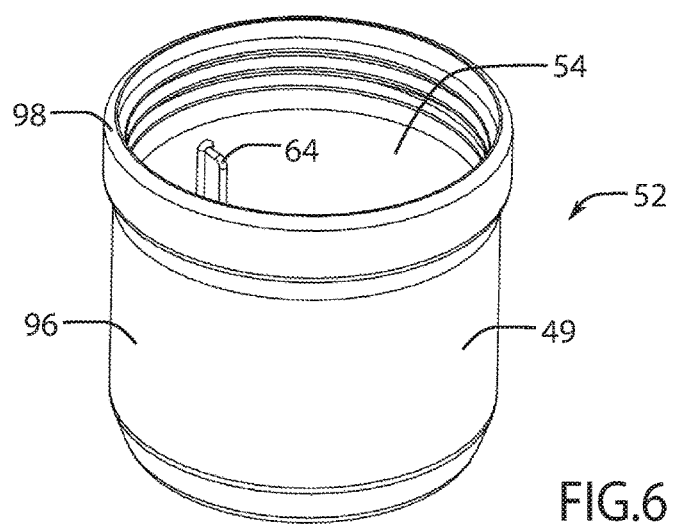
FIG. 6 is a top perspective view of the lower compartment of the beverage treatment system of FIG. 1, the illustrated lower compartment shown removed from the bottle body of FIG. 5.

In FIG. 6, the base 52 has a cylindrical body 96 that has a hollow interior forming the filtered beverage compartment 54. A threaded collar 98 having an interior thread is of an enlarged diameter and threadably engages onto the threaded collar 94 of the bottle body 22 to form the threaded connecting portion 56. The support flange or support element 64 is visible within the base 52.

Figure 7:
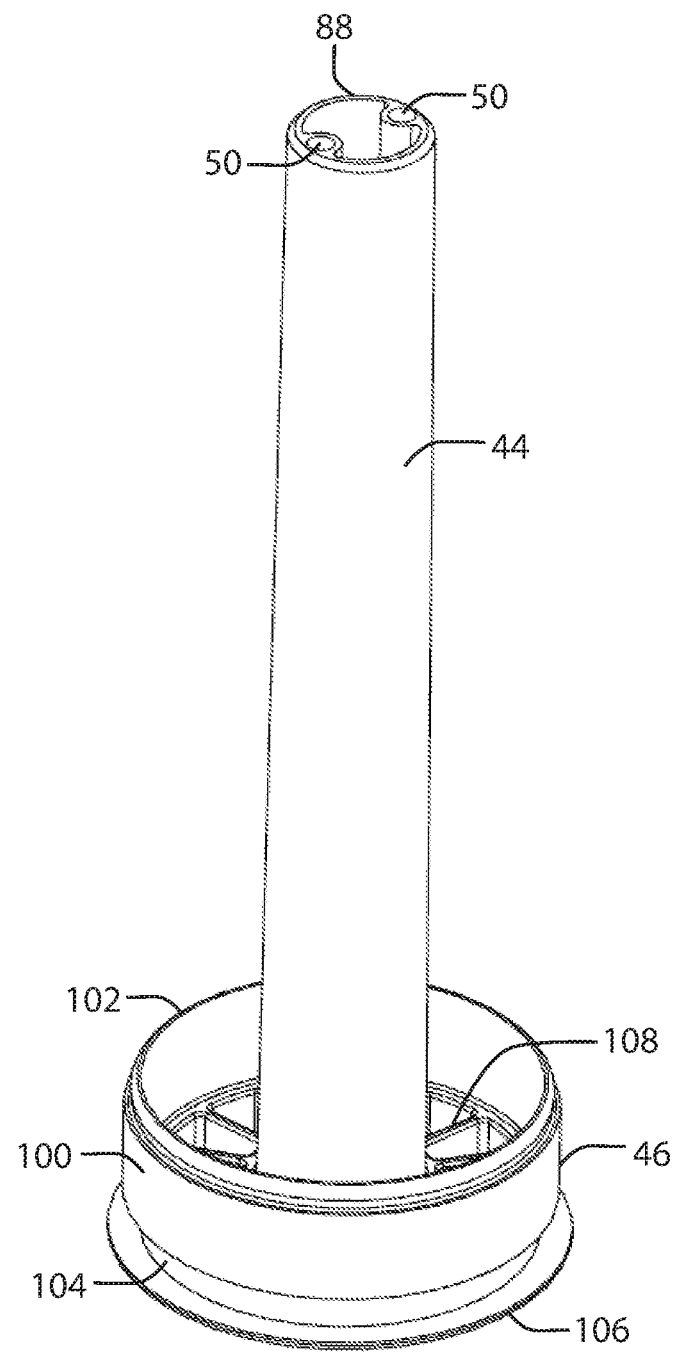
FIG. 7 is a top perspective view of a transfer tube and filter holder of the beverage treatment system of FIG. 1.

Turning to FIG. 7, the transfer tube 44 is elongated and generally cylindrical in shape. In certain embodiments, the transfer tube 44 has a slight taper, increasing in diameter from the upper end toward the lower end. Surrounding the first end of the transfer tube 44 is the filter holder 46. The filter holder 46 is configured to retain a filter and to support a transfer tube 44. In the illustrated embodiment, the transfer tube 44 is connected to the filter holder at the center. An outer wall 100 of the filter holder 46 is cylindrical and has a top rim 102 with an annular recess for engagement with the filter cover 60. The outer wall 100 has an outside diameter approximately equal to the inside diameter of the lower threaded collar 94 of the bottle body 22 so that the filter holder 46 fits in snug engagement within the lower end of the bottle body 22. A recess 104 is provided at the lower portion of the outer wall 100 into which the gasket 62 fits. A flange 106 extends radially outward from the lower end of the filter holder 46 to provide a seating surface to support the gasket 62 when it is pressed against the lower rim of the bottle body 22.

Within the filter holder 46 is a floor that is formed by radial ribs 108 that extend between the outer side of the transfer tube 44 and the interior of the outer wall 100. The radial ribs 108 have openings between the ribs to permit fluid to flow through the floor.

Figure 8:
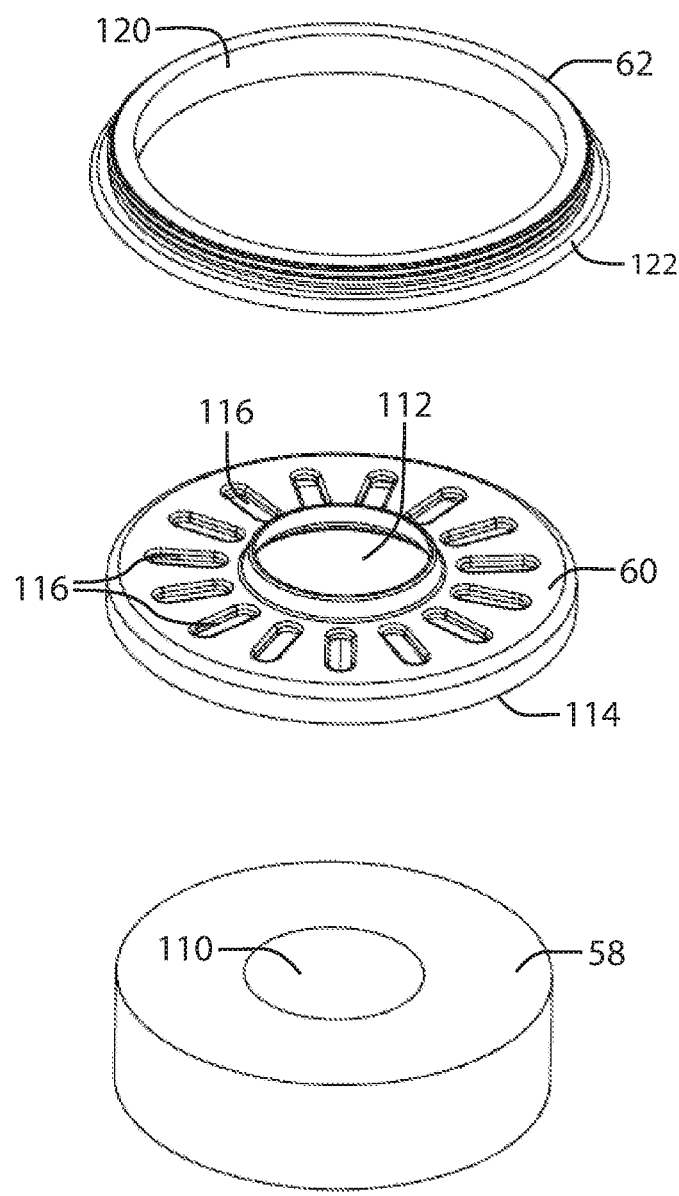
FIG. 8 is an exploded view of a ring-shaped filter, filter cover, and gasket of the beverage treatment system of FIG. 1.

FIG. 8 shows the replaceable filter element 58 that fits within the filter holder 46. The filter element 58 is in the shape of a cylinder with a central opening 110. The filter element 58 fits into the filter holder 46 with the transfer tube 44 extending through the central opening 110 of the filter element 58. The filter element 58 may be made of a filter media or a filter material such as carbon or charcoal, natural or artificial materials, woven or non-woven fibers, granular materials, foam, one or more membranes, or any other material or construction for filtering a liquid. In certain embodiments, the filter element is formed of a unitary member having a central opening so that it may be easily inserted and removed from the filter holder. In other embodiments, the filter element may be of particulate or granular material or layered materials or of other constructions, as desired, and may be enclosed within a filter cartridge or other housing. In a certain embodiments, the filter element is biodegradable or at least eco-friendly. For example, the filter element may include activated carbon and may be provided with an outer covering of a porous paper.

The filter cover 60 in FIG. 8 has a central opening 112 through which extends the transfer tube 44, an outer rim 114 that fits onto the rim 102 of the filter holder 46 such as by being snapped into place, and an arrangement of filter cover openings 116 that extend through the filter cover 60. When the filter element 58 is placed into the filter holder 46 and the filter cover 60 is fitted onto the filter holder, the openings 116 in the filter cover 60 and the openings between the ribs 108 in the filter holder 46 permit fluid to flow from one side of the filter holder 46 to the other side of the filter holder 46 by passing through the filter element 58. Preferably, the filter element 58 fits sufficiently snugly in the filter housing that little or no fluid is able to bypass the filter element without passing through the filter material or filter media.

Also in FIG. 8, the gasket 62 that fits into the channel or recess 104 in the filter holder 46 is shown. The gasket 62 as illustrated has a cylindrical gasket body 120 with a radial projection 122, overall the gasket forming a generally "L" shaped cross section. The cylindrical gasket body 120 fits into the channel 104 on the filter holder 46 and the projection 122 is supported by the flange 106 so that it seats against the lower rim of the bottle body 22 when the filter holder 46 is put into place at the lower end of the body. The gasket 62 thereby seals the unfiltered beverage compartment 42 from the filtered beverage compartment 54, to minimize the unfiltered beverage in the filtered beverage compartment. The support flange 64 in the filtered beverage compartment 54 presses the filter holder 46 and the gasket 62 into place.

Figure 9:
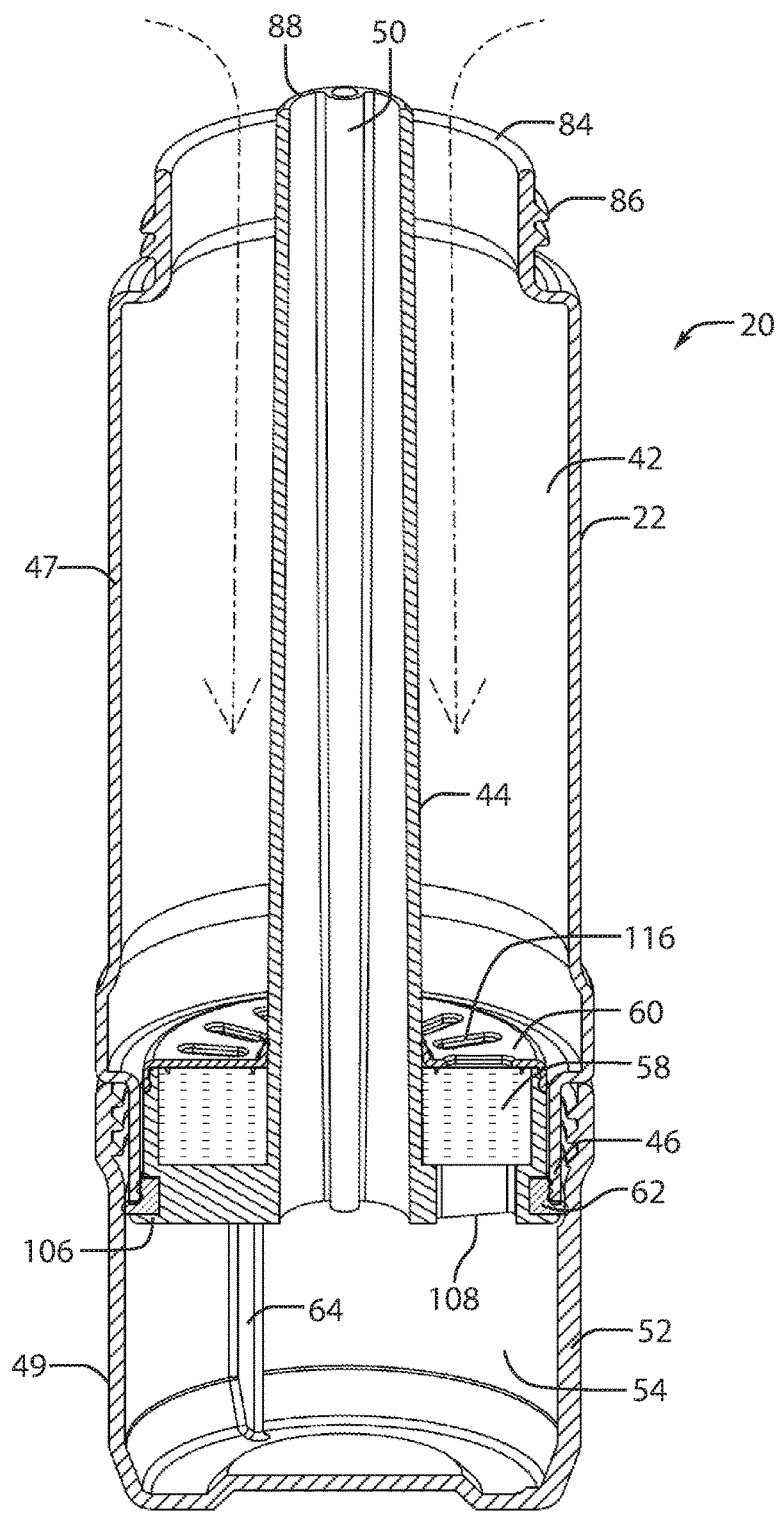
FIG. 9 is a cutaway view in perspective of the beverage treatment system of FIG. 1 from which the lid has been removed and into which water or another beverage is being directed.

FIG. 9 shows the filtering or treatment system 20 with the lid 24 removed for filling. The user adds water or other beverage to the unfiltered beverage compartment 42 as indicated by the arrows. The user desiring to filter drinking water should add water to the unfiltered beverage compartment and try not to permit the unfiltered water to enter the interior of the transfer tube 44, which leads to the filtered beverage compartment in the lower portion of the bottle body. The rim 88 of the transfer tube 44 extends beyond the rim 84 of the bottle body 22 to aid in directing water into the unfiltered beverage compartment. It is foreseen that the rim of the transfer tube 44 may be structured to prevent or reduce the unfiltered beverage that can enter, such as by narrowing the opening, including a valve, a cover, a baffle or other restriction on the inflow. The rim 88 of the transfer tube 44 is tapered to connect with the nozzle 30 in the lid 24, as will be described.

Once the unfiltered beverage is in the compartment 42 and the filtering or treatment system 20 is positioned generally in an upright position, the force of gravity draws the water or other beverage in the compartment 42 through the openings 116 in the filter cover 60 and into the filter element 58. The filter element 58 may remove chemicals, minerals, bacteria and other substances from the water or other beverage. The filtered water or other beverage flows from the filter 58 through the spaces between the ribs 108 and into the filtered beverage compartment 54. Unfiltered water or other beverage in the compartment 42 will continue to flow into the filtered beverage compartment until the filtered beverage compartment 54 is full or until no more unfiltered water or other beverage is left in the compartment 42 to be filtered.

The size of the filtered beverage compartment limits the quantity of beverage that can be filtered at one time. In the illustrated embodiment, the filtered beverage compartment 54 is of sufficient size to permit a user to drink several swallows of filtered beverage. Once the user drinks beverage from the filtered beverage compartment 54, the remaining beverage in the unfiltered beverage compartment 42 is filtered and flows into the filtered beverage compartment 54. The unfiltered beverage compartment 42 is intentionally chosen to be larger than the filtered beverage compartment 54. This permits quick filling of the bottle body 22, or at least quick filling of the unfiltered beverage compartment 42, with a quantity of beverage without the delay that would result from waiting for beverage to pass through the filter. If the material or construction or condition of the filter 58 is such that beverage flows slowly through the filter, the user can still quickly add beverage to the bottle, cap the bottle, and move on with the assurance that filtered beverage will be available when needed.

In certain embodiments, the relative sizes of the beverage compartments may be increased or decreased and/or to change the material or construction of the filter to increase or decrease filtering speed or filtering quality. For example, filters that are more aggressive at removing contaminants or other materials from the beverage may act more slowly, whereas filters for beverage that is already relatively clean and pure may be configured to work more quickly.

Figure 10:
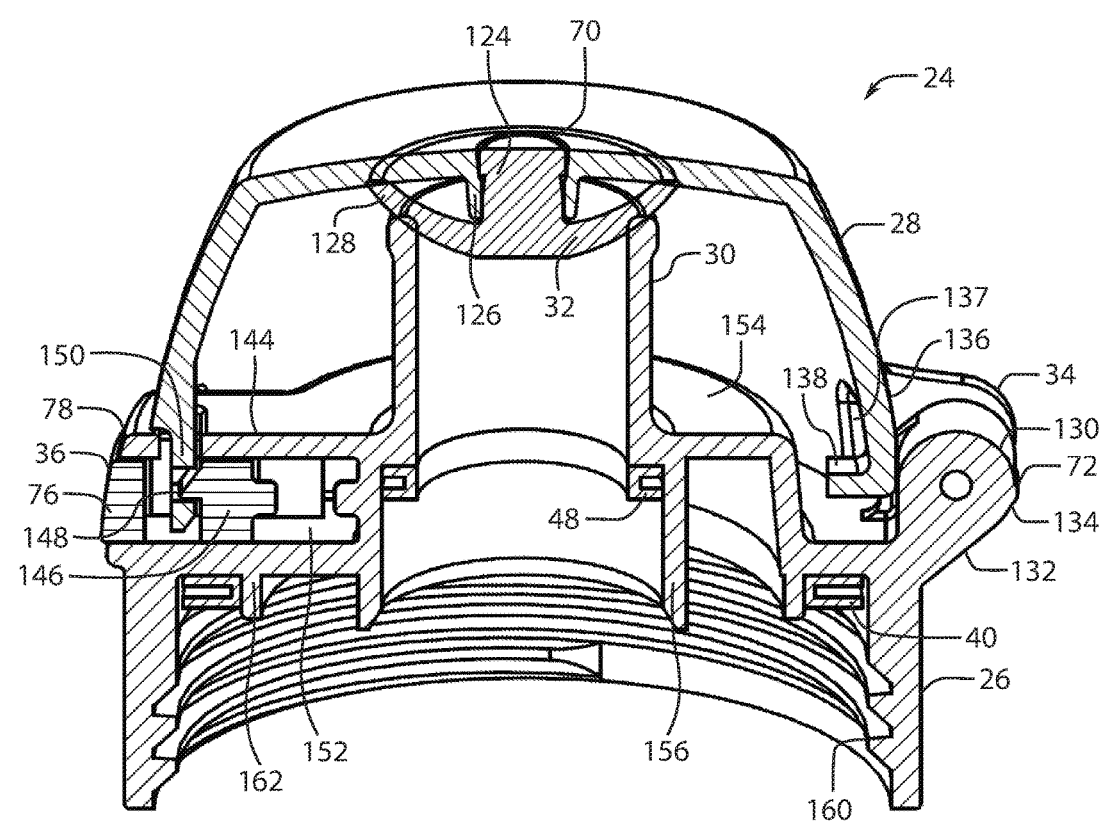
FIG. 10 is a cutaway view in perspective of the lid of the beverage treatment system of FIG. 1.

The lid 24 for the bottle of FIG. 9 is shown in FIG. 10. The lid 24 has the lid cover 28 that includes the pliable nozzle stopper 32 mounted in the opening 70. The nozzle stopper 32 has a stem 124 that fits into a sleeve 126 that extends into the lid cover 28 at the opening 70. The stem 124 and sleeve 126 include a stepped portion of larger diameter configured to prevent or inhibit the nozzle stopper 32 from being inadvertently pulled from the lid cover 28. The nozzle stopper 32 includes a curved disc portion 128 that extends outward from the stem 124 and that curves toward the inside surface of the lid cover 28. The disc portion 128 presses on the rim of the nozzle 30, together configured to prevent or reduce fluids from escaping from the nozzle 30 when the lid cover 28 is closed.

The lid cover 28 is attached to the lower lid 26 by the hinge 34. As shown in FIG. 2, the hinge 34 is formed in part by the center portion 72 that extends from the lower lid 26. The center portion 72 has a curved outer surface 130 about the top portion and a generally flat surface 132 toward the lower portion. A slight bevel 134 is provided between the curve 130 and the flat surface 132. The lid cover 28 has a retainer spring 136 that is free from the body of the lid 28 at the lower end and at each side. A cut-out that separates the side of the retainer spring 136 from the body of the lid cover 28 is seen at 137. The retainer spring 136 has an arm 138 extending inward into the lid cover 28 at the free end of the retainer spring 136. The retainer spring 136 bears against the curved surface 130 of the central portion 72 in the closed position of the lid cover 28 and while the lid cover 28 is being pivoted about the hinge 34 toward an open position. When the lid cover 28 reaches a fully open position, the retainer spring 136 reaches the flat surface 132 and flexes to position the arm 138 against the flat surface 132 so as to retain the lid cover 28 in the open position. The user may drink from the nozzle 30 without interference from the lid cover 28. When the user desires to close the lid cover 28, pivoting the lid cover 28 toward the closed position causes the retainer spring 136 and arm 138 to encounter the bevel 134 that forces the retainer spring 136 onto the curved surface 130 so that the lid cover 28 can be pivoted toward the closed position.

The lid cover 28 is retained in the closed position by the latch 36. The latch 36 has the release button 76 within the collar 78, as mentioned with respect to FIG. 3. The button 76 is mounted for sliding movement within a button tunnel 144 in the lower lid 26. The button 76 includes an inner portion 146 within the button tunnel 144 that has a catch projection that engages into a catch opening 148 formed in a catch tab 150 extending from the lid cover 28. The catch tab 150 extends into an opening in the button tunnel 144 so that the inner portion 146 of the button 76 can engage into the catch opening of the lid cover 28. The button 76 is biased to an engagement position by a spring 152, such as a rubber compression spring, mounted within the button tunnel 144.

Pressing on the latch button 76 slides the latch button 76 in the button tunnel 144 and compresses the spring 152. When the lid cover 28 is in the closed and latched position, the sliding movement of the button 76 moves the catch projection of the latch button 76 that is received in the catch opening 148 out of the catch opening in the lid cover 28 so that the lid cover is released from the latched position and can be pivoted to an open position. The nozzle stopper 32 may exert enough force on the rim of the nozzle 30 such that release of the latch 36 results in the lid cover 28 popping free toward an open position. This positive indication that the latch is released also provides an indication to the user as to whether the lid cover 28 is latched, since failure to latch will result in the lid cover popping to a partially open position.

The inner lid 26 has the nozzle 30 from which a user may drink. The nozzle 30 is supported on a raised central portion 154 of the inner lid 26. The underside of the raised central portion 154 has a collar 156 with an inwardly beveled rim that engages the free second end of the tube 44 and guides it into contact with the gasket 48 on the underside of the nozzle 30. The collar 156 is of a larger diameter than the nozzle 30 so that a seat is formed for the gasket 48. The illustrated gasket has a U-shaped cross section, although other shapes for the gasket are possible and are encompassed within this patent. As noted above, the rim 88 of the transfer tube 44 is outwardly beveled to aid in guiding the tube 44 into the collar 156.

The raised central portion 154 of the inner lid 26 accommodates the height difference between the second end of the transfer tube 44 and the rim 84 of the bottle body 22. A greater or lesser height difference is possible between the raised central portion and the body of the inner lid 26 depending on the difference in position between the second end of the transfer tube 44 and the bottle body 22. In the illustrated embodiment, the height of the raised inner portion 154 is equal to the height of the button tunnel 144, although this need not be so in every embodiment.

The lid gasket 40 is provided on the underside of the lower lid 26 adjacent the inside threaded portion 160 that forms the threaded connecting portion 38 with the bottle. The lid gasket 40 is positioned within a channel formed by a raised ring 162. The lid gasket 40 is of a C-shaped cross section, although other gasket configurations are possible. In place of the threaded connecting portion between the lid 24 and the bottle body 22, a snap connection, bayonet connection or other connection may be used.

Figure 11:
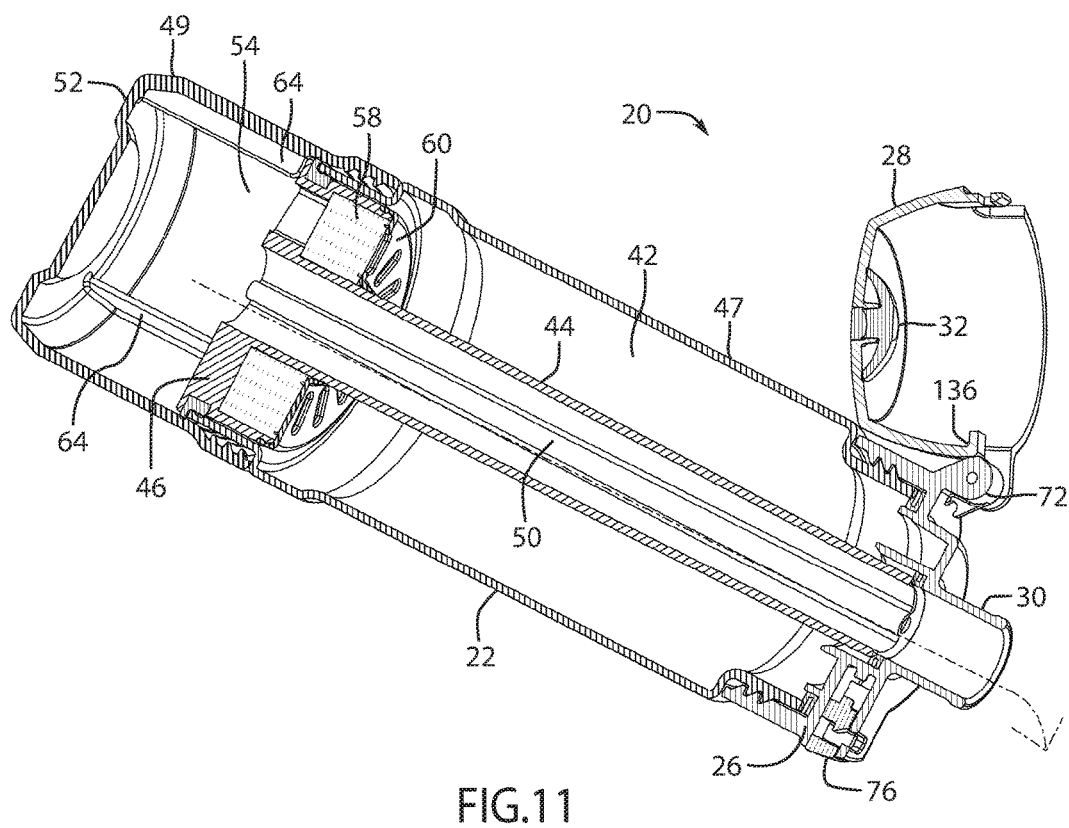
FIG. 11 is a cutaway view in perspective of the beverage treatment system of FIG. 1 showing the lid cover in an open position and the beverage bottle tipped generally upward for drinking or dispensing.

FIG. 11 shows the filtered drink bottle tipped up in a drinking position. The lid cover 28 has been pivoted to the fully open position where the retainer spring 136 is bearing against the flat portion of the central hinge element 72 so that the lid cover 28 is held open. This unseals the nozzle stopper 32 from the nozzle 30 so that the user may drink from the nozzle or pour the filtered beverage from the nozzle.

By tipping the bottom of the filtering or treatment system 20 up, filtered beverage in the filtered beverage compartment 54 flows through the transfer tube 44 and out the nozzle 30 for use or consumption by the user. To vent the filtered beverage compartment 54 as the beverage is poured from the nozzle 30, the vent tubes 50 carry air from the region of the nozzle 30 to the filtered beverage compartment 54. In the illustrated embodiment, two vent tubes 50 are disposed within the transfer tube 44. More or fewer vent tubes may be provided. By providing the vent tubes 50 within the transfer tube 44, the nozzle stopper 32 seals both the tube 44 and the vent tubes 50. The lower lid 26 closes the unfiltered beverage compartment 42, which are together configured to substantially prevent the unfiltered beverage from leaving the filtering or treatment system 20 as the filtered beverage is being removed. The user thus receives only filtered beverage from the filtering or treatment system.

The filter of certain embodiments is configured to permit beverage flow in either direction. Tipping the filtering or treatment system to the drinking position will cause some of the filtered beverage in the filtered beverage compartment 54 to flow back through the filter 58 into the unfiltered beverage compartment 42. In most embodiments, the flow through the filter is slow compared to the unimpeded flow through the transfer tube 44. As such, a small amount of the filtered beverage backflows through the filter, but most of the beverage in the filtered beverage compartment is available for use. The small amount of beverage that backflows during pouring or drinking is compensated by returning the bottle system to an upright position so that beverage again begins filtering from the unfiltered beverage compartment 42 into the filtered beverage compartment 54. The backflow of beverage through the filter 58 when the bottle system is tipped up may flush the filter, increasing filtering efficiency. It is foreseen that a directional flow restrictor may be included to reduce or eliminate the backflow through the filter during drinking from the filtering or treatment system and when the filtering or treatment system is tipped from an upright position.

The filtered beverage compartment 54 shows two of the support flanges or support elements 64 that hold the filter holder 46 against the lower rim of the bottle body 22. More or fewer such supports may be provided. It is also possible that the filter holder 46 is held in place by other means.

After the user has used the filtered beverage bottle system of FIGS. 1-11 to filter a quantity of beverage, the filter element 58 may need to be changed. The user unscrews the base 52 from the body 22 as shown in FIGS. 5 and 6, which frees the filter holder 46 and tube 44 to be removed from the open bottom of the body 22. The filter cover 60 is removed from the filter holder 46 by lifting the ring-shaped filter cover 60 off of the tube 44. The filter element 58 is removed from the filter holder 46. It may be necessary to invert the tube 44 and filter holder 46 to get the wet filter element 58 out of the filter holder. A new or different filter element 58 is placed over the transfer tube 44 and into the filter holder 46, and then the filter cover 60 is replaced, such as by being snapped on. The transfer tube 44 and filter holder 46 are replaced into the body 22 and the base 52 is screwed onto the bottle body 22. The beverage bottle system 20 is ready for use with a new or different filter.

Figure 12:
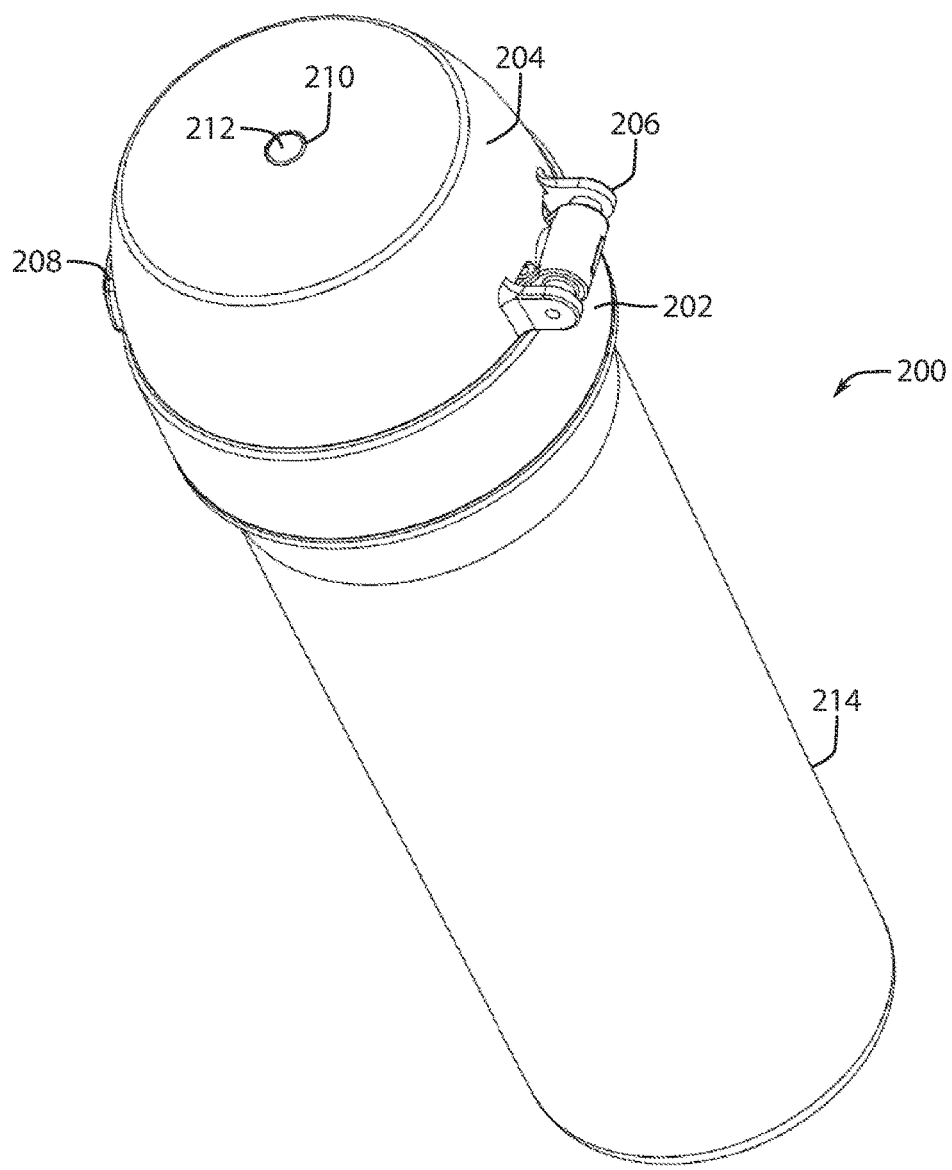
FIG. 12 is a top back perspective view of a second embodiment of the beverage treatment system according to the present invention.

FIG. 12 discloses a second embodiment of the filtering or treatment system 200. The lid 202 has a lid cover 204 connected to the lid 202 by a hinge 206. A button release latch 208 is provided to secure the lid cover 204 in the closed position. A central opening 210 has a nozzle stopper 212. The structure of the lid may be identical to the first embodiment or may differ in construction, materials or design. The bottle body 214 is of a single piece and lacks a removable base by which to change filter elements.

Figure 13:
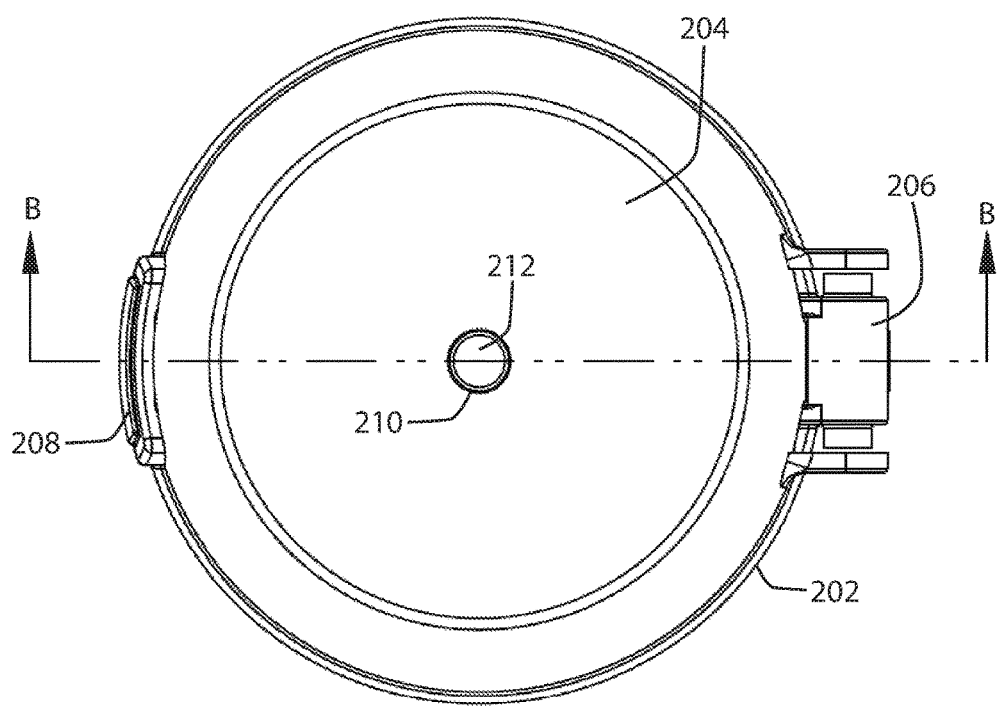
FIG. 13 is a top plan view of the beverage treatment system of FIG. 12 showing a line B-B.
Figure 14:
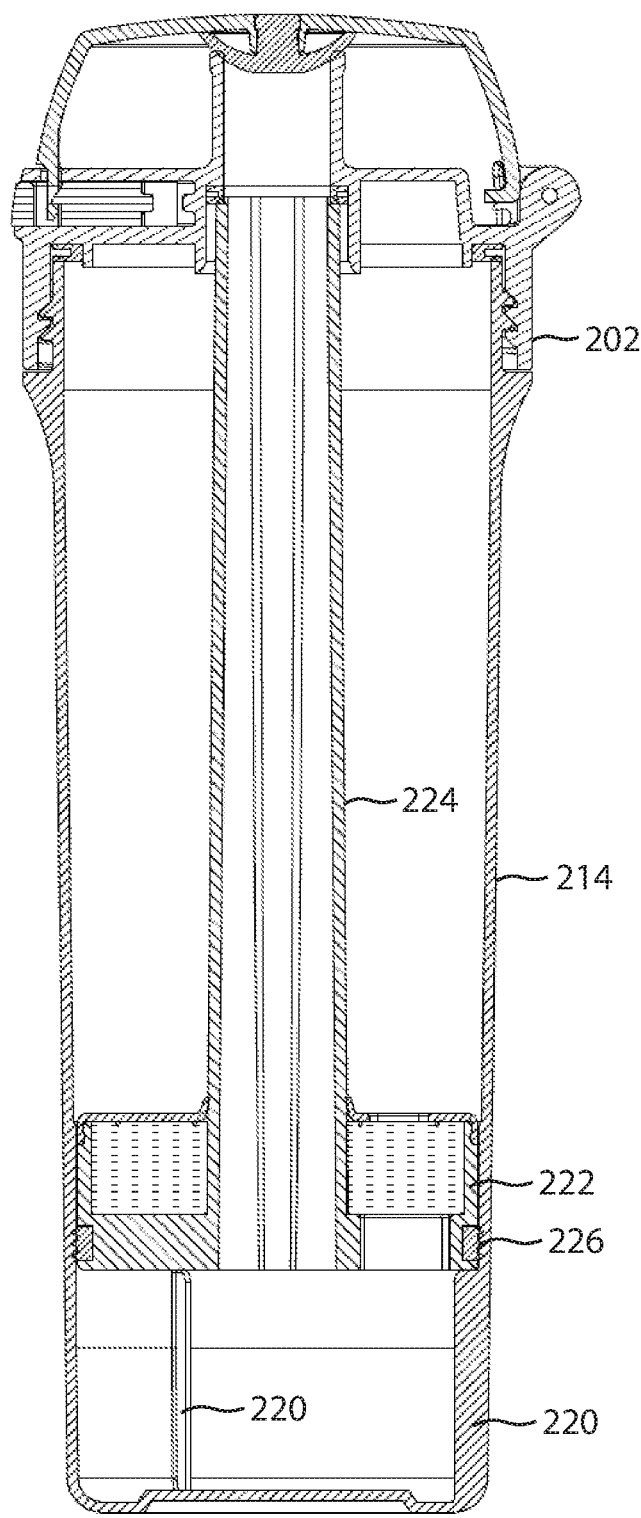
FIG. 14 is a cross-sectional view of the beverage treatment system of FIG. 12 along the line B-B of FIG. 13.

FIG. 13 shows the top of the lid for the second embodiment and indicates the cross section line for the cross-sectional view of FIG. 14.

In FIG. 14, further differences between the first and second embodiments can be seen. The bottle body 214 of the filtering or treatment system is formed in one piece without a removable base. Support flanges 220 provide support for the filter holder 222 and transfer tube 224 from below. Support flanges 202 also may be configured to assist with positioning the filter holder 222 and minimize the chance that the filter holder will be pushed down further than desired within the bottle body 214, which would decrease the size of the filtered beverage component. The filter holder 222 and transfer tube 224 are removed and replaced by removing the lid 202 from the bottle body 214 and removing and inserting the filter holder and tube 222 and 224 through the open top of the filtering or treatment system. In place of the gasket that seals against a bottom rim of the bottle body, the filter holder 222 of the second embodiment seals against an inside surface of the body 214 using a gasket 226 in a channel in the filter holder 222. Otherwise, the second embodiment operates generally as the first embodiment.

Figure 15:
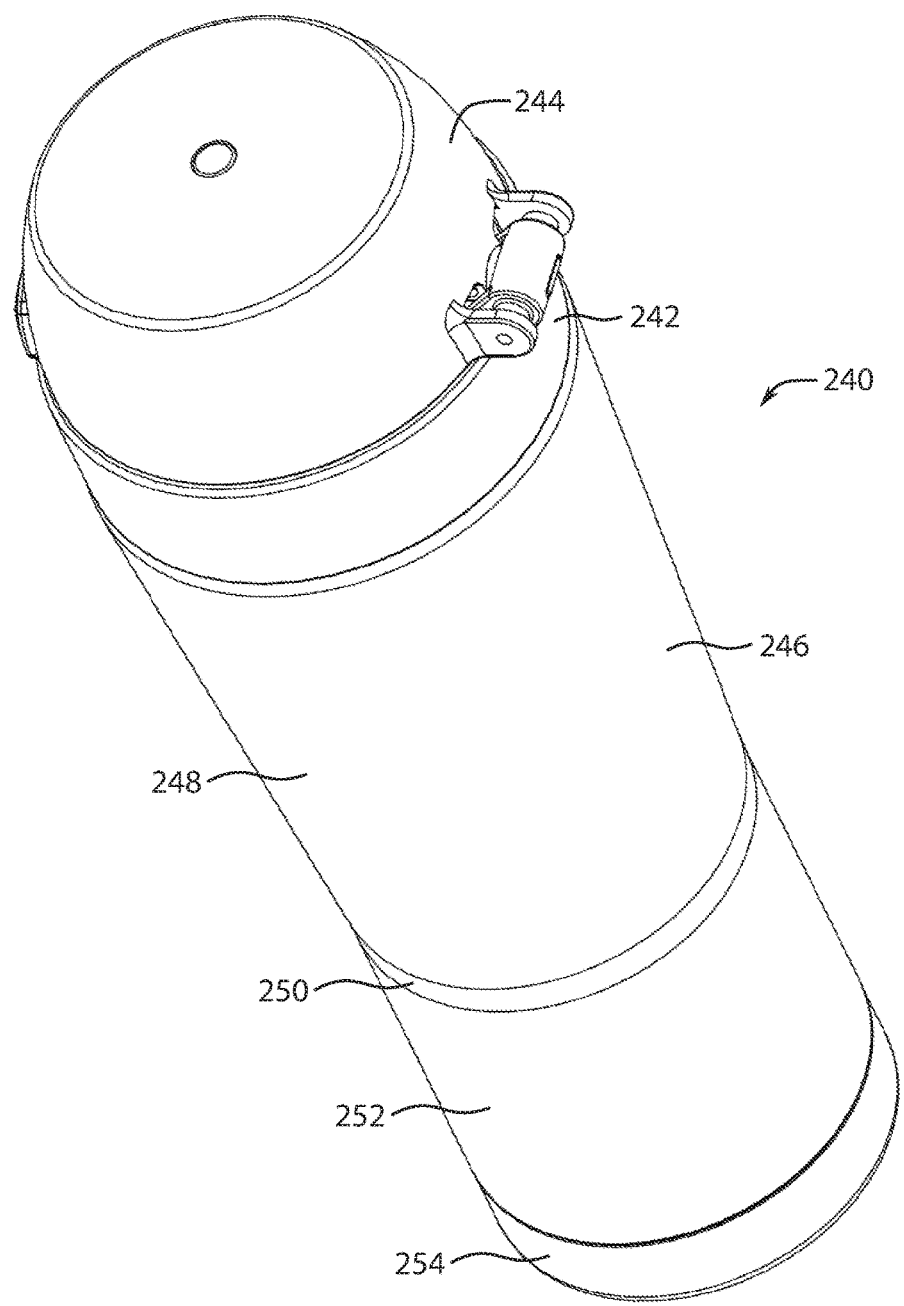
FIG. 15 is a top back perspective of a third embodiment of the beverage treatment system according to the present invention.

A third embodiment is shown in FIG. 15. The filtering or treatment system 240 has a lid 242 with a lid cover 244. The lid 242 is fastened on to a bottle body 246 of the filtering or treatment system. The lid and lid cover 242 and 244 are generally the same as described previously. The bottle body 246 has an upper segment 248, a ring 250, a lower segment 252, and a base 254. The ring 250 has a smaller diameter than the rest of the bottle body 246. The upper and lower segments 248 and 252 taper to increased diameters from the ring 250.

Figure 16:
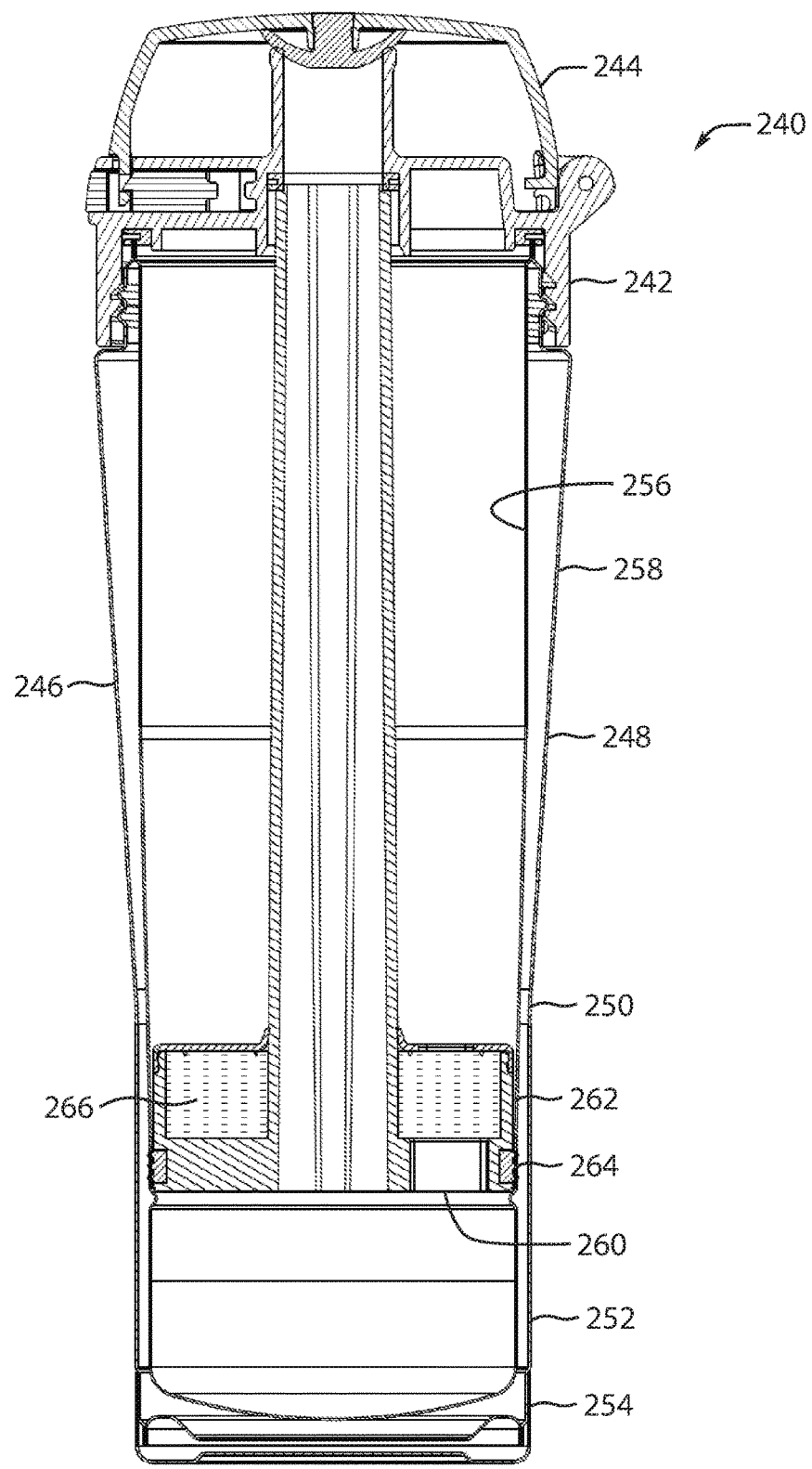
FIG. 16 is a cross-sectional view along a vertical axis of the beverage treatment system of FIG. 15.

FIG. 16 shows that the bottle body 246 is a vacuum insulated bottle having an interior wall 256 that is generally cylindrical and an outer wall 258 that defines the exterior contours of the bottle body. The interior wall 256 includes a ridge 260 that supports that filter housing 262. A gasket 264 in a channel in the filter housing 262 seals against the interior wall 256, which are together configured to prevent or reduce fluid flow between the filtered and unfiltered beverage compartments other than through a filter element 266, which may have the characteristics of the filter element 58 as described herein. The vacuum insulated bottle body 246 keeps hot beverages hot and cold beverages cold. The segments in the interior wall and exterior wall denote components that are assembled to form the vacuum bottle of the present embodiment. Other segments and segment locations are of course possible.

Of course, the present filtering or treatment system is not limited to filtering only water but can also be used to filter or treat other beverages or fluids as well. It is also envisioned that the filtering or treatment system may be configured to add substances to the beverage instead of removing substances from the beverage. For example, by adding tea, coffee, herbs, an infusion material, a flavoring material, a vitamin or mineral supplement, or other material to the filter compartment, the filtering or treatment system may be used to make a flavored or supplemented beverage.

Further embodiments of a beverage filtering or treatment system are described herein. Various components are described for use in conjunction with beverage filtering or treatment systems, which components may be used with non-filtering beverage systems as well. Where elements of embodiments described herein are the same or similar to elements of other embodiments, those elements may not be described in detail each time they are shown but such illustration will rely on descriptions of the same or similar elements shown in other figures of the drawings.

Figure 17:
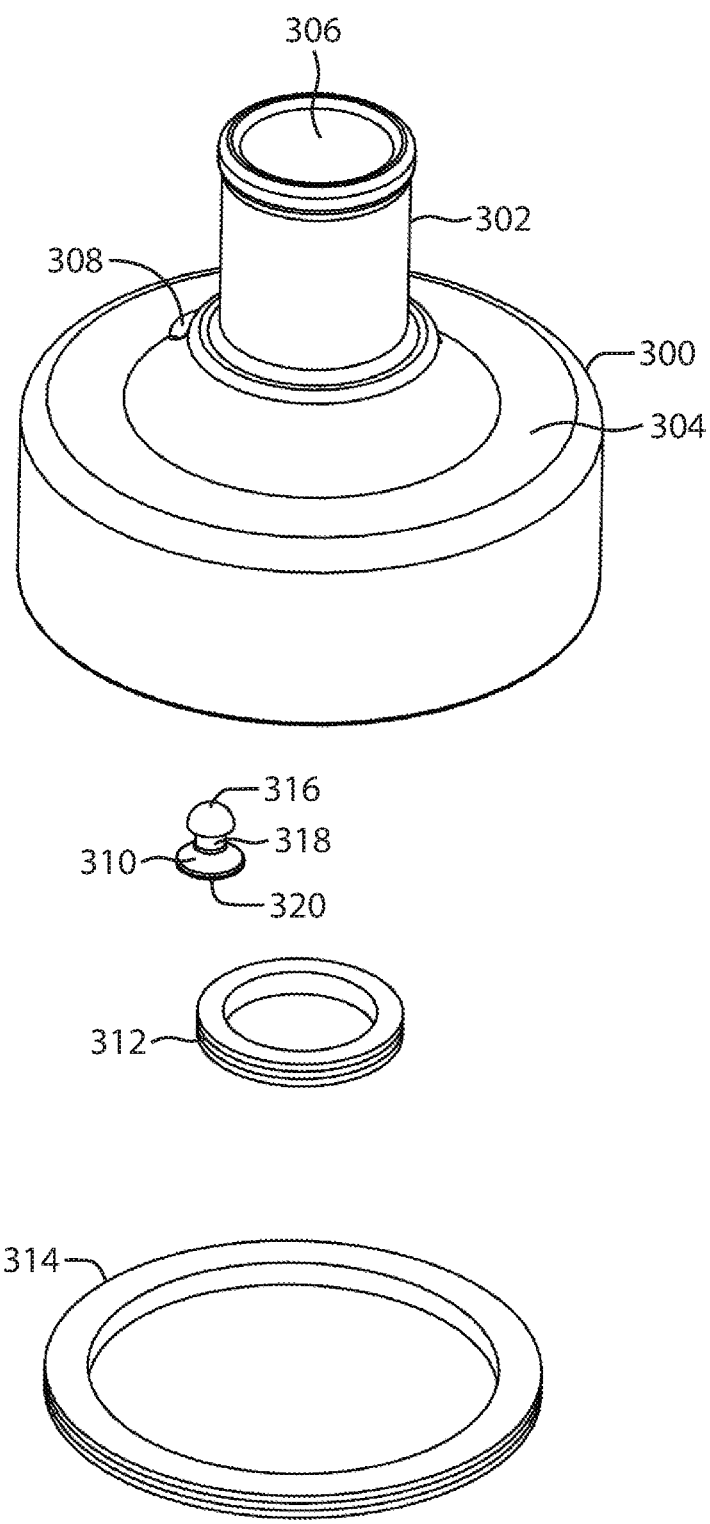
FIG. 17 is an exploded perspective view of a further embodiment of a lid for a beverage treatment system.

Turning to FIG. 17, a lid 300 is shown for attachment to a beverage bottle, which may be a filtering beverage bottle system or other bottle. The lid 300 includes a central nozzle 302 projecting from a collar 304. The nozzle 302 includes a central opening 306 in fluid communication with an interior of a bottle to which the lid 300 is attached. The collar 304 includes internal threads or a snap connector for fastening to a bottle, depending upon the bottle. A vent opening 308 is provided in the collar 304. Below the lid 300 in the exploded view is a vent gasket 310 that is fastened into the lid 300 at the vent opening 308. A transfer tube gasket 312 is provided to seal between the lid 300 and the second end of the transfer tube of a filtering beverage bottle. Also provided is a lid gasket 314 that seals between the lid 300 and the bottle. The gaskets 312 and 314 have a U-shaped cross section in certain embodiments, although other gasket configurations are of course possible and within the scope of this invention. The vent gasket 310 in the illustrated embodiment has an upper catch part 316 that secures into the vent opening 308, a stem 318 that connects to the upper catch part 316, and a lower portion 320 that permits air to enter the vent opening 308 but is configured to prevent or reduce fluids exiting.

Figure 18:
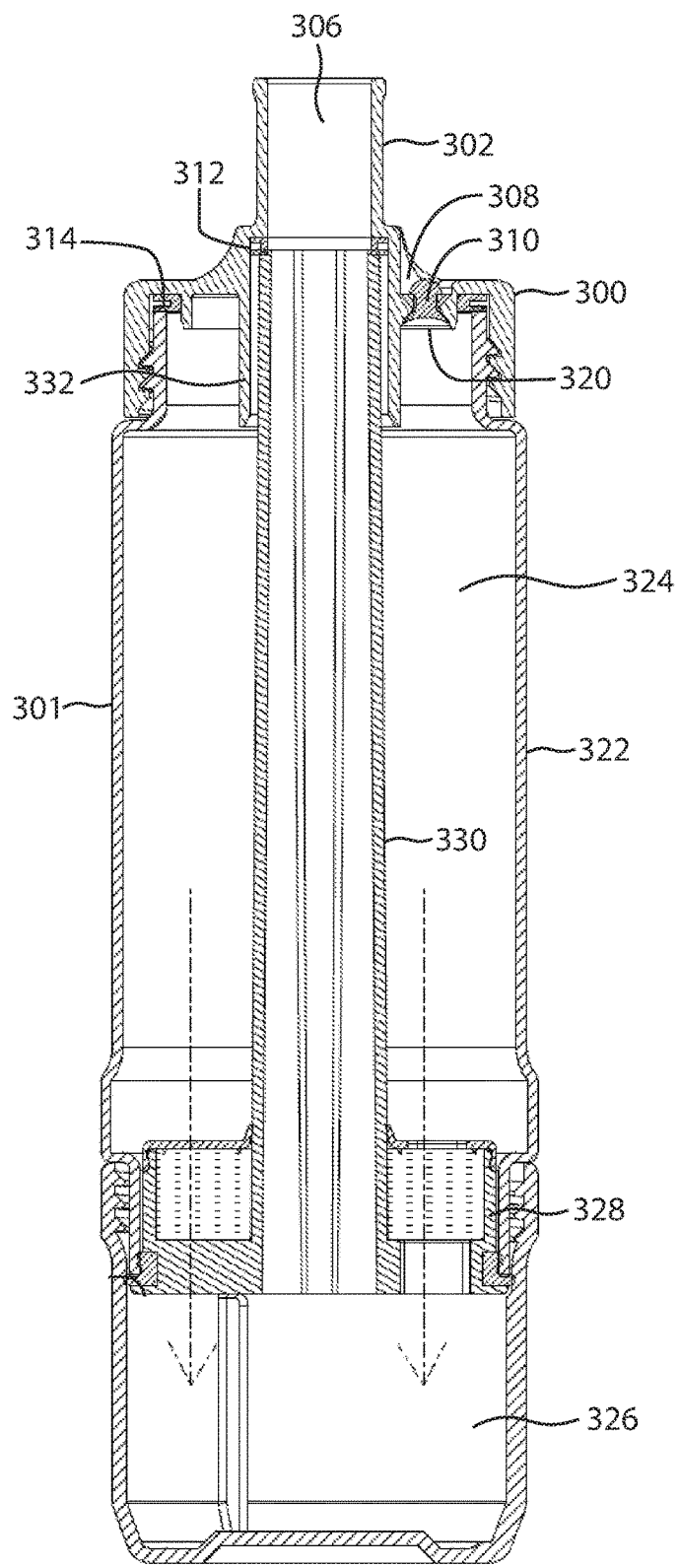
FIG. 18 is a cross sectional view along a vertical axis of a beverage treatment system including the lid of FIG. 17.

In FIG. 18, the lid 300 of FIG. 17 is shown fastened onto a beverage filtering or treatment system 322. Together, the lid 300 and the bottle body 301 form a beverage filtering or treatment system 322. The filtering or treatment system 322 is similar to the filtering or treatment system described herein and includes an unfiltered beverage compartment 324 and a filtered beverage compartment 326 separated by a filter 328. The filter 328 surrounds a lower end of a transfer tube 330. The upper end of the transfer tube 330 extends into a receptacle 332 in the lid 300, when the lid 300 is fastened onto the bottle body 301. The receptacle 332 includes the transfer tube gasket 312 that provides the seal, which is configured to prevent or reduce leakage of unfiltered beverage into the interior of the transfer tube 330 and the interior 306 of the nozzle 302. The lid 300 is threadably engaged onto the bottle 301 and the gasket 314 provides the seal between the lid and bottle to prevent or reduce leakage of fluids from the bottle system.

The vent gasket 310 is shaped to cooperate with the vent opening 308 of the lid so as to permit air to enter the unfiltered beverage compartment 324 as the beverage moves through the filter 328 and out of the unfiltered beverage compartment. The lower portion 320 of the vent gasket 310 is formed as a relatively thin curved member that presses against a correspondingly shaped portion of the vent opening 308. As air pressure within the unfiltered beverage compartment decreases, the relatively thin curved portion flexes to permit outside air to enter. The lower portion 320 is shaped to press against the corresponding portion of the lid when liquids contact the inside of the vent gasket 310 so as to seal the bottle against leaks through the vent opening 308.

Figure 19:
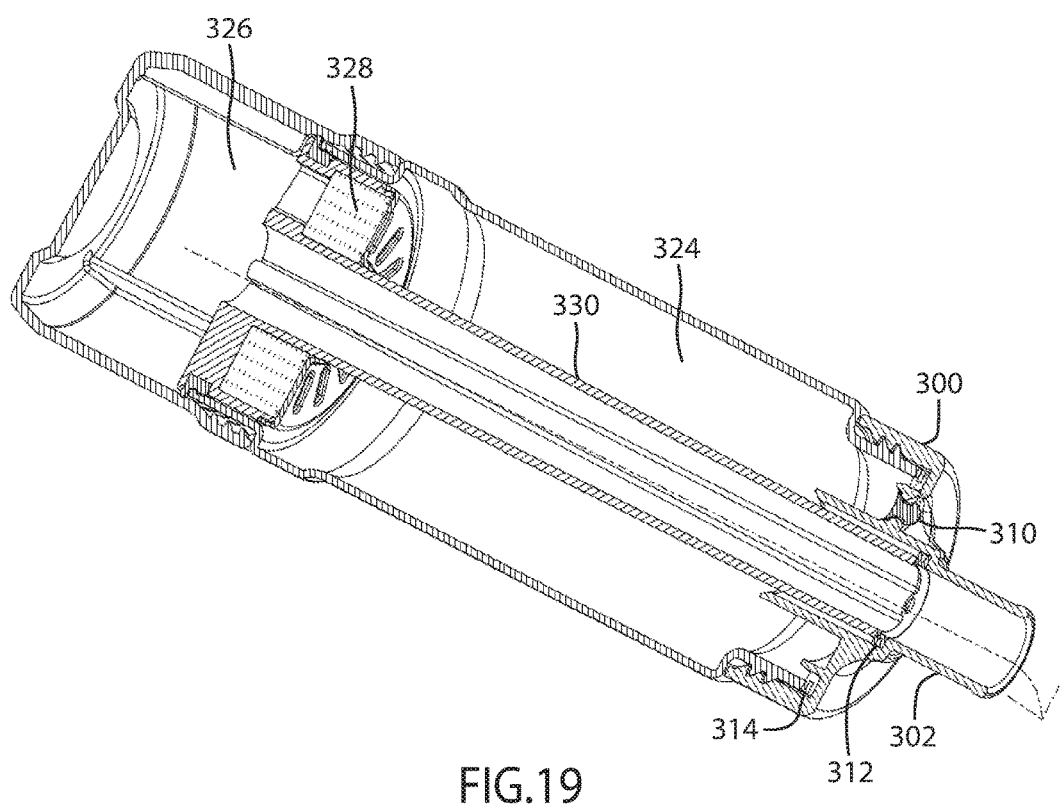
FIG. 19 is a cutaway view in perspective of the lid and beverage treatment system of FIG. 18.

FIG. 19 shows the filtering or treatment system 322 tipped up to a drinking position. Filtered beverage within the filtered beverage compartment 326 may flow through the transfer tube 330 to the nozzle 302 for drinking, as indicated by the arrow. Unfiltered beverage within the unfiltered beverage compartment 324 is prevented or inhibited from leaking from the bottle body 301 by the bottle gasket 314 and the vent gasket 310 and is prevented or inhibited from entering the flow of filtered beverage by the transfer tube gasket 312.

Figure 20:
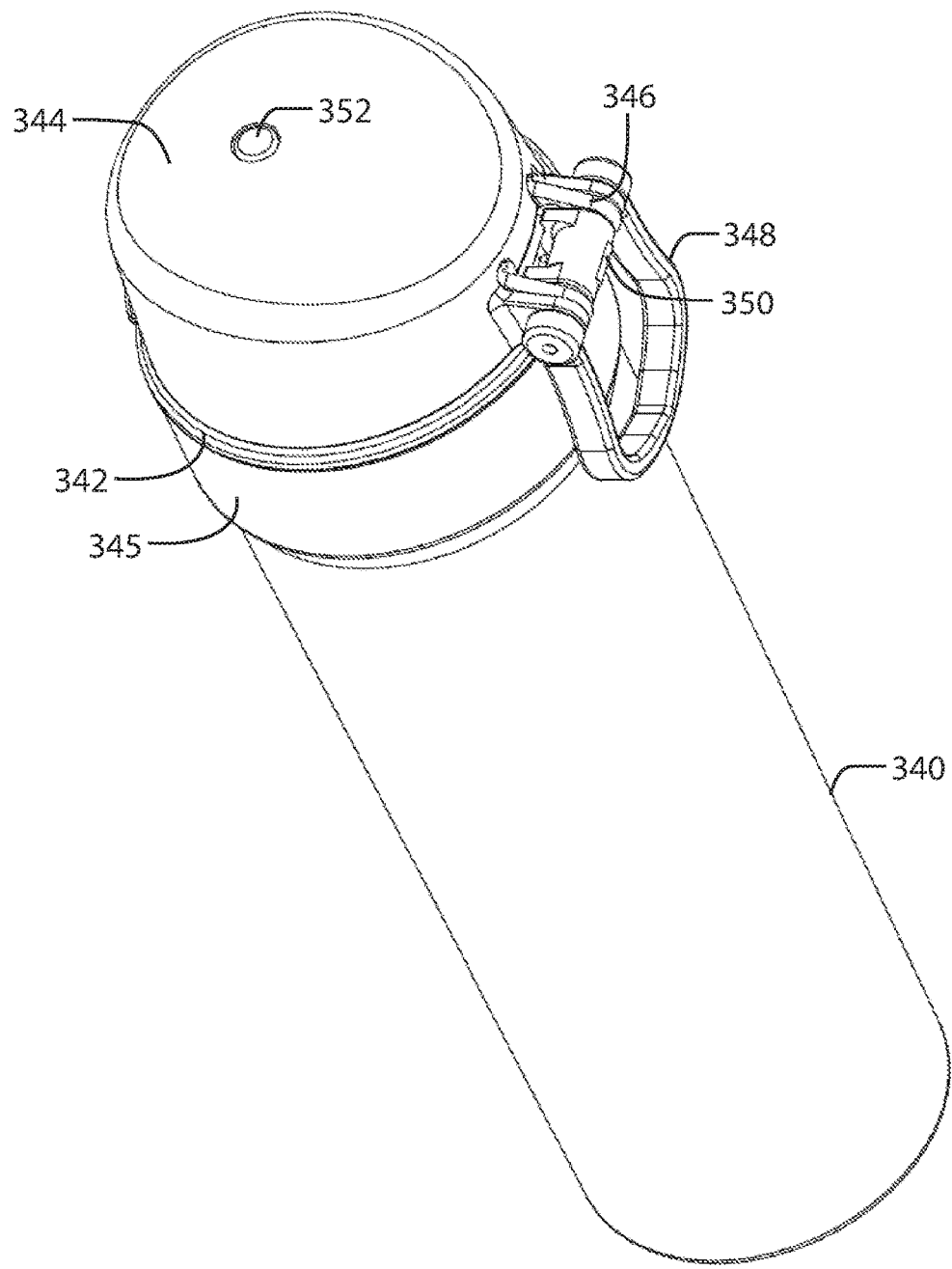
FIG. 20 is a top, back, side perspective view of a further embodiment of a beverage treatment system.

In FIG. 20 is shown a beverage bottle body 340 of a certain embodiment of a filtering or treatment system to which is attached a lid 342 that has a lid cover 344. The lid 342 is fastened into an enlarged upper end 345 of the bottle body 340. The lid cover 344 and lid 342 are connected to one another by a hinge 346 that permits the user to open the lid cover for drinking access to the lid 342. A carry loop 348 is connected to the lid 342 at the hinge 346. The carry loop 348 is pivotally mounted on the hinge 346 for movement between a stored position as shown and positions by which the filtering or treatment system may be carried using the loop 348. In addition to or instead of the carry loop, a hanging strap or shoulder strap or other handle or support may be provided on the beverage filtering or treatment system. A projection 350 is provided on the hinge 346 for engagement with the lid cover 344 in the open position of the lid cover. A seal mounting 352 is provided on the top of the lid cover 344.

Figure 21:
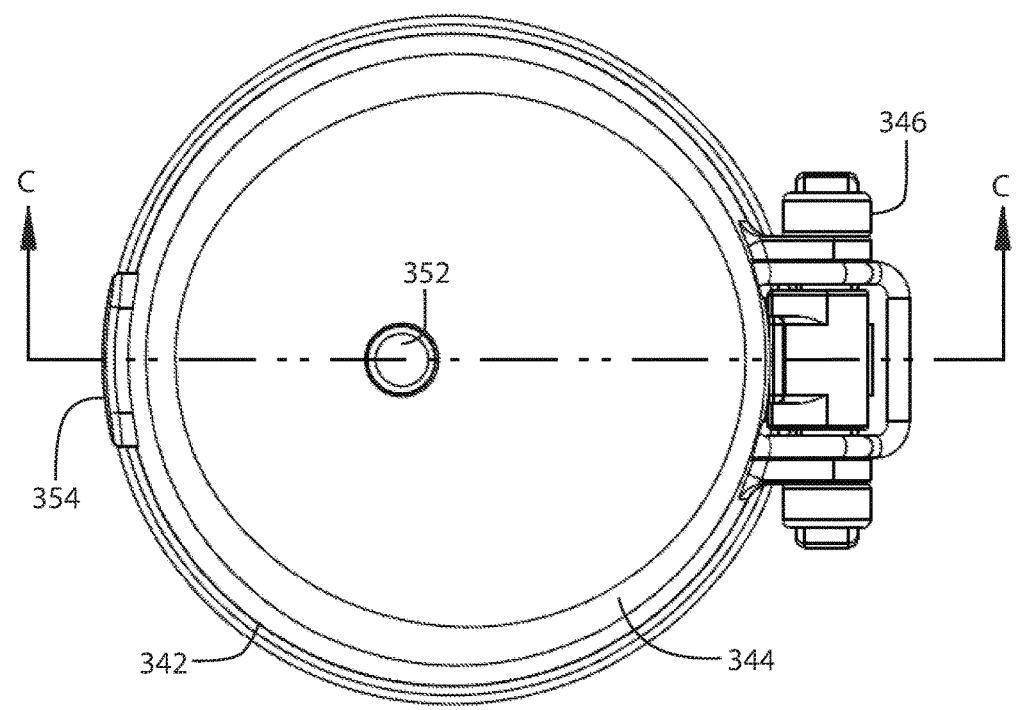
FIG. 21 is a top plan view of the beverage treatment system of FIG. 20 showing section line C-C.

FIG. 21 shows the top of the lid cover 344 and lid 342 including the seal mounting 352 and the hinge 346. A button 354 is provided on the lid 342 opposite the hinge 346 for release of the lid cover 344 from a closed position.

Figure 22:
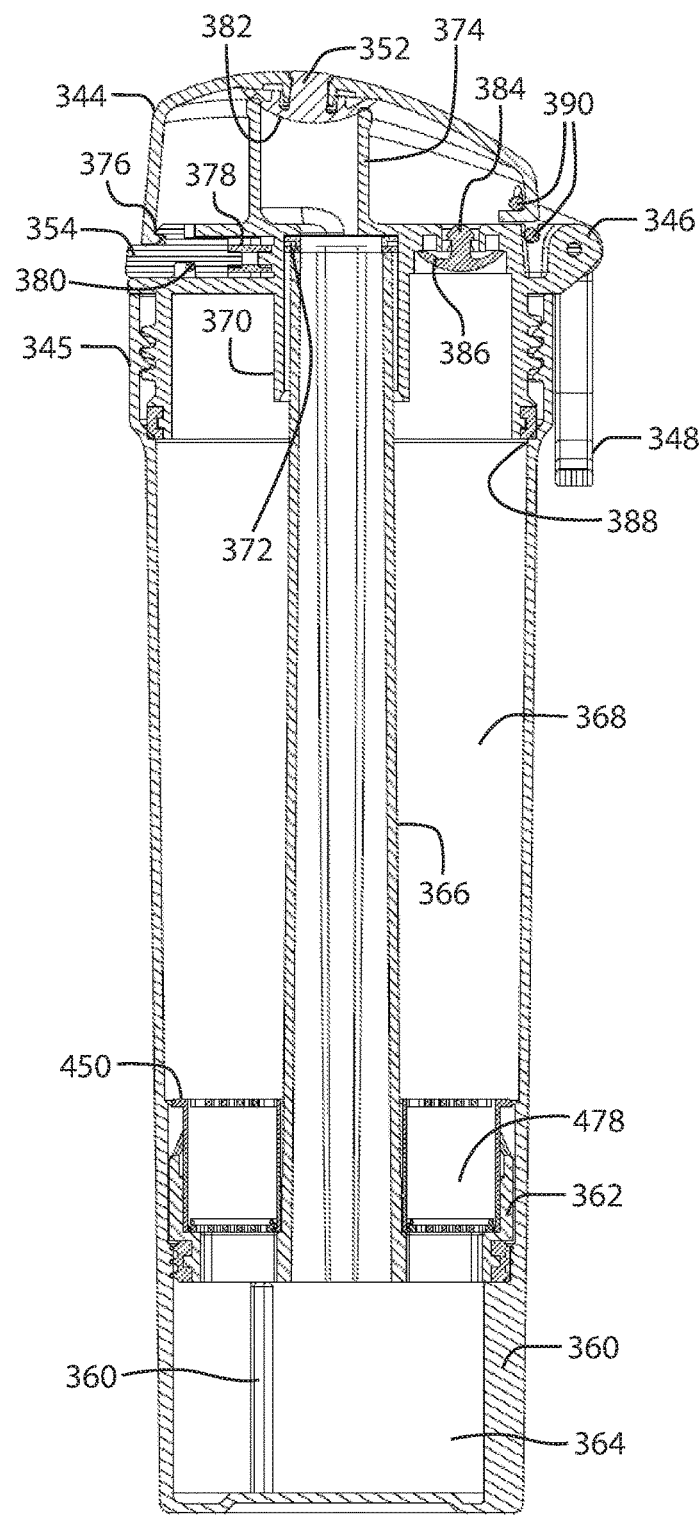
FIG. 22 is a cross sectional view of the beverage treatment system of FIG. 20 along the section line C-C shown in FIG. 21, including a filter cartridge.

FIG. 22 shows the interior of the bottle body 340, lid 342 and lid cover 344. The bottle body 340 is uninsulated and has smooth exterior sides. A plurality of fins or struts 360 is provided in a lower portion of the bottle body 340 to support a filter holder 362, which thereby defines a filtered beverage compartment 364. The filter holder 362 is connected to a transfer tube 366 that extends through an unfiltered beverage compartment 368 to the lid 342. The transfer tube 366 fits into a receptacle 370 on the lid 342 where it engages a gasket 372 that provides a seal between the lid 342 and the transfer tube 366. The gasket 372 is configured to prevent or reduce unfiltered beverage mixing with the filtered beverage when the user drinks from the nozzle 374.

The lid cover 344 is in the latched position as a result of the button 354 engaging a catch nose 376 on the lower edge of the lid cover 344. The button 354 is held in the engaged position by a spring 378 that extends between the inner portion of the button 354 and an inner portion of a button holding recess in the lid 342. The spring 378 of the illustrated embodiment is a tube of a pliable, rubber-like material that is compressible to permit the button 354 to be pressed inward by a user and then return to its unpressed position. The button 354 is prevented or inhibited from leaving the button holding recess in the lid 342 by a lock pin 380 that fits into a notch in the button 354. The pin 380 in the notch also limits inward motion of the button 354 when pressed.

The lid cover 344 seals the open end of the nozzle 374 using a nozzle sealing disk or nozzle stopper 382 that is fastened onto the interior of the lid cover 344 by the seal mounting 352. The nozzle sealing disk or nozzle stopper 382 is dome shaped in the illustrated embodiment and is formed of a pliable material configured to form a liquid tight seal between the nozzle 374 and the lid cover 344.

An umbrella valve 384 is mounted in an opening in the lid 342. The umbrella valve 384 has a trunk mounted in an opening in the lid and a dome-shaped valve portion 386 that has its outer edges in contact with the underside of the lid 342. The valve portion 386 seals against the lid and is configured to prevent or reduce liquid leaking from the bottle system but is flexible and configured to permit air to flow into the bottle system when the interior air pressure is lower than the outside air pressure, such as may occur when the user is drinking from the bottle system or when beverage is filtering from the unfiltered beverage chamber 368 into the filtered beverage chamber 364. The air can flow into the bottle system at the umbrella valve 384 through gaps that are formed in the lid around the opening in which the umbrella valve 384 is mounted.

A gasket 388 is affixed at the lower perimeter of the lid 342 so that it seals against an interior of the bottle body 340 when the lid 342 is secured to the bottle body. The gasket 388 in the illustrated embodiment presses against the transition between the narrower body 340 of the bottle system and the enlarged upper end 345 of the bottle system. The lid 342 includes exterior threads that threadably engage within the enlarged upper end 345.

The lid cover 344 is biased to a fully open position by an O-ring 390 that extends between the lid cover 344 and lid 342. The O-ring 390 extends about elements of the hinge 346 so as to hold the lid cover 344 open while the user drinks from the nozzle 374.

The embodiment of FIG. 22 includes a filter cartridge 450 that is mounted into the filter holder 362 and that includes a filter space for enclosing a filtering material or treatment material such as a filtering media or filtering element 478.

Figure 23:
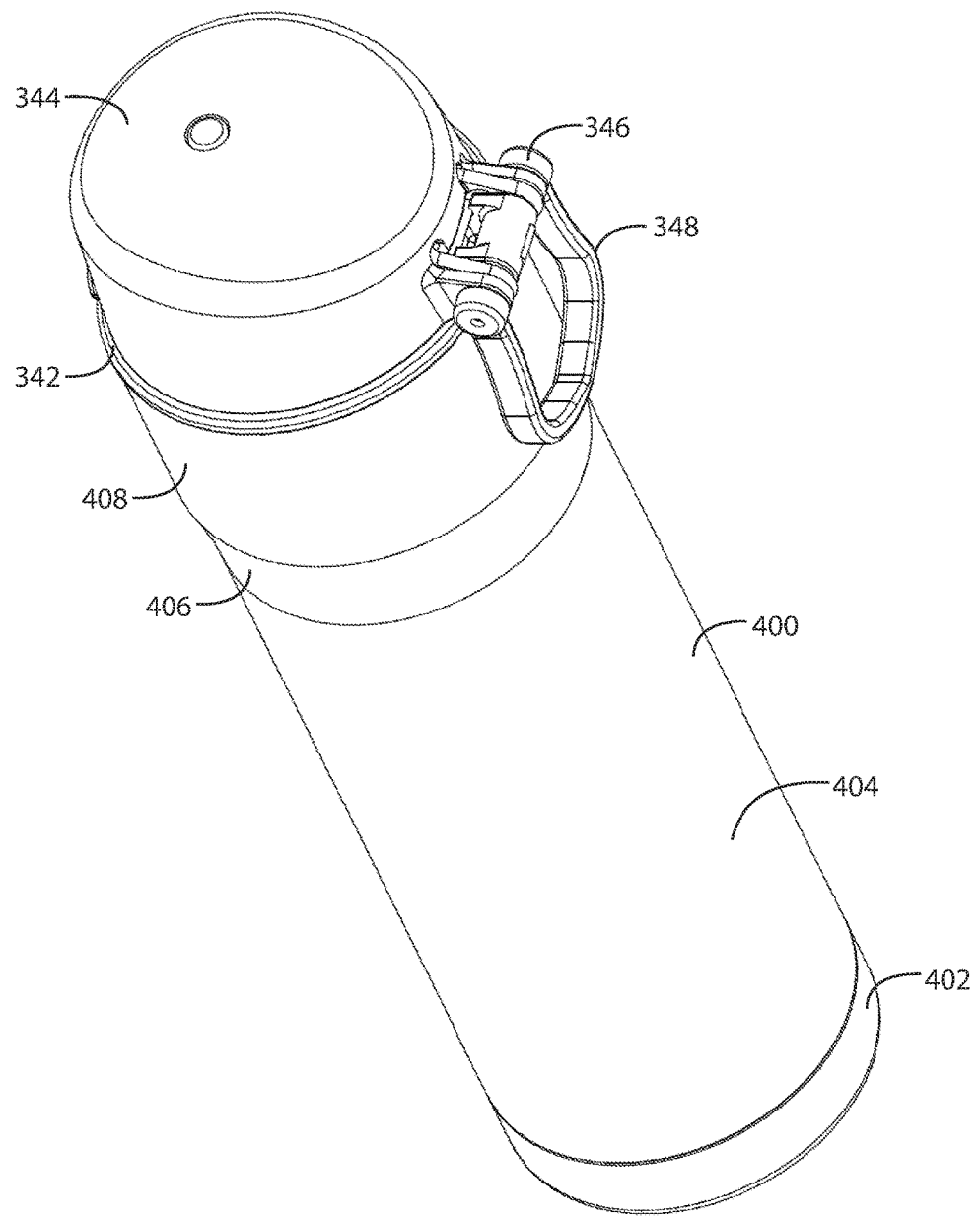
FIG. 23 is a top, back, side perspective view of yet another embodiment of a beverage treatment system.

FIG. 23 is an embodiment of the beverage filtering or treatment system and lid cover similar to the embodiment of FIG. 20, but which includes instead an insulated bottle system 400. The bottle system 400 includes a base 402 affixed to the bottle body 404. The bottle body 404 includes a taper 406 leading to an enlarged upper end 408. The bottle system 400 of this embodiment is a vacuum insulated bottle. The lid 342 and lid cover 344 are similar to the previously described embodiments and the description thereof is incorporated herein by reference.

Figure 24:
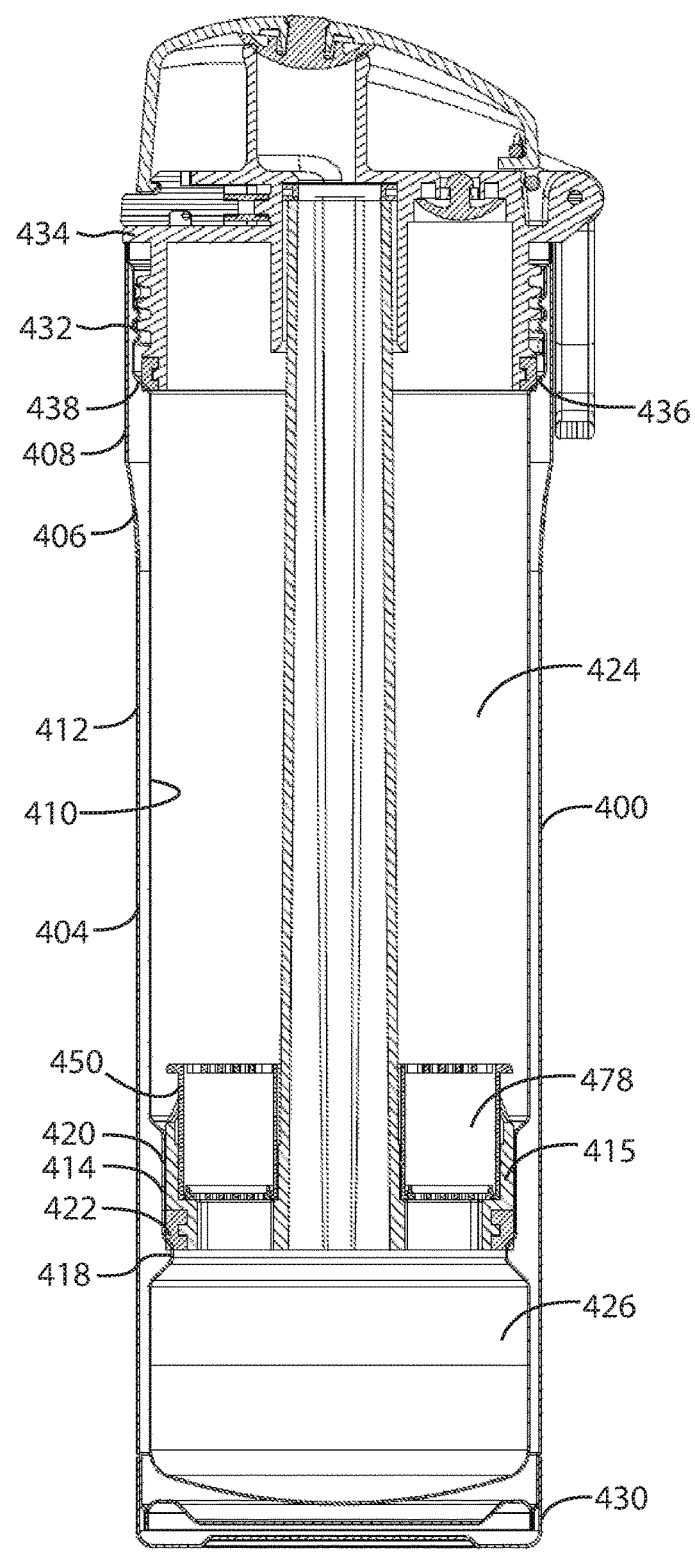
FIG. 24 is a cross sectional view of the beverage treatment system of FIG. 23 generally along the same section line C-C shown in FIG. 21, including a filter cartridge.

FIG. 24 shows the insulated bottle system 400 in cross section, revealing the double walled structure that provides the vacuum space for insulating the interior of the bottle system from the outside temperatures. In particular, an exterior wall 404 provides an outer surface for gripping by a user. The exterior wall 404 encloses an interior wall 410 that defines a beverage containing space and that is spaced from the exterior wall 404 by an insulating gap 412. The insulating gap 412 may be evacuated to form a vacuum or near vacuum in the space between the exterior and interior walls so as to provide thermal insulation from environmental temperatures for material within the bottle 400. The interior and exterior walls 410 and 404 are formed of stainless steel in a certain embodiments, although other materials are possible. In certain embodiments, the insulating gap 412 may also be filled with air, a gas, or an insulating material such as foam.

The steel interior wall 410 is not as readily formed with, for example, support fins to support the filter element within the bottle 400 as embodiments formed of more readily molded materials such as plastics, so the interior wall and the filter element may be configured a bit differently than other embodiments described herein. The interior wall 410 includes a first inwardly extended portion 414 within which a filter holder 415 and a filter cartridge 450 is mounted and a second inwardly extending portion 418 of a smaller interior diameter than the first inwardly extending portion 414. The second inwardly extending portion 418 provides a support for the filter holder 415 against which the filter holder 415 is positioned and is sealed. The filter holder 415 includes an outer wall portion 420 that fits into the space defined by the first inwardly extending portion 414. Preferably, the fit is snug without being so tight so as to prevent or inhibit the user from inserting and removing the filter holder 415 element from the bottle 400. The lower portion of the outer wall 420 includes a gasket 422 that is secured to the filter holder 415 by fitting onto a mounting rib on the outer wall portion 420. The gasket forms a seal between the filter holder 415 and the second inwardly extending portion 418 and is configured to prevent or reduce unfiltered beverage in an unfiltered beverage compartment 424 leaking into a filtered beverage compartment 426 without passing through a filter or treatment material 478 in the filter cartridge 450.

The insulated bottle 400 includes a base 430 that is affixed to the bottle 400 in the process of evacuating and sealing the insulating space 412. The insulating bottle 400 according to the illustrated embodiment includes interior threads 432 into which is threaded the lid 434 when the lid is engaged. The enlarged upper end 408 provides the increased diameter for the interior thread 432. The other elements of the filtering beverage bottle, including the filter holder, the transfer tube, the inner lid and outer lid cover, carry loop, and button release are sufficiently similar to those of other embodiments described herein that the person of skill in the art will understand their construction and operation without further description.

One difference is the addition of a gasket 436 mounted on a lower edge of the lid 434 to bear against an inwardly projecting surface within the inner wall 410. The gasket is configured to provide a seal between the lid and unfiltered beverage compartment 424.

Figure 25:
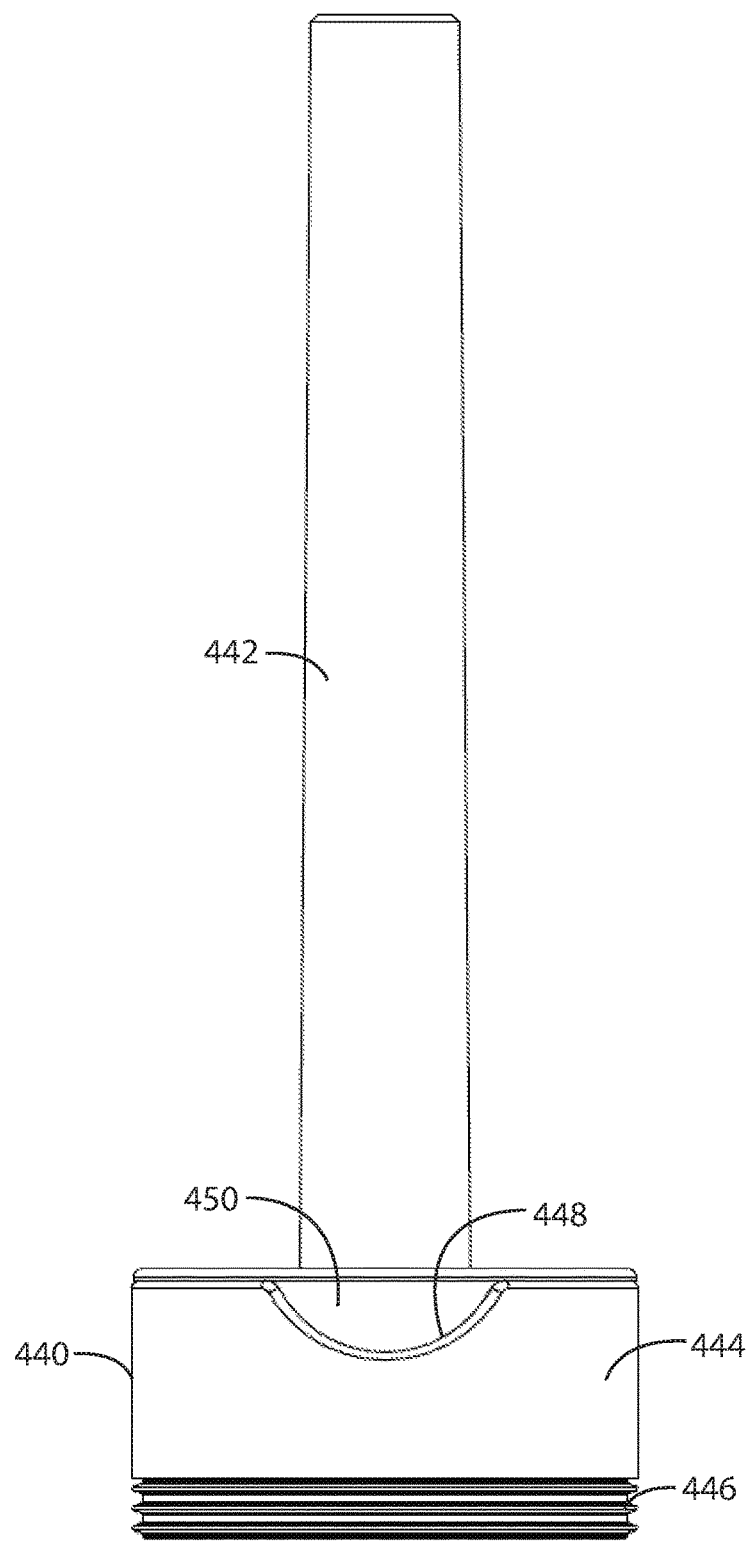
FIG. 25 is a side elevational view of a filter holder and transfer tube of a beverage treatment system.

FIG. 25 shows a filter holder 440 and transfer tube 442 according to an embodiment of the invention. The filter holder 440 includes an outer wall 444 configured to fit within a filtering beverage bottle. Gasket mounting rings 446 are provided about the lower portion of the outer wall 444. The gasket mounting rings 446 includes three parallel disposed rings onto which a gasket is mounted. Other embodiments may have more or fewer rings or even no such rings at all. The rings 446 or other gasket mounting structure is configured to ensure that the gasket stays in place and does not become dislodged and remain in the bottle.

The outer wall 444 includes a finger recess 448 that permits a user to grasp a filter cartridge 450 that is mounted within the filter holder 440. The finger recess 448 is preferably matched by a similar finger recess on the opposite side of the filter holder 440 so that the ring shaped filter cartridge 450 may be grasped for removal over the transfer tube 442. The transfer tube 442 of the illustrated embodiment is tapered from a narrower free end to a larger outer diameter bottom end at the filter holder 442, such that the filter cartridge 450 fits snugly on the transfer tube 442 and is configured to prevent or reduce leaks between the filter cartridge and the transfer tube.

Figure 26:
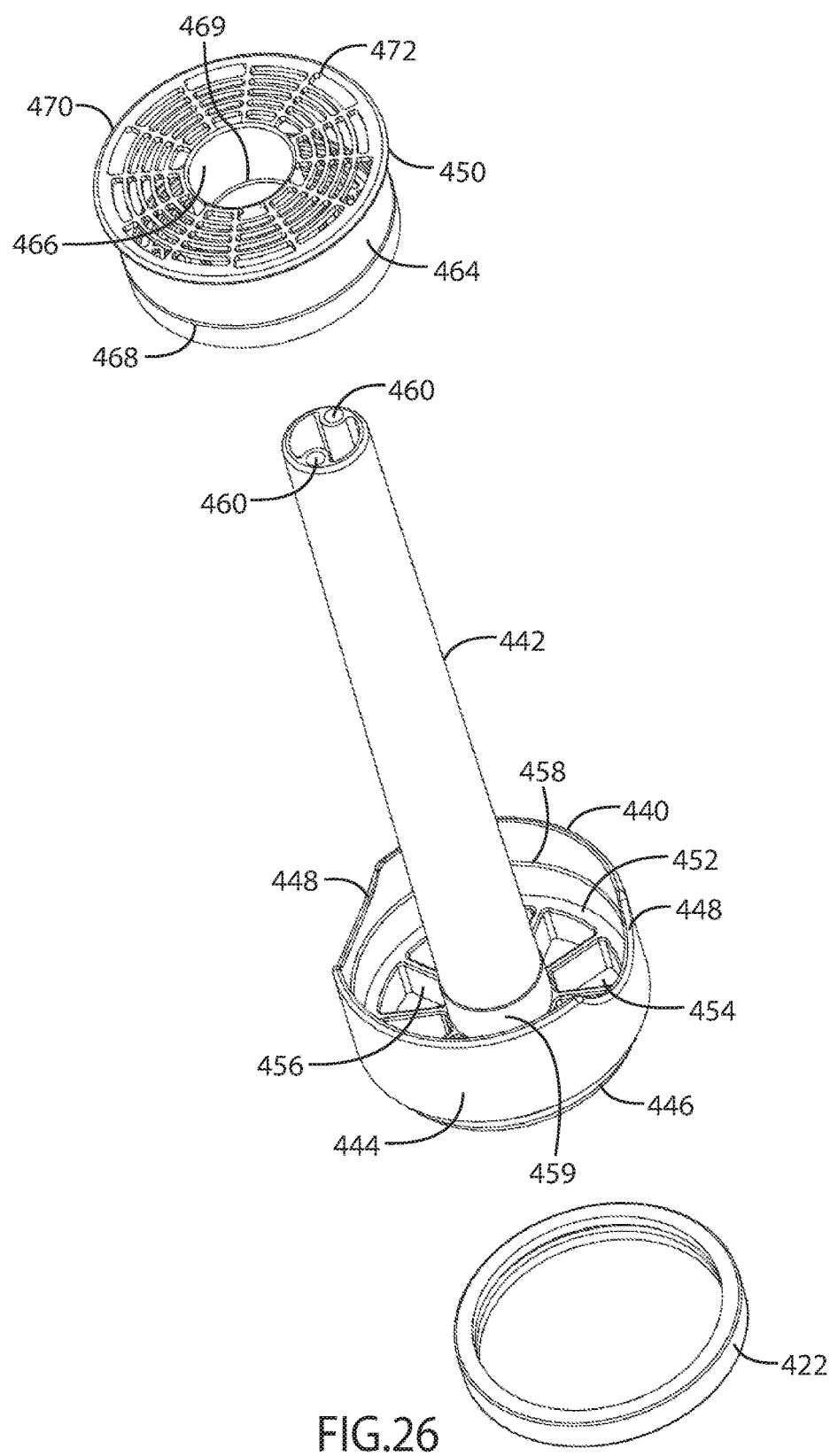
FIG. 26 is a top perspective exploded view of the filter holder and transfer tube of FIG. 25 and showing a filter cartridge.

In FIG. 26, the filter holder 440 is shown with the filter cartridge 450 removed. The filter holder 440 includes a bottom cartridge wall 452 on which the filter cartridge 450 rests when inserted into the filter holder 440. The bottom cartridge wall 452 includes a plurality of openings 454 through which filtered beverage passes after passing through the filter cartridge 450. The openings 454 are defined by segment walls 456 that extend between the transfer tube 442 and the outer wall 444. The interior of the filter holder 440 includes a step 458 extending inward from the outer wall that provides a decreased diameter portion for receiving the filter holder 450. A step 459 is also provided on the outside of the transfer tube 442 at its base. The steps 458 and 459 provide a fluid tight engagement between the filter holder 440 and the filter cartridge 450.

The transfer tube 442 of the illustrated embodiment includes two vent tubes 460 that vent air into the filtered beverage compartment as the user drinks the beverage from the filtered beverage compartment. It is possible to provide a transfer tube with only a single vent tube or with more than two vent tubes or with no vent tubes, all within the scope of the invention.

A gasket 462 is provided for sealing the filter holder against the interior of the bottle so as to provide a fluid tight seal between the unfiltered beverage compartment and the filtered beverage compartment. The gasket 462 is affixed to the filter holder 440 as noted with respect to FIG. 25.

The filter cartridge 450 is shown removed from the filter holder. The filter cartridge 450 includes hollow cylindrical housing having an outer cylindrical wall 464 and a generally central opening defined by an inner cylindrical wall 466. The outer cylindrical wall 464 includes a lip 468 projecting therefrom to bear against the step 458 within the filter holder 440. A lip 469 is provided projecting inwardly from the inner cylindrical wall 466 to seal against the step 459 on the transfer tube 442. A filter cover or cartridge cover 470 is affixed at the top of the filter cartridge 450. The filter cover 470 includes radial ribs and concentric circular ribs 472 that form an open grid work, referred to more generally as a perforate wall, through which beverage may flow from the unfiltered beverage compartment into the filter media. The filter cartridge 450 also has a lower perforate wall, which in the illustrated embodiment is also formed as an open grid work, to permit the beverage to flow from the filter media to the filtered beverage compartment. The filter cartridge 450 may enclose a unitary filter element or filter media or other filter material or treatment material in a filter space.

Figure 27:
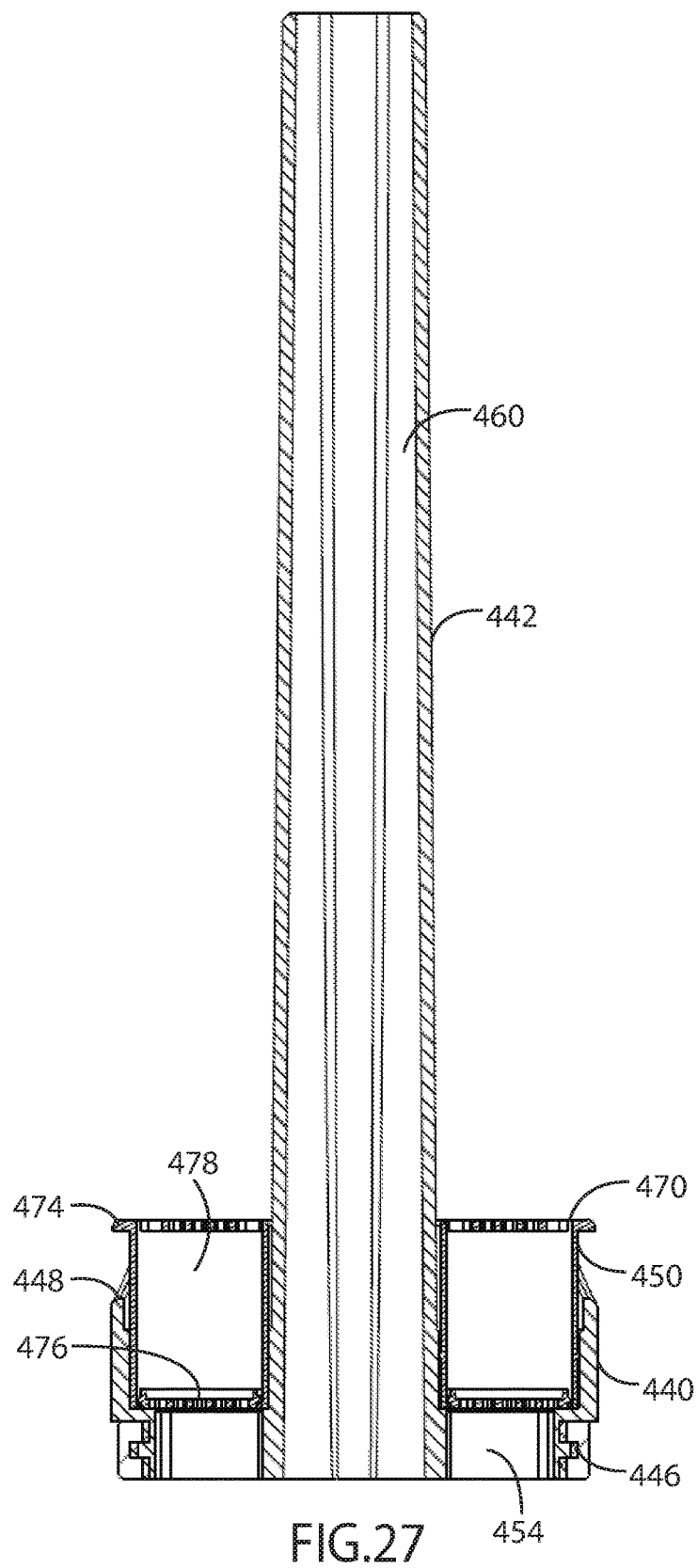
FIG. 27 is a cross sectional view along a vertical axis of the filter holder and transfer tube of FIG. 25.

With reference to FIG. 27, the filter cartridge 450 is mounted encircling the transfer tube 442 so that the cartridge forms a seal with the filter holder 440 and the transfer tube 442. The filter cartridge 450 includes an outwardly projecting rim 474 that may be engaged by a user at the recesses 448 for removing the filter cartridge 450 from its seated and sealed position in the filter holder 440. Not only is the filter cover 470 provided with openings to admit beverage to the filter cartridge 450, but the bottom 476 of the filter cartridge 450 is also provided with openings through which beverage may flow. The filter cartridge includes a hollow interior for holding filtering material 478.

The filtering material 478 may be a solid body or unitary shaped to fit into the filter space or media space of the cartridge, or the filtering material may be a loose material, such as a granular filtering material. The granular or loose material may be enclosed within a unitary covering. Any filtering material or combination of filtering materials may be provided in the filter cartridge, including for example carbon filtering material, fiber filtering material, membrane filtering material, woven or non-woven web filtering material, or other filtering materials. The filter material may be absorbent for selected contaminants in the beverage, may be reactive with contaminants or other materials in the beverage, may include a neutralizing agent or a catalyst, may include substances for release into the beverage, or a combination of these. The filter material may be biodegradable and/or the filter housing may be biodegradable. In certain embodiments, the filter housing is formed of a starch based material or an olefin.

The filter cartridge may be refreshed by replacing filtering material or filter element in the filter holder or may be refreshed by replacing the used filter holder with a new filter holder containing new filtering material. The filter cartridge preferably is configured to ensure that unfiltered beverage is unable to pass from the unfiltered beverage compartment to the filtered beverage compartment and is blocked from reaching the user's mouth when the user is drinking from the bottle. The measures which avoid the unfiltered beverage from reaching the user are useful for contaminated water supplies, for example. On the other hand, if the filter is being provided merely for improving the taste of an already clean water supply, it may be possible that some unfiltered water could reach the user with the filtered water without adversely affecting the perceived taste of the water by the user. As such, the scope of the present invention encompasses filters and filtering elements that may permit some leakage of unfiltered beverage into the filtered beverage.

The filter holder 440 of the illustrated embodiment includes a lower surface to which may be attached a grating or other means (not shown) for blocking course material from the filter element and from entering the transfer tube. The grating may snap on to the filter holder, thread on to the filter holder, or otherwise attach thereto. The grating may only extend across the opening to the transfer tube or may extend across the entire lower surface of the filter holder and the opening to the transfer tube to thereby block particles from contact with the filter element and from entering the transfer tube. For example, a user may desire to place a lemon slice or lemon wedge into the filtered beverage compartment, or may add pieces of fruit or other materials to add flavor to the beverage. The grating on the lower surface of the filter holder blocks seeds, pulp, rind, or other portions of the fruit from entering the transfer tube or from becoming lodged in the filter. The user may thus enjoy fruit flavored beverage without risk seeds or parts of the fruit becoming lodged in the transfer tube.

Figure 28:
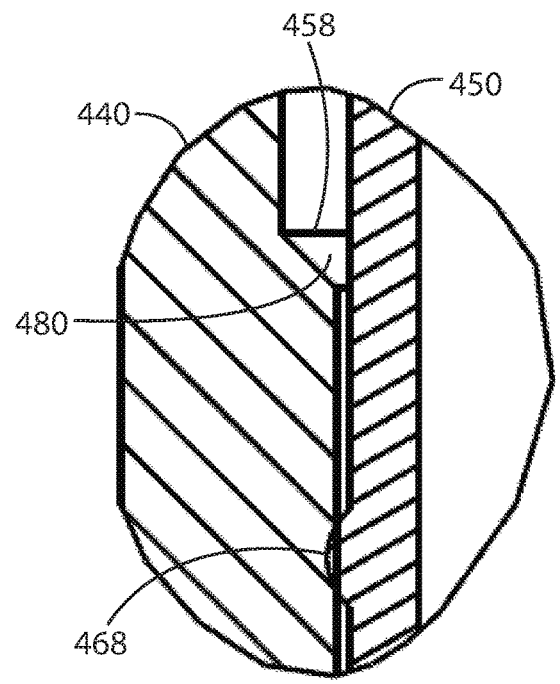
FIG. 28 is an enlarged fragmentary cross sectional view of an outer filter cartridge wall and inside surface of the filter holder of FIG. 27.

In FIG. 28, a detail of the seal between the filter cartridge 450 and the filter holder 440 is shown. The filter holder 440 includes the step 458 on the inside wall that decreases the inside diameter of the filter holder at the step. The filter cartridge 450 includes the projecting lip 468 that extends outwardly therefrom. The step 458 and lip 468 press against one another and form a fluid tight seal configured to prevent or reduce unfiltered beverage leaking into the filtered beverage compartment. The step 458 includes a narrow projection 480 at the top of the step 458. The projection 480 provides a further seal and cooperates with the lip 468 to secure the filter cartridge 450 in place.

Figure 29:
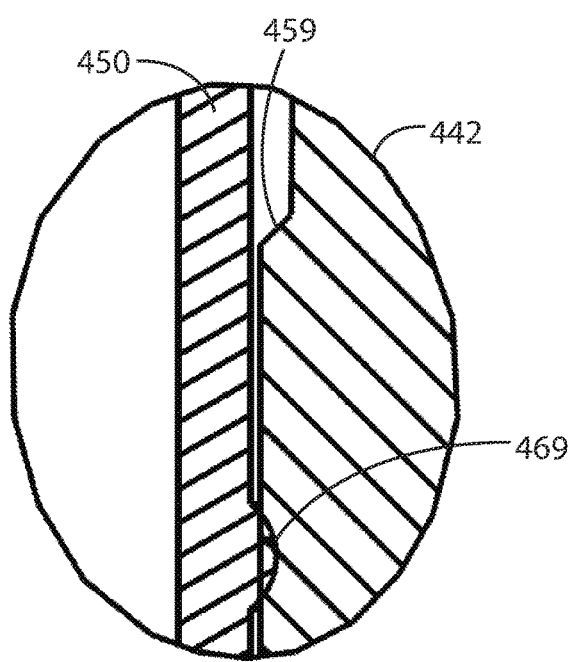
FIG. 29 is an enlarged fragmentary cross sectional view of an inner filter cartridge wall and outside surface of the transfer tube of FIG. 27.

FIG. 29 shows the step 459 on the transfer tube 442 and the inwardly projecting lip 469 on the filter cartridge 450. The step 459 and lip 469 for a fluid tight seal to prevent or reduce unfiltered beverage leakage into the filtered beverage compartment. The lip 468 and the lip 469 may be referred to interchangeably as first and second lips.

Figure 30:
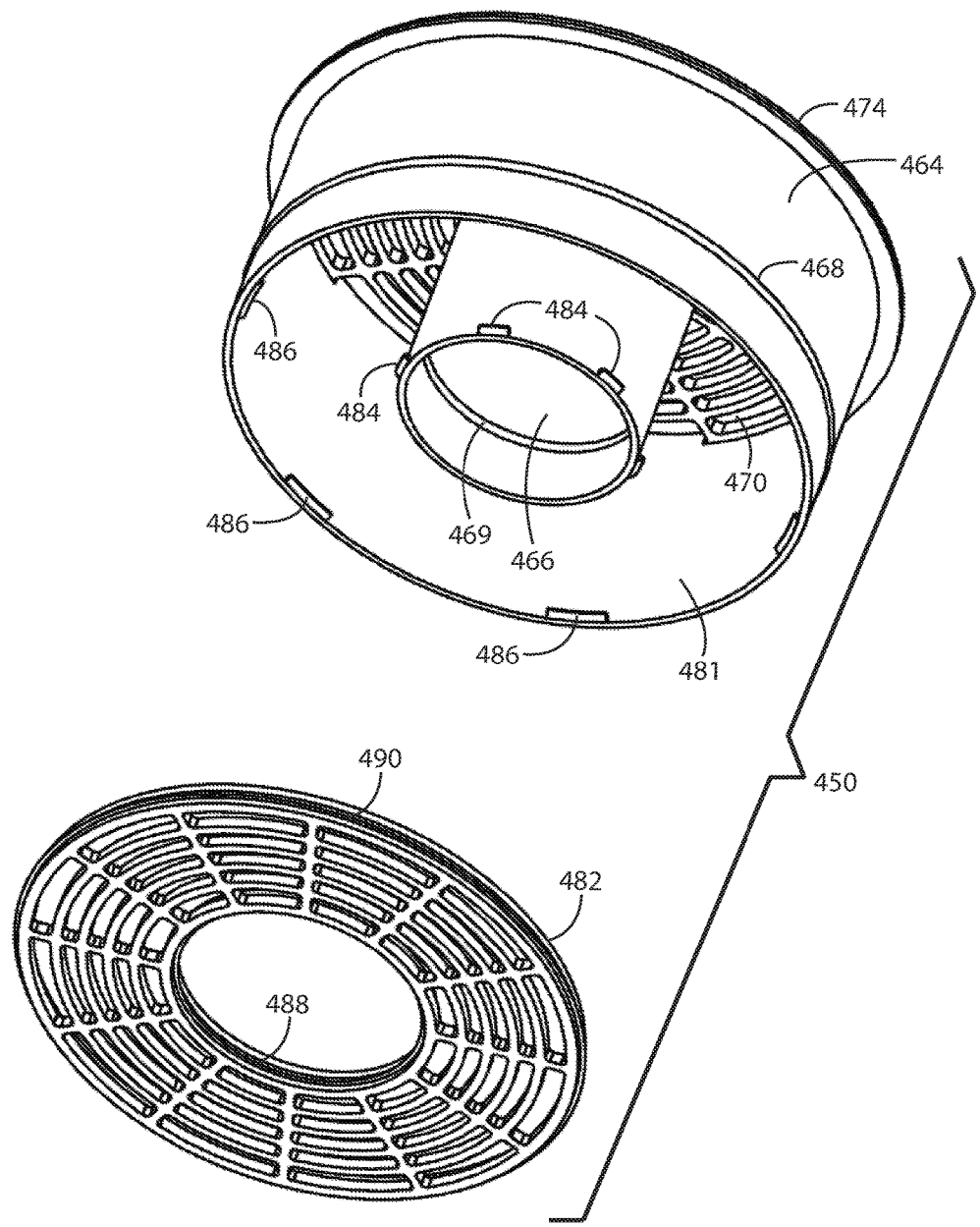
FIG. 30 is a bottom perspective view of a filter cartridge of FIG. 26 shown in an open condition.

The filter cartridge 450 is shown in greater detail in FIG. 30. In this view, the filter cartridge 450 is open to reveal an interior filter space 481, also referred to as a media space or filter space, for enclosing filter media, filter material, or a filter element or a treatment material. The filter cartridge 450 has the lip 468 on the outer wall 464 and the lip 469 on the inner wall 466. The grid work or first perforate wall of the top filter cover 470 is visible extending between the inner walls. The top filter cover 470 may be permanently affixed to the filter cartridge or may be removable therefrom by the user. The outwardly projecting rim 474 extends from the outer wall 464. The filter cartridge 450 has been opened by removing the lower filter cover 482. The outside of the inner wall 466 has a plurality of projecting tabs or projections 484 at its free end extending outwardly. The inside of the outer wall 464 includes a plurality of tabs or projections 486 at its edge extending inwardly. The tabs 484 and 486 extend into grooves 488 and 490 at the inner and outer edges of the lower filter cover 482 to secure the lower filter cover in place on the cartridge holder 450.

The bottom or lower filter cover 482 includes an arrangement of radial and concentric ribs to form and open grid work of beverage flow openings, or more generally a second perforate wall like those of the top filter cover 470, although it is within the scope of the disclosure that the arrangement of openings differ between the top and bottom filter covers. The open grid work of the top and bottom walls of the cartridge are provided as a regular arrangement of openings, although any perforate wall configuration may be provided within the scope of the present invention.

Figure 31:
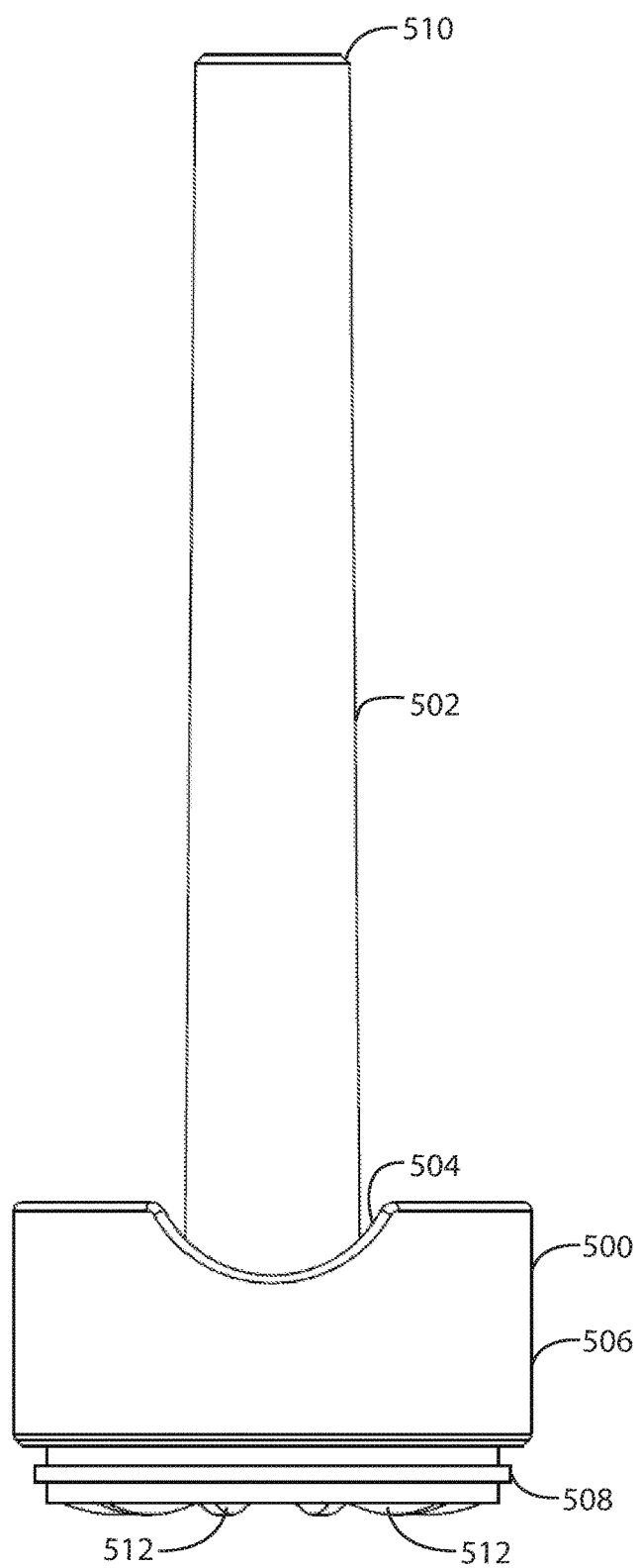
FIG. 31 is a side elevational view of a further embodiment of a filter holder and transfer tube.

Another embodiment of a filter holder 500 is shown in FIG. 31. The filter holder 500 includes a transfer tube 502 extending from the filter holder and finger recesses 504 formed in the outer wall 506 of the filter holder 500. The lower edge of the outer wall 506 includes a gasket mounting ring and recess 508. An upper end of the transfer tube 502 is beveled at 510. The lower end of the filter holder 500 includes projecting dividers 512. The dividers 512 project below the lower end of the other elements of the filter holder at a position between the inner and outer walls. This directs the flow and drips of beverage through the filter to the center of the filter element rather than at the inner or outer walls. The curved lower edges of the divider create a drip zone or drip line.

Figure 32:
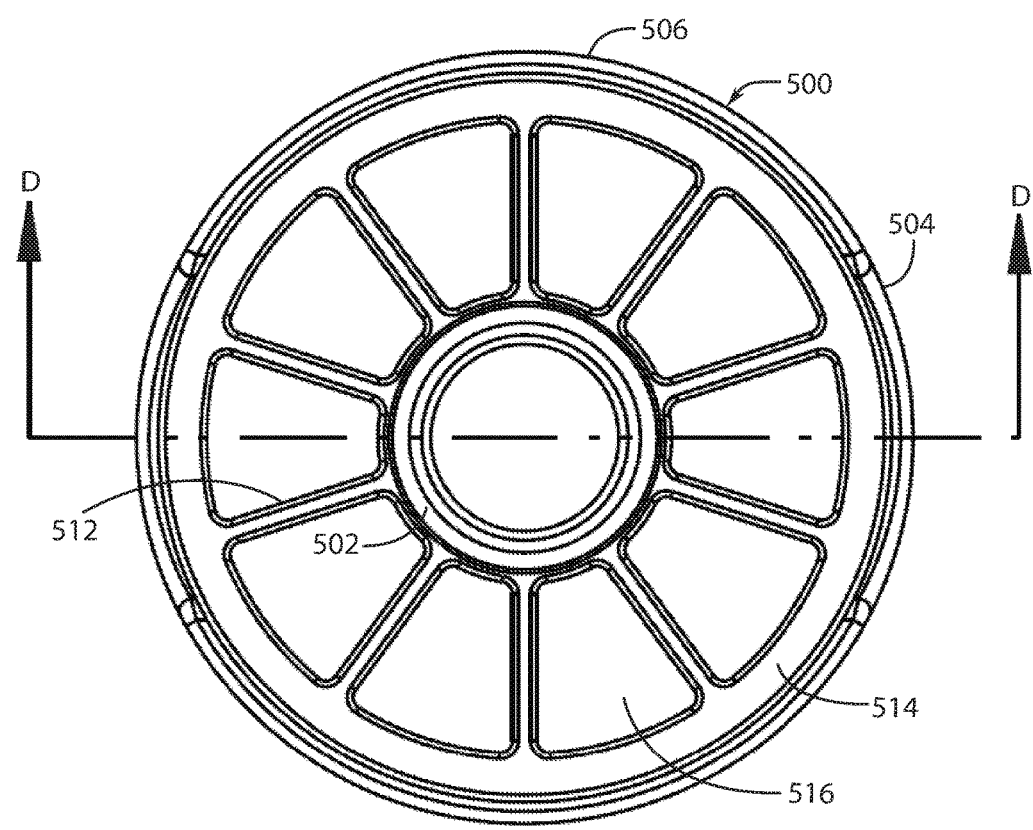
FIG. 32 is a top plan view of the filter holder and transfer tube of FIG. 31 showing section line D-D.

The filter holder 500 and transfer tube 502 is shown in FIG. 32 including the outer wall 506 with the finger grip recesses 504. The filter holder has a bottom wall 514 with openings 516 formed by the dividers or ribs 512 that extend between the centrally located transfer tube 502 and the outer wall 506. The transfer tube 502 of this embodiment lacks the vent channels provided in embodiments described hereinabove. In some embodiments, the vent tubes are unnecessary to vent air into the filtered beverage chamber.

Figure 33:
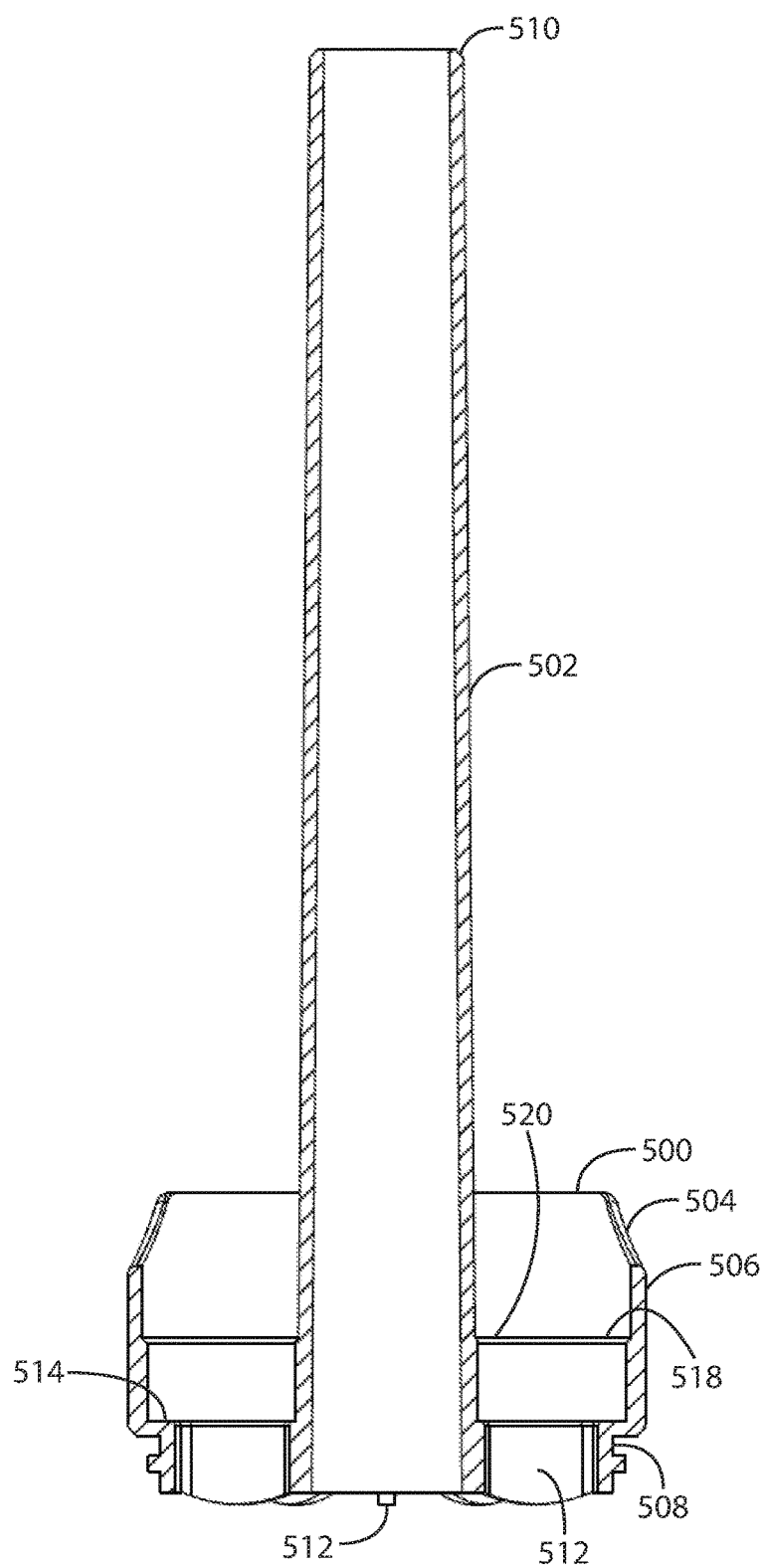
FIG. 33 is a cross sectional view of the filter holder and transfer tube of FIG. 31 along the section line D-D of FIG. 32.

The filter holder 500 is also shown in FIG. 33 wherein the interior of the filter holder has a step 518 extending inwardly from the outer wall 506 and a step 520 extending outwardly from the transfer tube 502. The channel 508 has a rib for holding a gasket onto the lower portion of the filter holder 500. The channel 508 extends inwardly from the outside wall of the filter holder 500 and the interior portion of the channel 508 forms a portion of the floor 514 of the filter holder.

Figure 34:
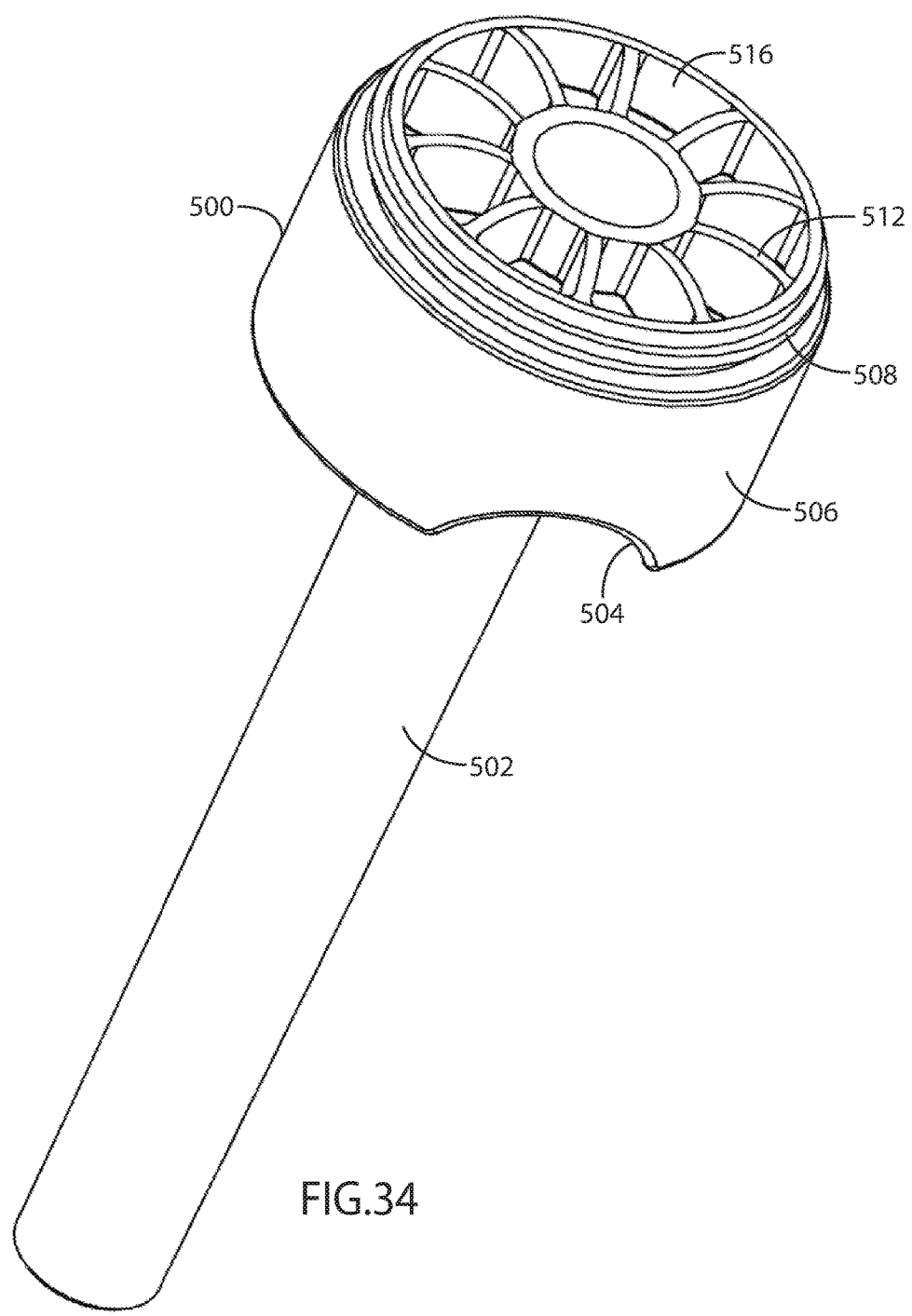
FIG. 34 is a bottom perspective view of the filter holder and transfer tube of FIG. 31.

FIG. 34 shows the curved ribs or dividers 512 that provide drip control in a drip zone for beverage flowing through the filter. Other shapes of ribs or dividers for drip control are within the scope of this invention.

Figure 35:
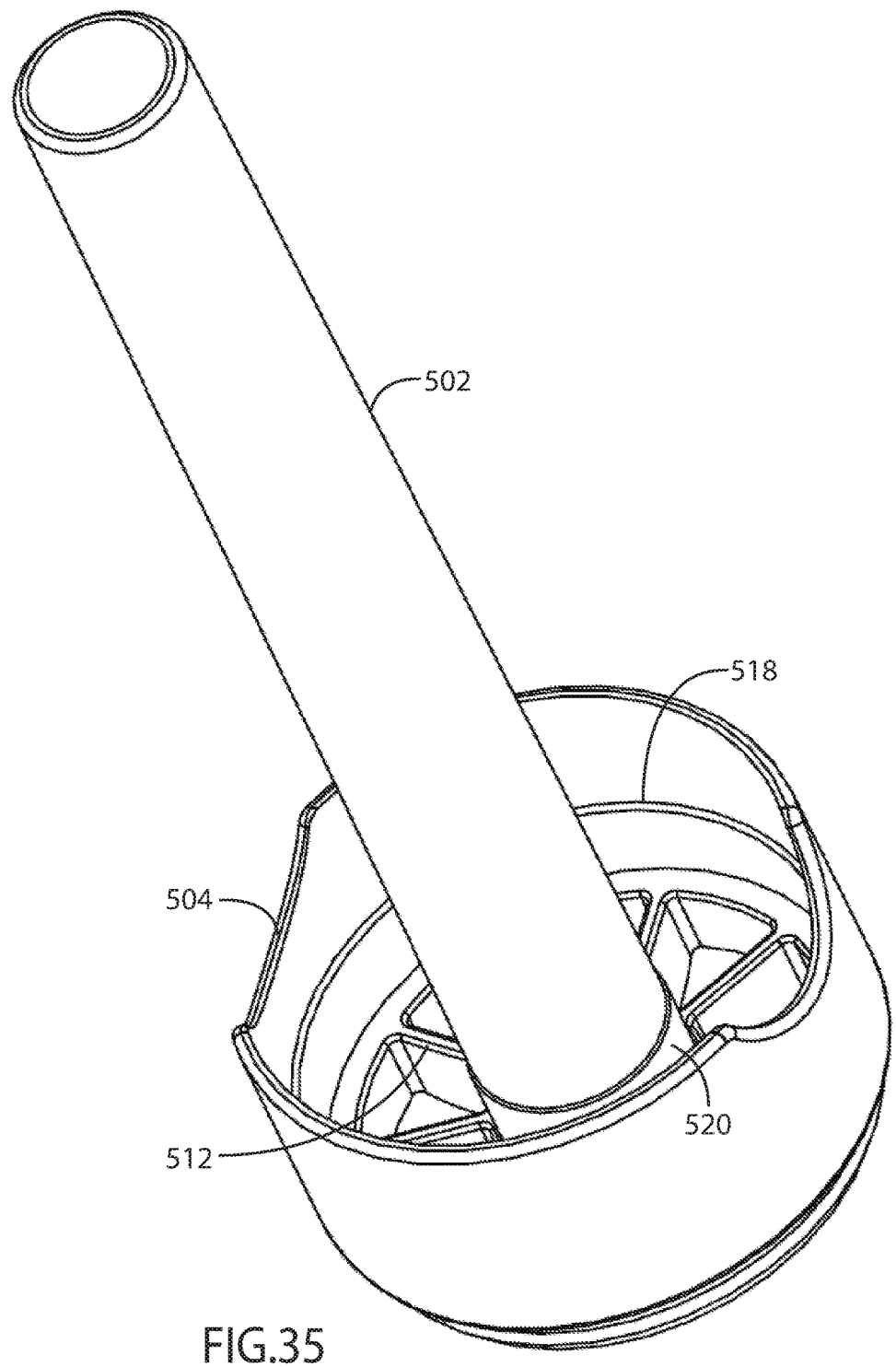
FIG. 35 is a top perspective view of the filter holder and transfer tube of FIG. 31.

In FIG. 35, the steps 518 and 520 that help to form a seal between the filter holder 500 and filter cartridge 450 are shown without the filter cartridge 450.

Figure 36:
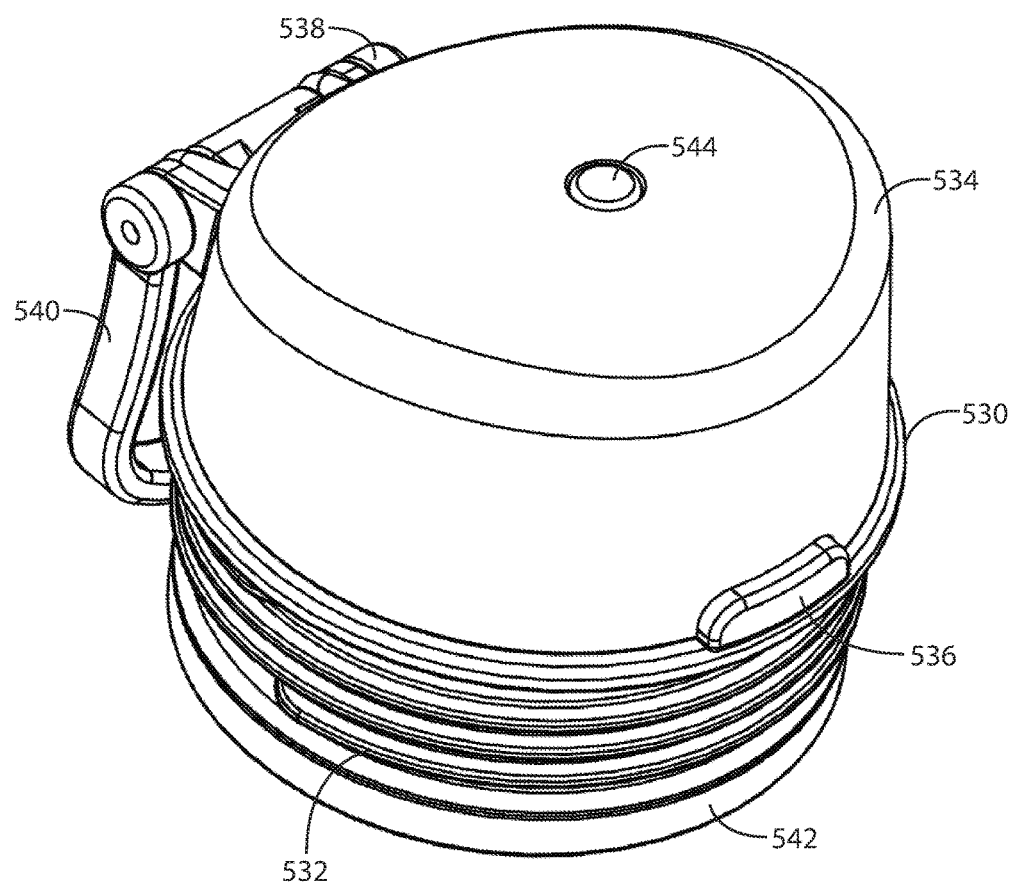
FIG. 36 is a top, side, front perspective view of an embodiment of a lid for a beverage treatment system.

A further embodiment of a lid 530 is shown in FIG. 36. The lid 530 includes a threaded base 532 that fits into an interiorly threaded bottle. It is of course possible to configure the lid for an exteriorly threaded bottle in this embodiment and others disclosed herein. The lid 530 includes a lid cover 534 that is selectively openable and closable by the user. The lid cover 534 has a release button 536 on the front surface for activation to open the lid cover 534 and a hinge 538 at the back. The hinge 538 is connected to a carry loop 540 that may pivot to a carry position or to a storage position as shown. The lower edge of the threaded base 532 is provided with a gasket 542 for sealing the lid on a bottle. A nozzle stopper 544 is affixed to the interior of the lid cover 534 and is visible at the top of the lid cover.

Figure 37:
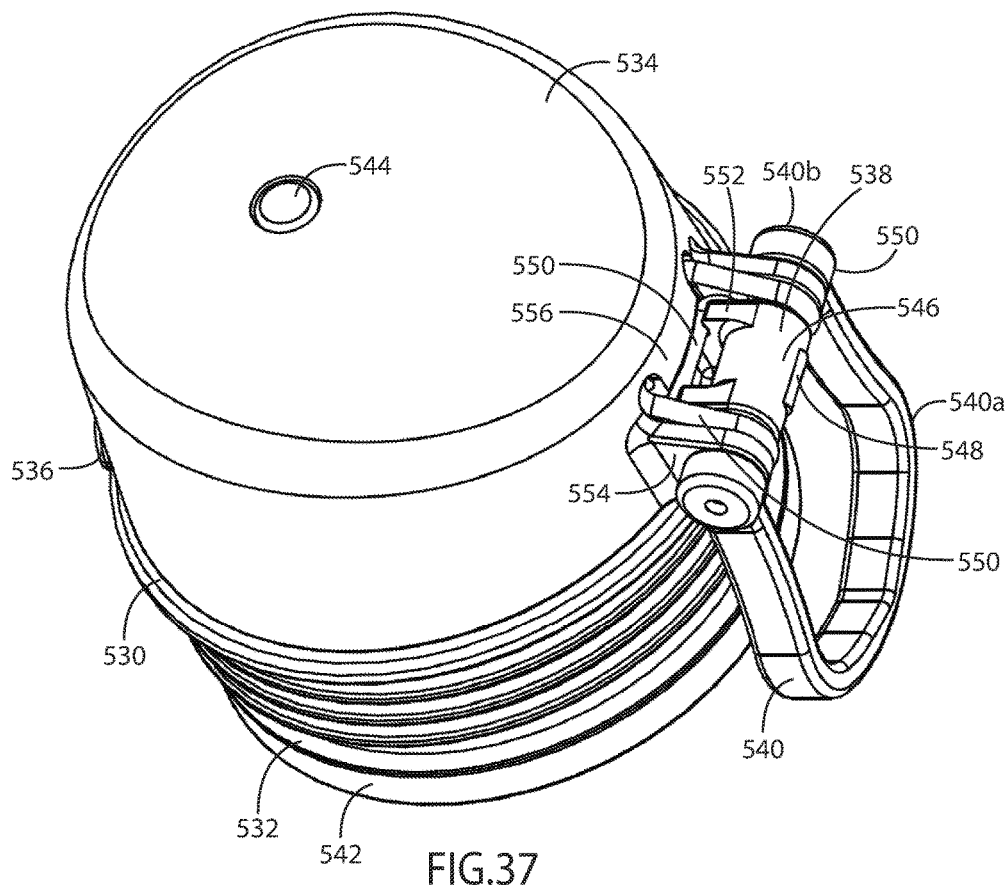
FIG. 37 is a top, side, back perspective view of the lid of FIG. 36.

In the view of the lid 530 of FIG. 37, the carry loop 540 is generally U-shaped and has its opposite ends connected to a hinge pin of the hinge 538 so that the user may pivot the carry loop 540 to an upwardly extending position for carrying the bottle or hanging the bottle on a hook or peg, for example. The carry loop 540 of the illustrated embodiment is wider at the loop end 540a than at the end portion 540b connected to the hinge 538. Other shapes are of course possible. A barrel or center portion 546 of the hinge 538 has a raised rib 548 positioned to contact a portion of the lid cover 534 when the lid cover is in the fully open position so as to retain the lid cover in the fully open position, such as when the user is drinking from the bottle. The raised rib 548 permits the lid cover to be moved to the fully open position or moved from the fully open position using only a small force by the user.

The hinge 538 also includes an O-ring spring 550 that biases the lid cover to either an open or closed position. The O-ring spring 550 is held by spring hooks 552 that extend from the barrel 546 of the hinge 538 to hold one portion of the O-ring spring to the lid 530. A second portion of the O-ring spring 550 extends about the hinge 538 and engages the lid cover 534. The second portion of the O-ring spring 550 is held in the lid cover by an O-ring catch 556 in the lid cover. The O-ring spring 550 is nearly doubled back on itself after passing around the hinge 538 when the lid cover 534 is in the closed position. The hinge 538 includes a hinge connector 554 connected between the lid cover 534 and the hinge 538.

Figure 38:
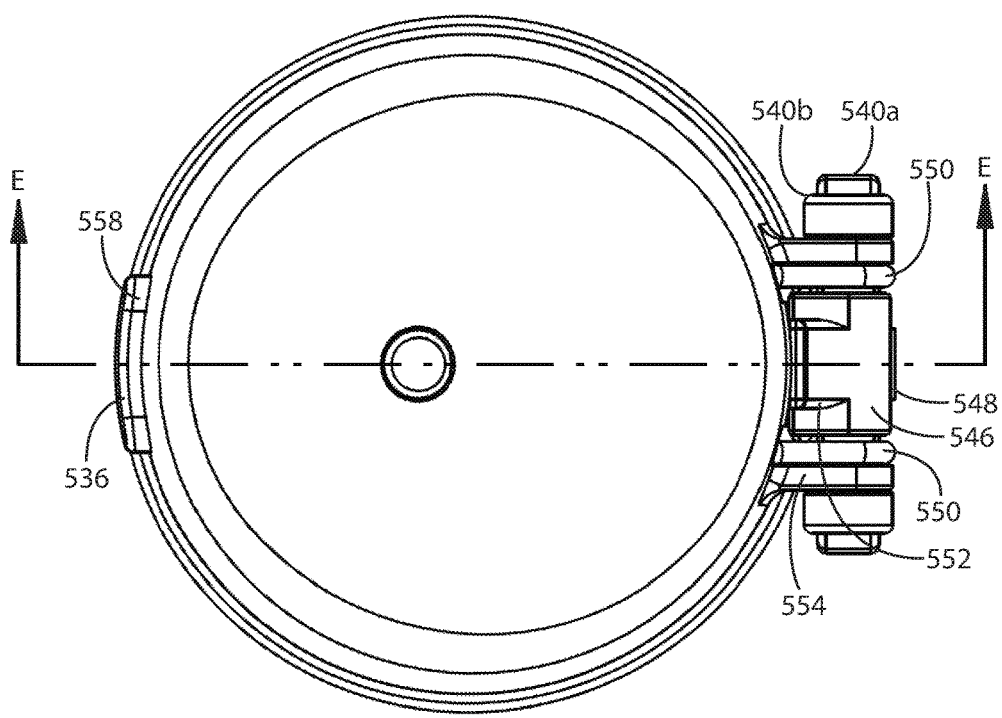
FIG. 38 is a top plan view of the lid of FIG. 36 showing section line E-E.

Turning to FIG. 38, the button 536 includes a curved outer end 558 to be pressed by a user. The hinge 540 has the ends 540b of the carry loop 540 inwardly of the wider loop portion 540a of the carry loop.

Figure 39:
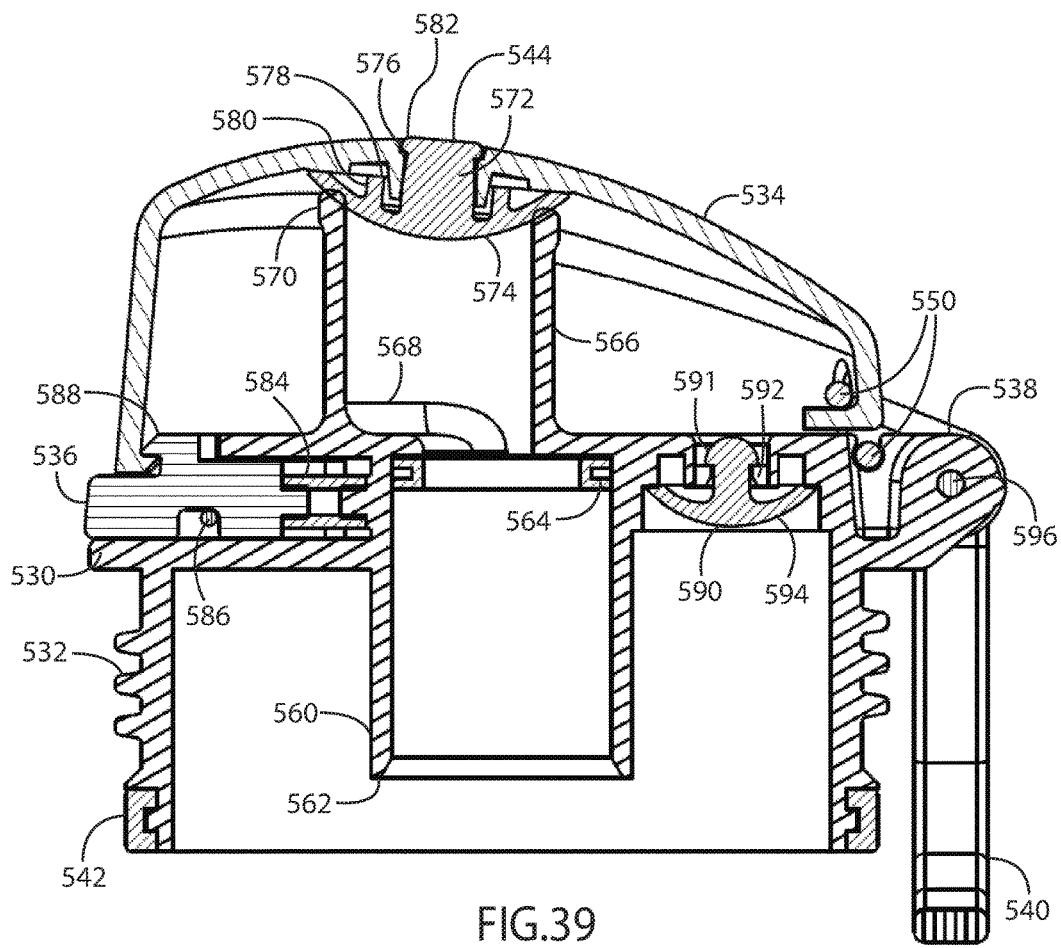
FIG. 39 is a cross sectional view of the lid of FIG. 36 taken along the section line E-E shown in FIG. 38 and showing the lid cover in a latched position.

The cross sectional view of FIG. 39 shows the lid 530 and the lid cover 534 connected by the hinge 538. The lid 530 has the gasket 542 at the lower edge of the threaded portion 532. Within the interior of the lid 530 is a transfer tube receiving sleeve 560. The sleeve 560 fits onto the end of the transfer tube when the lid 530 is affixed to a bottle having the filter assembly. The lower end 562 of the sleeve 560 includes an inwardly angled bevel to guide the transfer tube into place. A gasket 564 is mounted within the sleeve 560 to provide a seal between the lid 530 and the transfer tube. The lid 530 includes a nozzle 566 that is in fluid communication with sleeve 560. The sleeve 560 is centered on the longitudinal axis of the bottle so that the transfer tube may slide into the sleeve 560 as the lid 530 is threaded into place on the bottle.

The lid 530 includes a nozzle 566 that is in fluid communication with sleeve 560. The nozzle 566 of the illustrated embodiment is offset from the center of the lid 530. The offset results in a contoured interior surface 568 within the nozzle 566. The upper end of the nozzle 566 includes an enlarged rim 570 at its upper end configured for the user's comfort during drinking. The upper end or rim 570 of the nozzle 566 is sealed by the nozzle stopper 544 that has a center post 572 fastened into an opening 576 in the lid cover 534. The nozzle stopper 544 includes a domed end 574 affixed to the center post 572 that curves into engagement with the interior of the lid cover 534. The domed end 574 seals against the rim 570 of the nozzle 566 and is configured to prevent or reduce fluid leakage from the nozzle when the lid cover 534 is closed. The opening 576 in the lid cover has an interior extension 578 that extends along the center post 572 and the domed end 574 has a skirt portion 580 that extends toward the interior of the lid cover 534. A recess is formed in the interior of the lid cover where the skirt 580 is provided. The end of the center post 572 opposite the domed end 574 includes a radial enlargement 582 that fits into a corresponding enlargement in the opening 576, thereby securing the nozzle stopper 544 in the lid cover 534.

In embodiments with a nozzle offset from the axis of the bottle, it is possible to provide an offset transfer tube and offset nozzle. The offset nozzle and transfer tube is maintained on its offset position relative to the bottle and is secured in place by a rotating collar that secures the offset nozzle to the bottle without the nozzle and transfer tube being rotated as it is attached and detached. Rotating collars on non-rotating lid and lid cover elements are known in the art and are not disclosed further here.

The latch button 536 slides in a button channel in the lid 530. The interior end of the button channel includes a resilient spring 584 that biases the button toward a latched position. The resilient spring 584 of certain embodiments is a rubber tube. The button 536 has a retaining pin 586 that prevents or inhibits the button 536 from coming out of the button channel during use and that restricts the movement of the button 536. A catch nose 588 on the button 536 engages a catch projection on the interior of the lid cover 534 to secure the lid cover in the closed position and permit the user to release the lid cover by pushing the button 536.

An umbrella seal 590 is fastened into the lid between the sleeve 560 and the hinge 538. The umbrella seal 590 has a central post with a catch projection 591 secured into an opening in the lid 530. The opening includes inwardly projecting portions 592 engaging the catch projection 591 so as to secure the umbrella seal in place while also form air flow passages so that air may flow through the opening past the central post. The umbrella valve 590 includes a flexible domed portion 594 with an outer perimeter in contact with an interior of the lid 530. The umbrella valve 590 operates as a one-way flow valve; the flexible domed portion flexing away from the lid 530 to permit air to flow into the interior of the bottle when the pressure within the bottle drops, for example, as the user drinks from the bottle, but pressing against the interior of the lid 530 to seal and prevent or reduce fluid from escaping the bottle.

The O-ring spring 550 includes a first portion fastened within the lid cover 534 and a second portion fastened to the lid 530. The hinge pin 596 at the center of the hinge 538 provides the pivot axis for the lid cover 534 and the carry loop 540.

Figure 40:
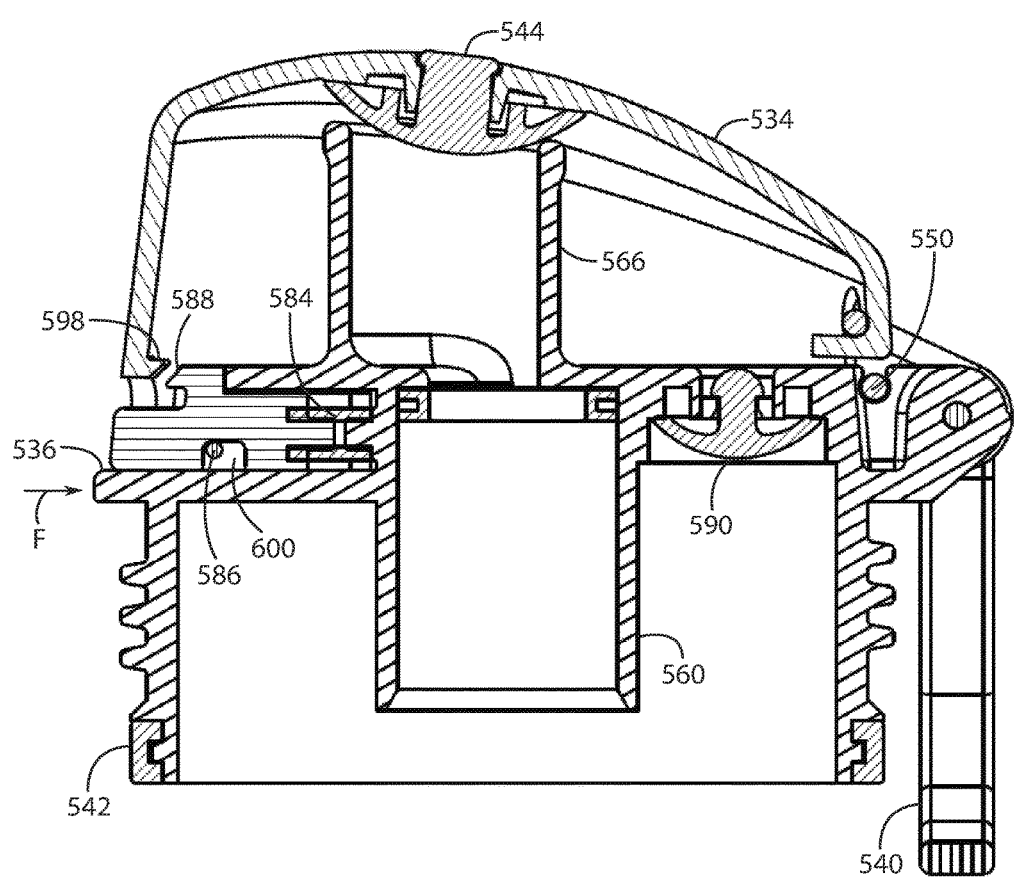
FIG. 40 is a cross sectional view similar to FIG. 39 showing the lid cover in an unlatched position.

FIG. 40 shows the view of FIG. 39, except that the button 536 has been pressed by a force F to slide the button 536 into the button channel by overcoming the biasing force of the spring 584. The button 536 does not remain in the illustrated position without continued exertion of the force F. By moving the button 536 to the release position as shown, the catch nose 588 is moved from engagement with the projection 598 on the interior of the lid cover 534 to release the lid cover. The nozzle stopper 544 bearing on the nozzle 566 results in the lid cover opening to a partially open position as shown. The inward movement of the button 536 is limited by the retaining pin 586 in the retaining pin recess 600 formed in the button. The button of FIG. 40 is at its inward movement limit. The sloping surfaces of the projection 598 and the catch nose 588 permit the lid cover 534 cause the button to slide inward during closure of the lid cover 534 and the spring 584 causes the button 536 to snap to an engaged position once the lid cover is in the fully closed position.

Figure 41:
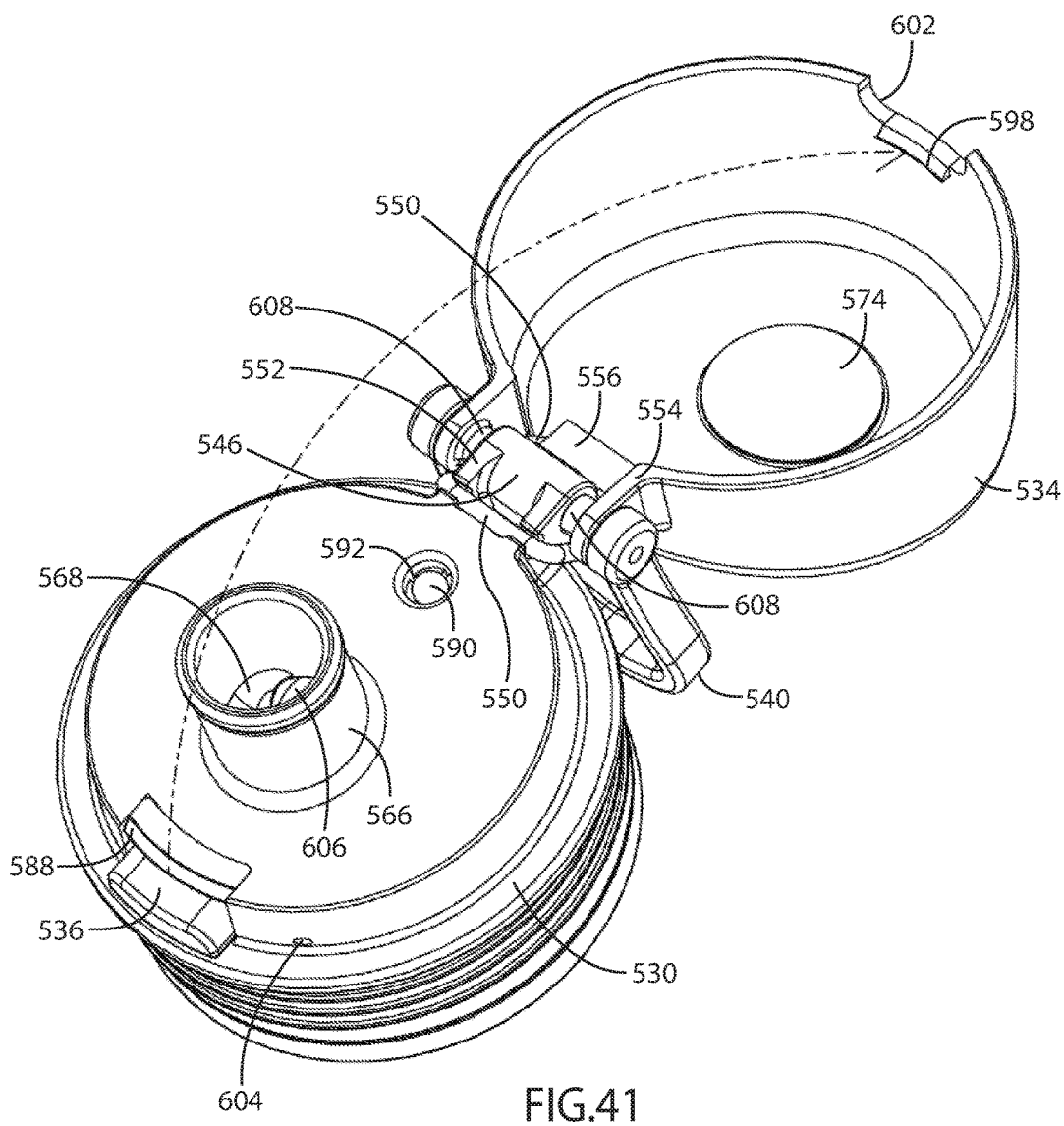
FIG. 41 is a top side perspective view of the lid of FIG. 36 showing the lid cover in an open position.

The lid cover 534 is shown in the fully opening position in FIG. 41. The lid cover 534 has the nozzle stopper 574 that fits onto the open end of the nozzle 566 when the lid cover is closed but which remains with the lid cover 534 when the lid cover is open to permit the user to drink from the nozzle 566. The projection 598 in the lid cover 534 that engages the catch nose 588 on the button 536 is disposed at a recess 602 in the lid cover. The recess 602 fits over the button 536 when the lid cover 534 is closed. The button retaining pin 586 is held in the lid 530 at a retaining pin hole 604.

Within the nozzle 566, the contour 568 can be seen that shapes the liquid flow path from the nozzle interior to the sleeve opening 606 in the sleeve 560. The umbrella seal 590 in the opening in the lid 530 is held by the inwardly extending projections 592.

At the hinge 538, the O-ring spring is held in the spring hooks 552 at opposite ends of the hinge barrel 546. Between each end of the hinge barrel 546 and the respective lid cover to hinge connector 554 is provided an O-ring channel 608. The O-ring 550 is disposed in the O-ring channel 608 when the lid cover is closed but unwraps from the O-ring channel 608 when the lid cover 534 is open. The O-ring catch 556 in the lid 534 holds the opposite side of the O-ring spring 550 from that held in the spring hooks 552 in the lid 530.

Figure 42:
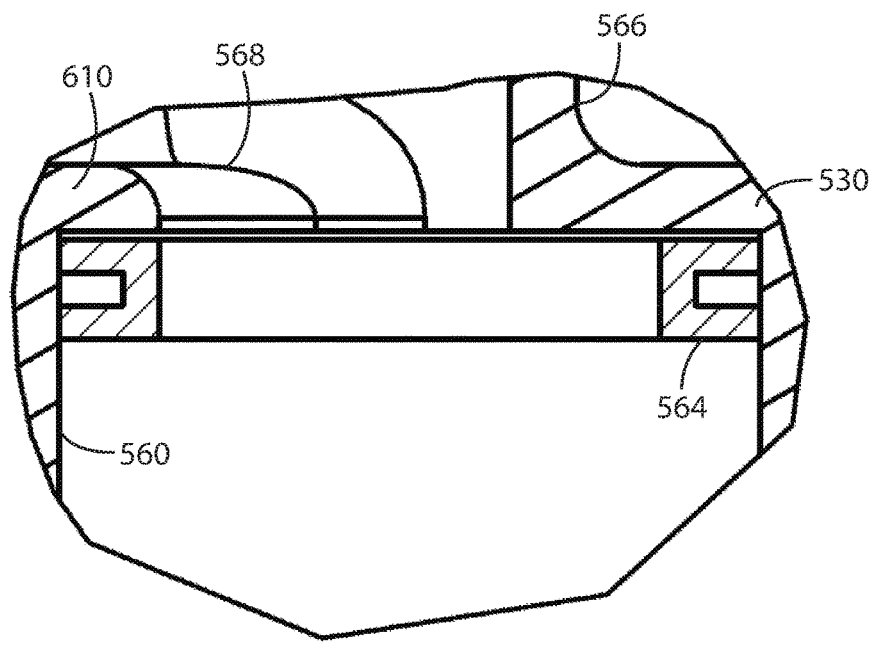
FIG. 42 is an enlarged fragmentary cross sectional view showing a gasket within the lid of FIG. 36 that forms a seal between the lid and a transfer tube of a filter holder.

FIG. 42 shows the gasket 564 within the sleeve 560 for receiving the end of the transfer tube. The gasket is seated against a gasket seat 610 formed at the end of the sleeve 560. As noted above, the nozzle 566 is offset relative to the sleeve 560. The gasket seat 610 extends into the flow path between the sleeve 560 and the nozzle 566 at one side of FIG. 42 whereas the offset between the nozzle and sleeve form the gasket seat at the other side. The contour lines 568 that indicate the curved surfaces between the sleeve 560 and nozzle 566 are apparent in FIG. 42.

Figure 43:
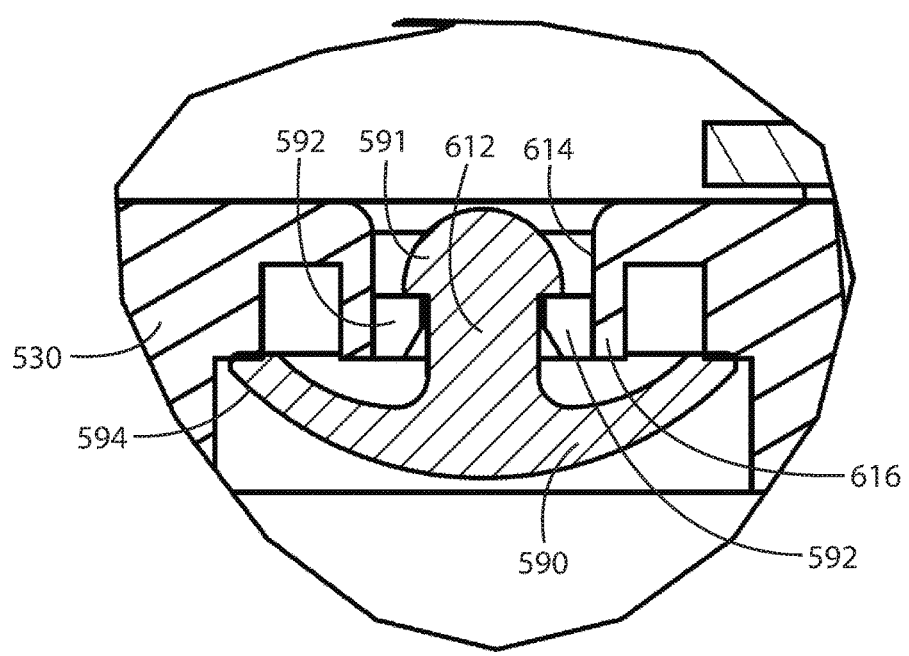
FIG. 43 is an enlarged fragmentary cross sectional view showing a vent valve in the lid of FIG. 36.

In FIG. 43, the umbrella valve 590 that vents air into the bottle is seen in greater detail. The umbrella valve stem 612 and the catch projection 591 are smaller than the opening 614 in which the umbrella valve 590 is mounted. Only the projections 592 extend into the opening to engage the umbrella valve step 612 and catch projection 591. An airflow gap is thereby provided about the stem 612. A collar 616 is provided about the opening 614 from which the projections 592 extend. An annular recess 618 is formed into the lid 530 outside of the collar 616. The sealing portion 594 of the umbrella valve 590 seats against the lid 530 beyond the annular recess 618.

Figure 44:
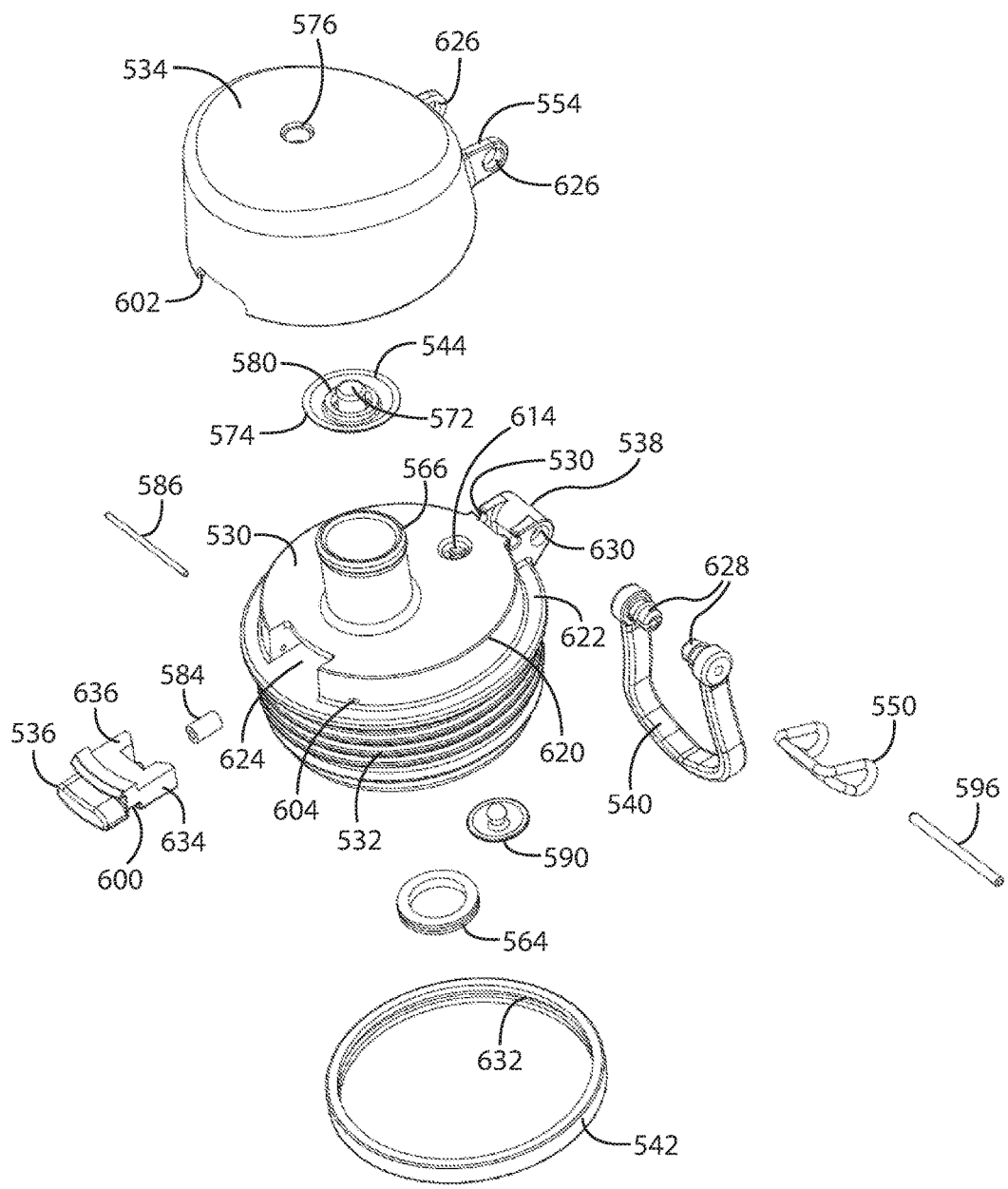
FIG. 44 is an exploded perspective view of the lid of FIG. 36.

The elements of the lid are shown in FIG. 44 including the lid body 530 with its offset nozzle 566, umbrella valve opening 614 and hinge 538. The upper interior portion of the lid 530 includes a raised portion 620 below which extends a collar 622 that is above the threaded portion 532. The button tunnel 624 extends into the raised portion 620. The lid cover 534 extends over the raised portion 620 when closed so that only the collar 622 is visible when the lid is threaded into a bottle and the lid cover 534 is closed.

The lid cover 534 has the recess 602 for the button 536, the opening 576 for the nozzle stopper 544, and the lid cover to hinge connectors 554 extending from the back. The lid cover to hinge connectors 554 have relatively large pivot openings 626 into which extend pivot connectors 628 on the carry loop 540. The hinge 538 on the lid body 530 also includes relatively large pivot openings 630 into which fit the pivot connectors 628 on the carry loop 540. The pivot connectors 628 of certain embodiments have longitudinally extending slots and include two peripheral engagement rings so that the connectors can compress and deform so as to fit into the pivot openings 626 and 630 and are held there by the rings engaging into corresponding channels in the lid and lid cover. The hinge pin 596 extends into a central opening in the pivot connectors 628 and thereby prevents or inhibits the pivot connectors from compressing and thereby being released from the hinge 538. The pin 596 provides a secure engagement of the lid, lid cover, and carry loop at the hinge 538.

The O-ring spring 550 is shown it its deformed state as it would appear wrapped in the O-ring channel of the hinge as a result of a first portion held by O-ring hooks in the lid 530 and a second portion being held in the O-ring catch in the lid cover 534. In a relaxed state, the O-ring is substantially circular. When mounted in the present lid, the O-ring exerts a tension force between the lid 530 and lid cover 534.

The gasket 542 that seals between the interiorly threaded bottle and the lid 530 includes an interior channel 632 that fits onto a rib of the lid 530 to hold it in place. The gasket 564 that mounts into the interior of the sleeve 560, by contrast, includes an exterior channel. The umbrella valve 590 is shown below the lid 530.

The button 536 includes a button body 634 that extends into the button channel 624. The button body 634 has legs 636 defining a spring receiving gap into which is mounted the compression spring 584. The button retaining pin 586 that fits into the pin opening 604 in the lid 530 and that holds the button 536 in place by being engaged in the notch 600 is shown. As noted above, the nozzle stopper 544 includes a central stem 572, an annular skirt 580 and an outer portion 574.

Figure 45:
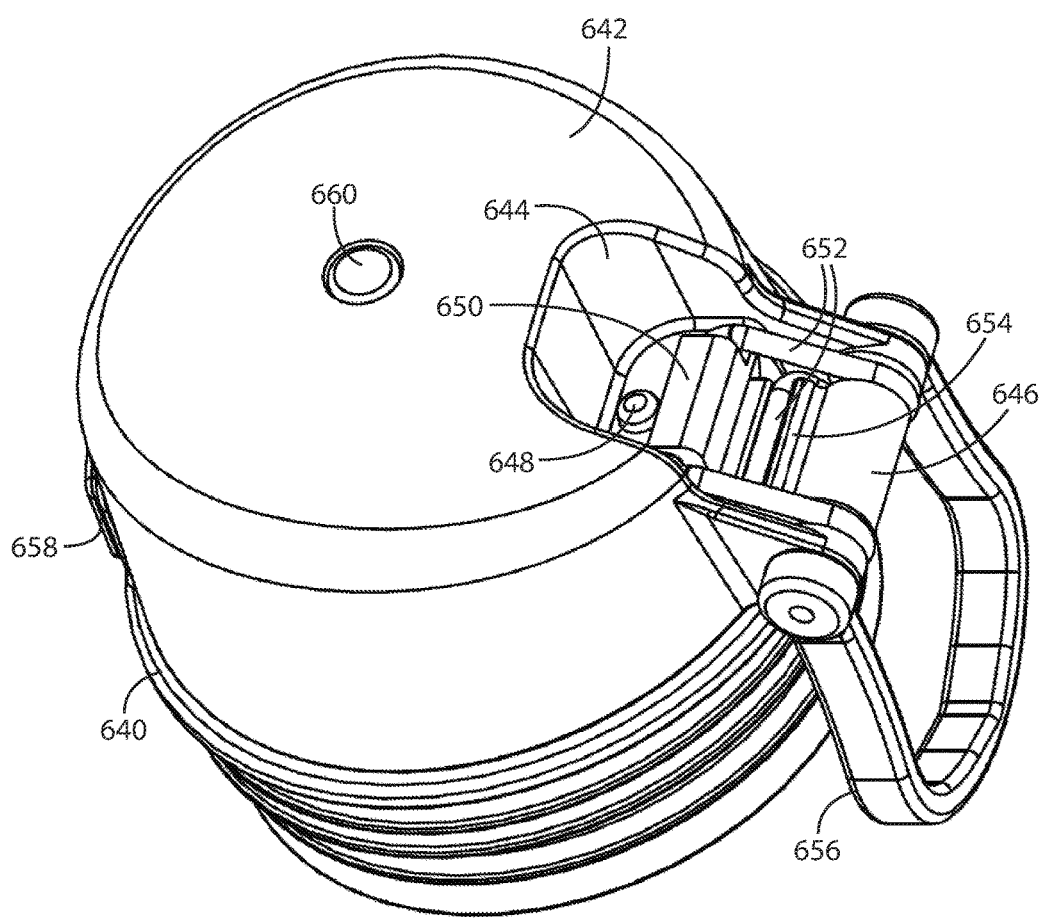
FIG. 45 is a top, back, side perspective view of another embodiment of a lid for a beverage treatment system.

A further embodiment of a lid is disclosed in FIG. 45. For the sake of avoiding repetition, only those portions that differ from the above-described embodiment will be mentioned in detail. For features that are common between the two embodiments, or nearly so, reference is made to the foregoing description. A lid 640 has a lid cover 642 with a recess 644 formed adjacent the hinge 646. The recess 644 has mounted therein a vent seal 648. An O-ring clip 650 engages one side of an O-ring 652. The O-ring wraps around the hinge 646 when the lid 642 is in the closed position. The opposite side of the O-ring 652 is secured in an O-ring hook 654 in the lid 640. A carry loop 656 and button 658 are provided, as is a nozzle stopper 660.

Figure 46:
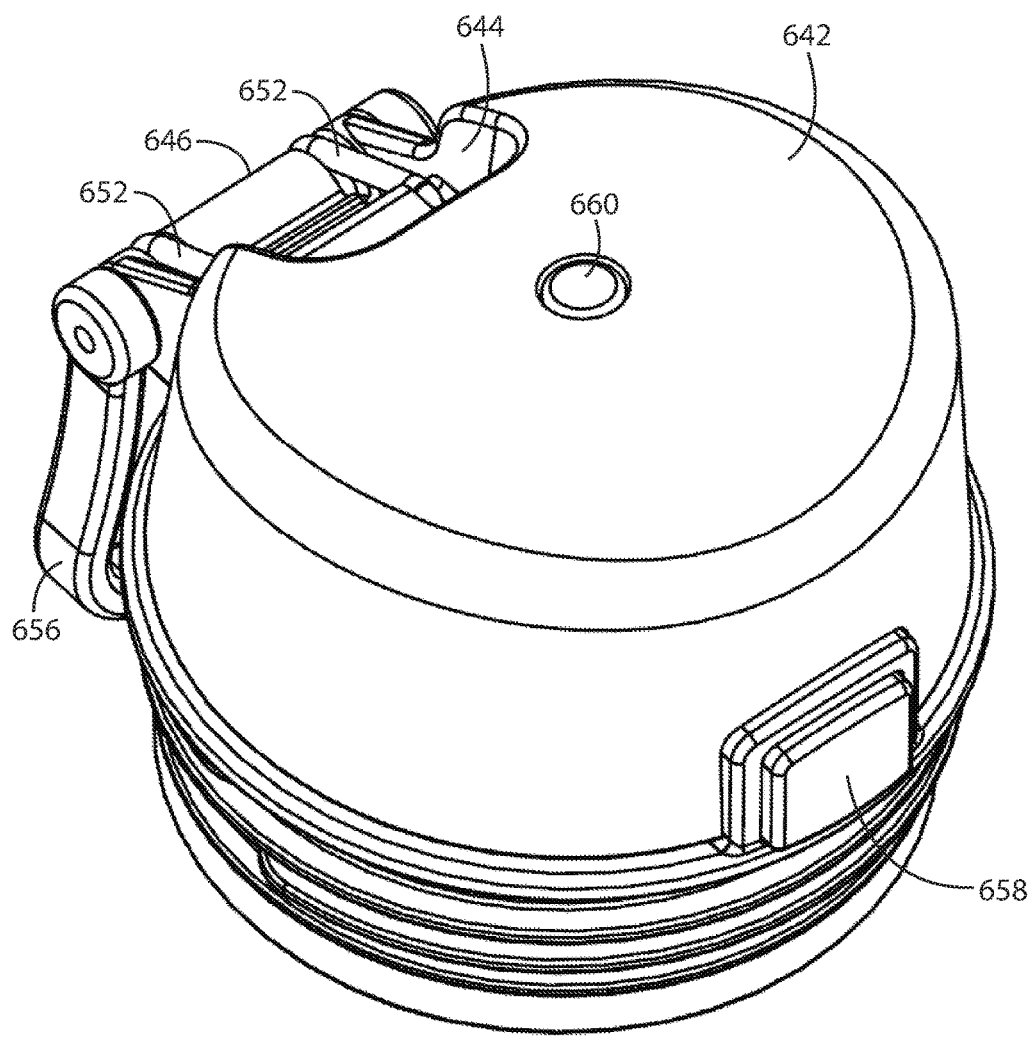
FIG. 46 is a top, front, side perspective view of the lid of FIG. 45.

In FIG. 46, the O-ring spring 652 can be seen wrapped about the hinge 646 in channels formed for receiving the O-ring.

Figure 47:
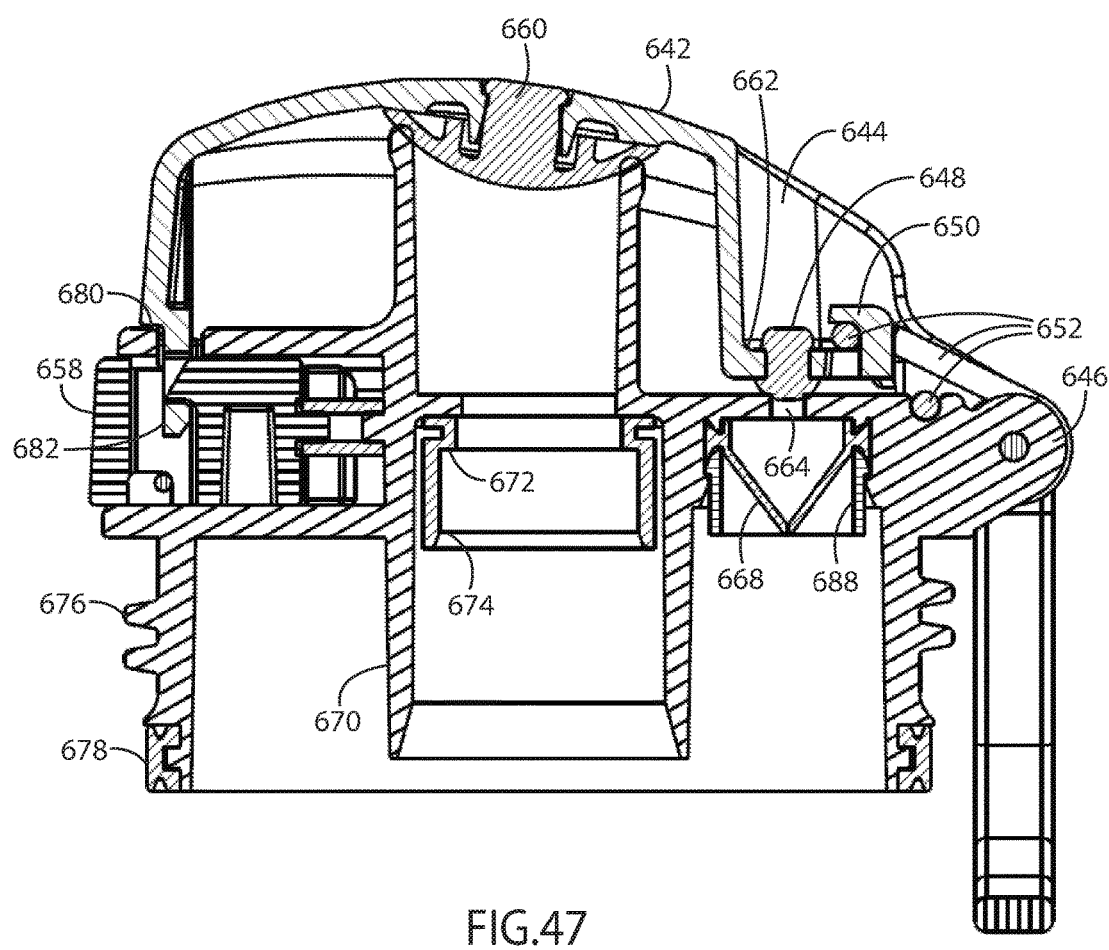
FIG. 47 is a vertical cross sectional view of the lid of FIG. 45.

The cross sectional view of FIG. 47 reveals many similarities to the above-described embodiments and a few differences. The recess 644 in the lid cover 642 includes a recess floor 662 in which is mounted the vent seal 648. The vent seal 648 presses against a vent opening 664 in the lid 640. The vent opening 664 leads to a vent valve 668 that is configured as a leaf valve that includes a pair of valve leaves.

The lid 640 includes a sleeve 670 into which fits the top section of the transfer tube of the beverage filter. The sleeve 670 includes a gasket 672 mounted in the sleeve for providing a seal between the transfer tube and lid to one another. The gasket 672 includes a gasket sleeve 674 that is beveled on its free end to fit over an end of the transfer tube and improve the seal quality.

The threaded portion 676 of the lid 640 includes a bottle gasket 678 configured to fit snugly against the inside of the bottle.

The button 658 is taller than the button of the above-described embodiment. The button tunnel, into which the button 658 fits, extends beyond the lid cover 642 and includes an opening 680 into which a catch extension 682 of the lid cover 642 extends. The catch extension is engaged by a catch nose on the button 658. As in certain other illustrated embodiments, the button 658 is biased by a compression spring and held in place by a button retaining pin.

Figure 48:
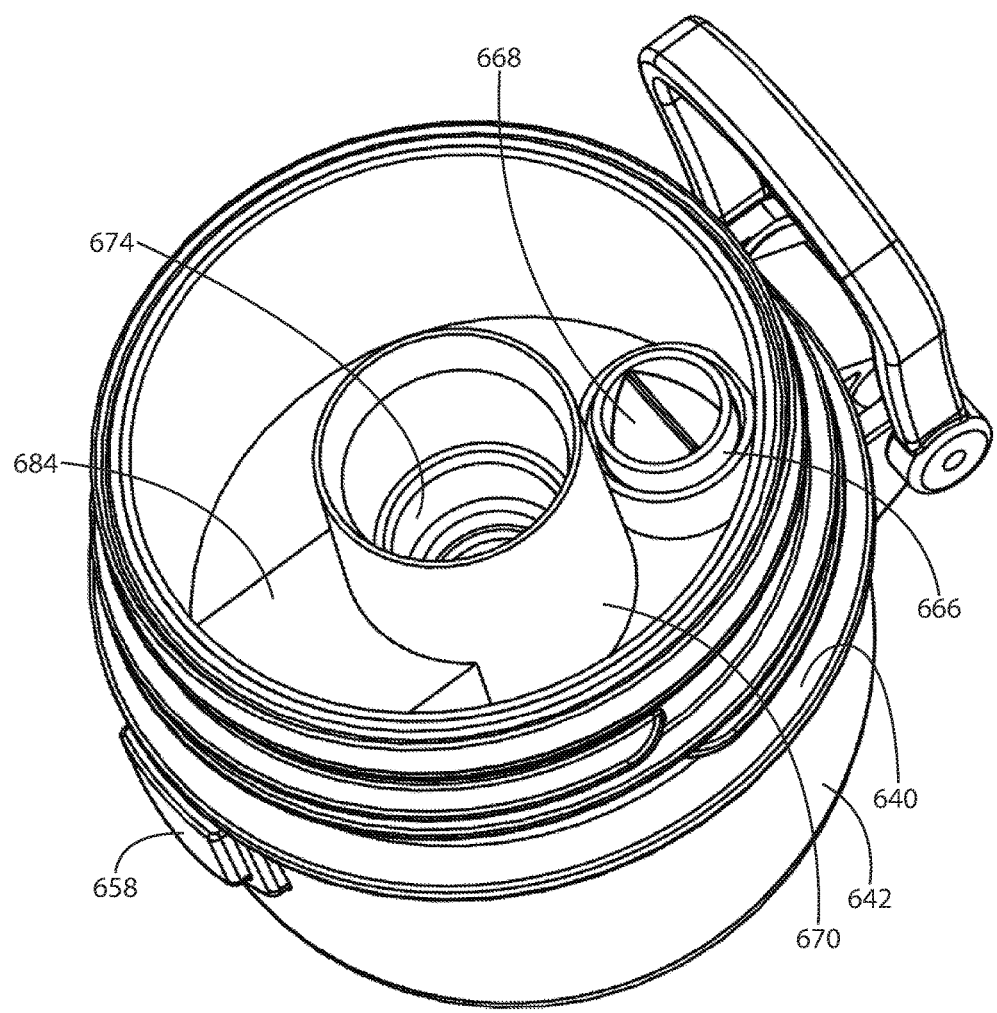
FIG. 48 is a bottom perspective view of the lid of FIG. 45.

In the underside view of FIG. 48, the sleeve 670 is disposed in the center of the lid 640. The gasket sleeve 674 is disposed within the sleeve 670. The vent valve or leaf valve 668 is held in the lid 640 by a valve retaining ring 688. The leaf valve 668 is shown in the closed position which prevents or reduces the escape of fluids from within the bottle. A button tunnel 684 is formed within the lid 640.

Figure 49:
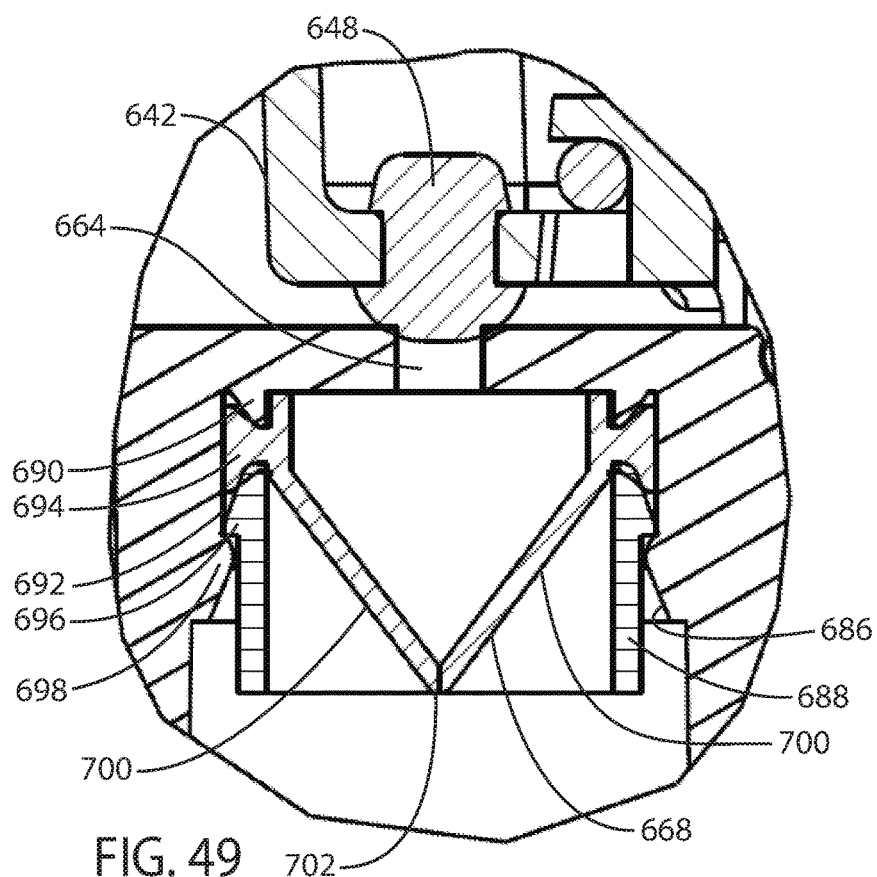
FIG. 49 is an enlarged fragmentary cross sectional view of a valve in the lid of FIG. 45, shown in the closed, position.

FIG. 49 illustrates details of an embodiment of the leaf valve 668. A recess 686 is formed in the lid 640 directed toward the interior of the bottle on which the lid may be attached. The recess 686 has fitted therein an annular retaining ring 688 that holds the leaf valve 668 in place. The recess 686 includes an annular projection 690 and the leaf valve 668 has a corresponding channel that fits onto the annular projection 690. The retaining ring 688 is generally of the same diameter as the annular projection 690 and fits into a channel 692 in the leaf valve 668. The channels form a retaining ring 694 that has a generally triangular cross section and that cooperates with the annular projection 690 and the retaining ring 688 to hold the leaf valve 668 in place. The retaining ring includes an angled outwardly extending projection 696 that engages an angled inwardly extending projection 698 within the recess 686, thereby forming a snap fastener that holds the leaf valve 668 in place by the retaining ring 688.

The leaf valve 668 includes first and second inwardly angled leaf elements 700 that are formed of a thin flexible material such as a rubber or other pliable polymer and that are disposed so that the free ends of the leaf elements 700 are in contact with one another at a seal surface 702 when in a relaxed condition. The leaf elements 700 generally retain the sealing contact of the seal surface 702 when exposed to a fluid within the bottle, thereby preventing or reducing the leakage from the bottle.

The leaf valve 668 is provided at the vent opening 664 so that air may flow through the vent opening 664 and through the leaf valve 668 by passing between the leaf elements 700. FIG. 49 shows the lid cover 642 in the closed position. The closed lid cover results in the vent seal 648 being pressed against the vent opening 664 so as to seal the vent opening from air or liquid passing through the vent opening. When the lid cover 642 is moved to an open position, the vent seal 648 is free of the vent opening 664 so that air can pass through the opening.

Figure 50:
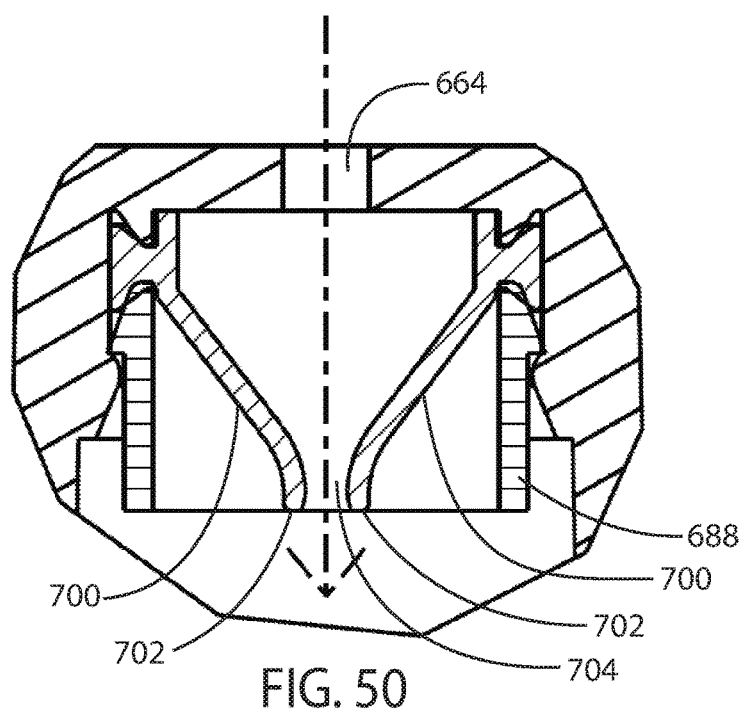
FIG. 50 is an enlarged fragmentary cross sectional view of a valve in the lid of FIG. 45, shown in the open position.

FIG. 50 shows the leaf valve 668 with the vent opening 664 in an opening condition. The air pressure within the bottle on which the lid is attached is lower than outside air pressure, such as the result of the user drinking from the bottle. The air pressure differential causes the leaf elements 700 to flex outwardly forming an air flow passage 704 at the sealing surfaces 702 of the leaf elements 700. After the air pressure within the bottle has equalized with the outside air pressure, the leaf elements 700 return to their relaxed state in contact with one another and thereby seal the lid against leakage of the liquid contained therein. The leaf elements 700 thereby form a one-way valve to admit air but prevent or reduce leakage of liquid.

Figure 51:
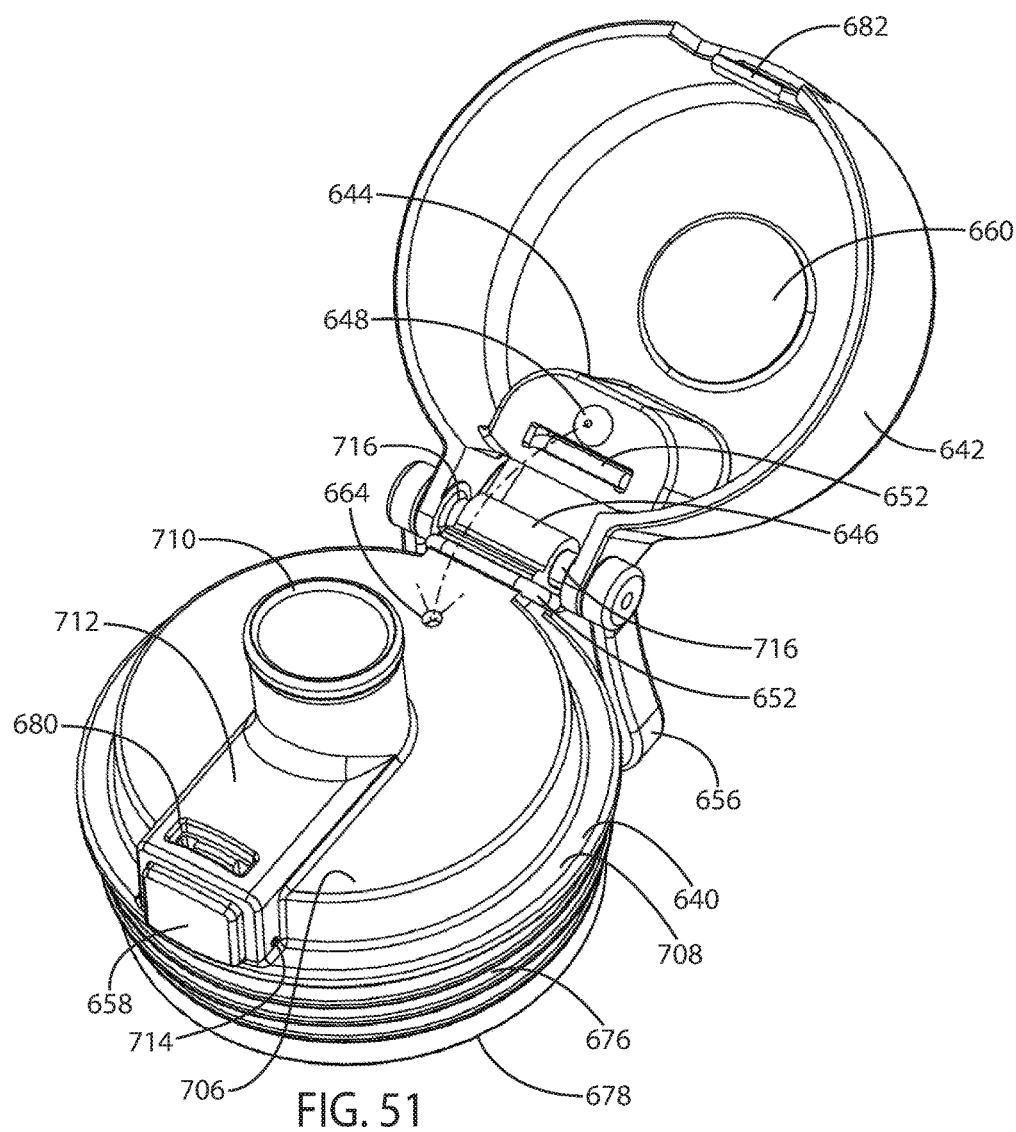
FIG. 51 is a top perspective of the lid of FIG. 45 with the lid cover shown in the open position.

FIG. 51 shows lid of FIG. 45 in an open condition. The lid 640 has a raised portion 706 that fits within the lid cover 642 and an outwardly extending lip 708 to which is attached the threaded portion 676. A nozzle 710 extends from the raised portion 706, the nozzle being sealed by the nozzle stopper 660 when the lid cover 642 is closed. A button tunnel 712 extends from the nozzle 710 and rises above the raised portion 706. The button 658 slides within the button tunnel 712 between a lid cover engaging position and a lid cover release position. The top, front of the button tunnel 712 includes an opening 680 through which extends the catch extension 682 on the lid cover 642 when the lid cover is closed. The button retaining pin that prevents or inhibits the button 658 from falling out of the button tunnel 712 is inserted into place through the pin opening 714.

The vent seal 648 is seen at the recess 644 in the lid cover 642. A primary function of the recess 644 is to support the vent seal 648 for movement into place over the vent opening 664 when the lid cover 642 is closed. The O-ring spring 652 can be seen hooked into place at both the recess 644 of the lid 642 and at the lid 640 adjacent the hinge 646. The hinge 646 has O-ring channels 716 into which the O-ring spring 652 fits when the lid cover 642 is closed.

Figure 52:
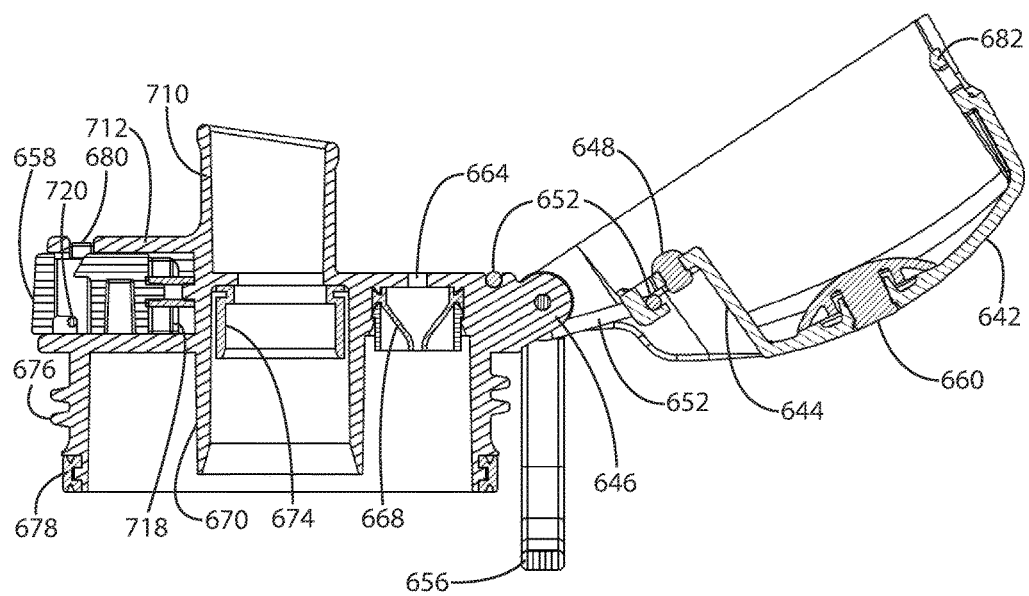
FIG. 52 is a vertical cross sectional view through the open lid of FIG. 51.

Turning to FIG. 52, the lid cover 642 is in the open position with the catch extension 682 released from the button 658. The O-ring spring 652 is under tension and pulls the lid cover 642 toward the fully open position so that the lid cover is held out of the way when the user drinks from the nozzle 710. As the user drinks and the contents of the bottle are removed, air passes through the vent opening 664 and through the leaf valve 668 into the interior of the bottle. The user may move the lid cover 642 toward the closed position by pivoting the lid cover about the hinge 646 and overcoming the tension force of the O-ring spring 652 on the lid cover 542. When the lid cover reaches the closed position, the catch extension 682 of the lid cover enters the catch opening 680 in the button tunnel 712 and engages the button 658 catch nose. The compression force of the button spring 718 is overcome and the button pin 720 in the pin notch of the button 658 permits the button slide to receive the catch extension 682. When fully closed, the button snaps into the engaging position to hold the lid cover 642 closed, the nozzle stopper 660 covers the nozzle 710 and the vent seal 648 covers the vent opening 664. The lid is configured to be sealed against leakage.

Figure 53:
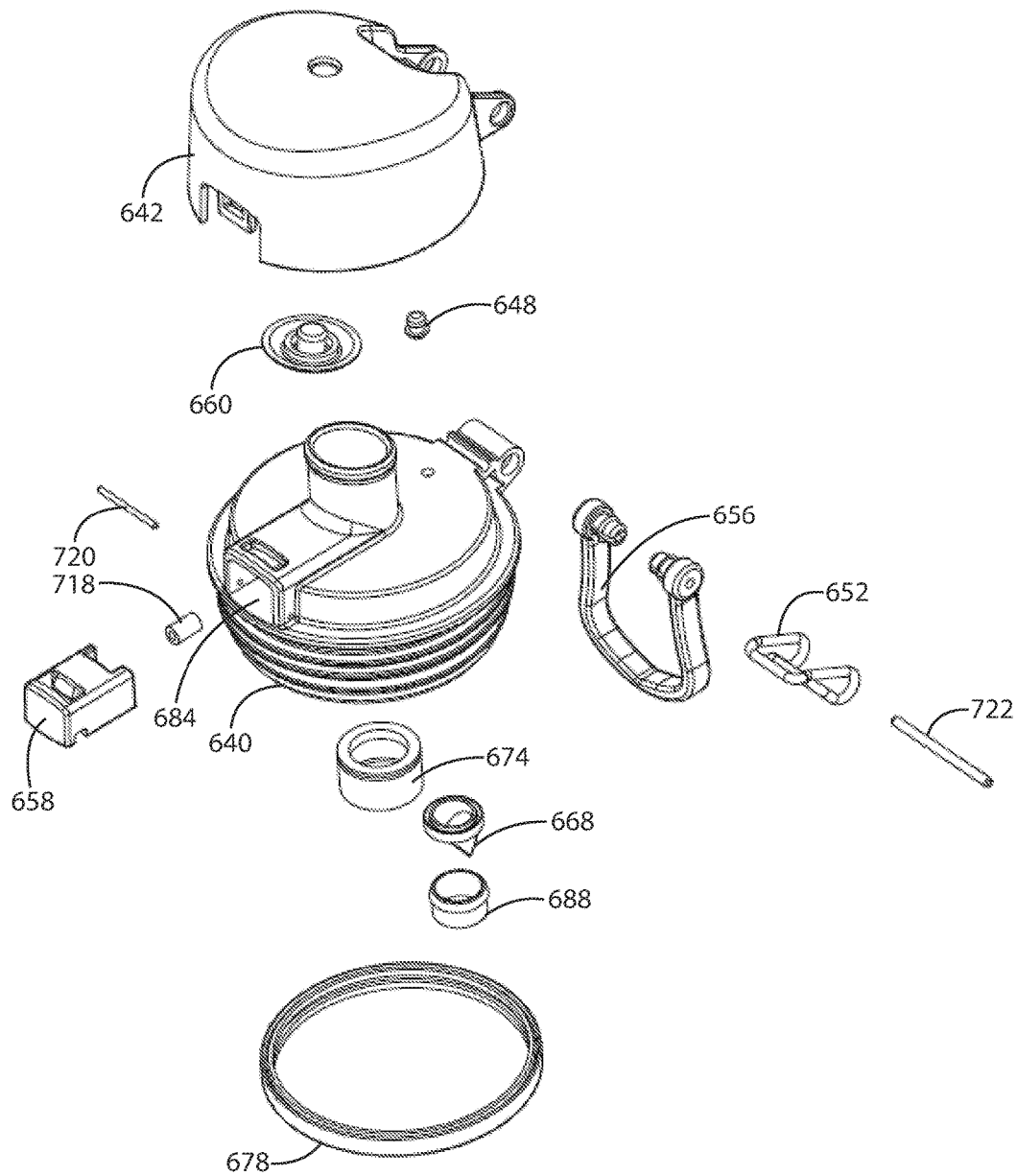
FIG. 53 is an exploded view of the lid of FIG. 45.

Turning to FIG. 53, the lid 640 includes the button tunnel 684 for receiving the button 658, the button spring 718 and the button pin 720. The nozzle stopper 660 and the vent seal 648 fit into the lid cover 642. The carry loop 656 and hinge pin 722 connect the lid 640 and lid cover 642 to one another, whereas the O-ring spring 652 bias the movement of the lid and lid cover relative to one another. The bottle gasket 678 seals the lid 640 to the bottle and the gasket sleeve 674 seals the lid 640 to the transfer tube of the filter assembly. The retainer ring 688 holds the leaf valve 668.

Figure 54:
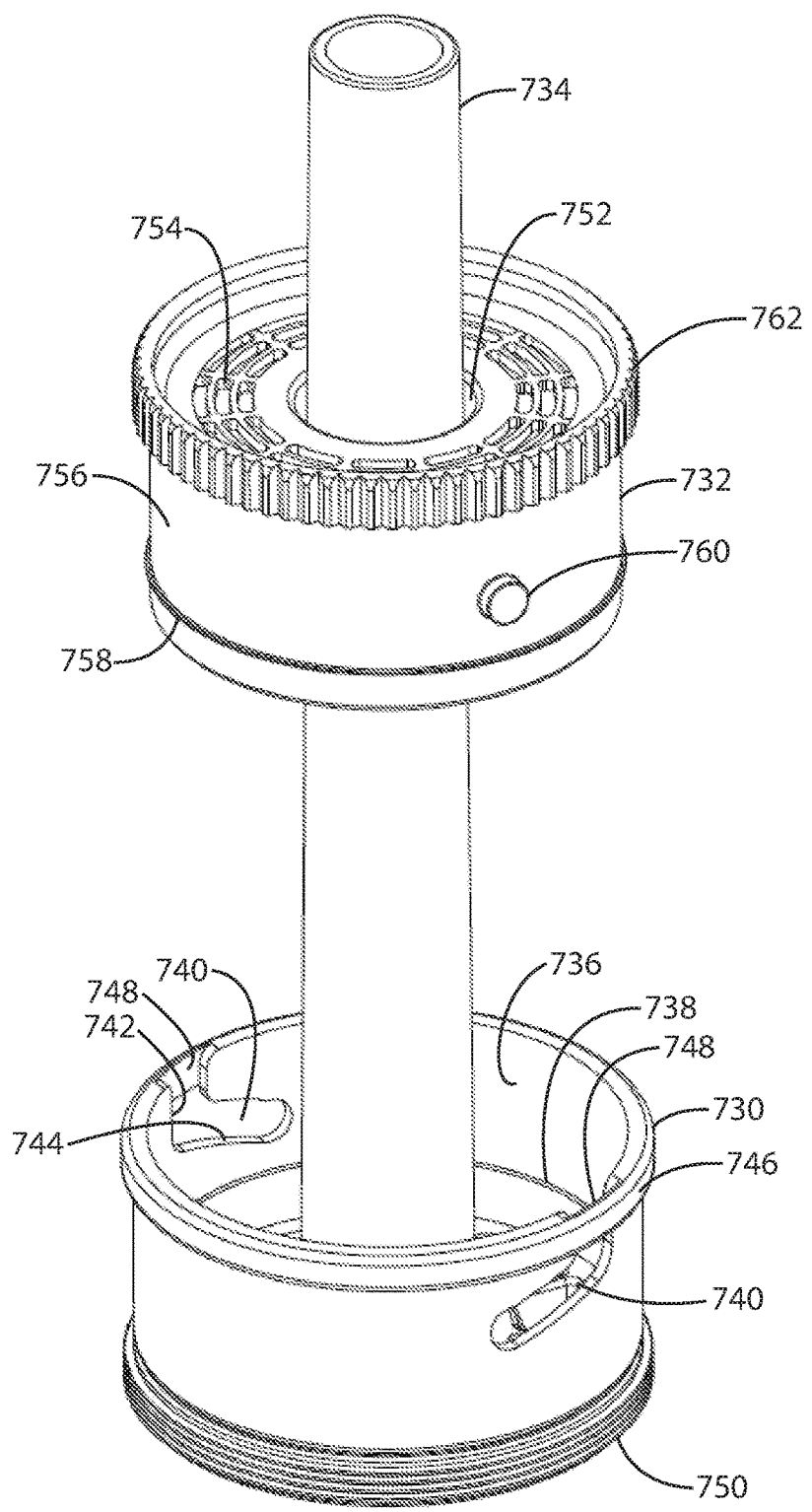
FIG. 54 is a side perspective view of another embodiment of a filter holder and transfer tube showing a filter cartridge and filter holder with a rotary lock.

In a further embodiment as shown in FIG. 54, a filter cartridge holder 730 and a filter cartridge 732 include a lock, also termed a twist lock, for engaging the holder 730 and cartridge 732 together in sealing engagement. In particular, the filter cartridge holder 730 has a transfer tube 734 extending to the cylindrical filter holder 730 that includes an interior wall 736 with a sealing step 738 extending around the circumference of the wall 736. The wall 736 includes two locking slots or channels 740 that include an axial portion 742 and an inclined portion or inclined channel 744. The slots or channels 740 may extend through the wall of the filter holder although the slots or channels may be configured as recesses in the wall of the filter holder. The inclined portion or inclined channel 744 of the lock provides locking by movement of the filter holder and filter cartridge relative to one another including rotational movement. The end of the locking slot 740 at the open end of the cylindrical filter cartridge holder 730 includes a support ring 746. The support ring 746 extends across a slot opening 748 of the axial portion 742 of the slot 740 at a position radially outward from the slot opening 748. The support ring 746 encircles the filter holder 730 and projects outwardly from the cylindrical wall of the filter holder 730 at the upper end thereof. A gasket 750 is mounted at the lower end of the filter holder 730 for sealing engagement with an interior wall of a beverage filtering bottle.

The filter cartridge 732 may contain a filter element and includes a central opening 752 to accommodate the transfer tube 734 as well as openings 754 in a top wall through which beverage flows for filtering by filter media such as the filter element contained within the filter cartridge 732. The filter cartridge 732 has a cylindrical outer surface 756 that is provided with a sealing rib 758 that projects outwardly from the outer surface 756. The sealing rib 758 presses into sealing engagement with the sealing step 738 within the filter holder 730 when the filter cartridge 732 is fully mounted within the filter holder 730. The sealing engagement may be sufficiently tight as to require relatively substantial force to insert and remove the cartridge 732 from the cartridge holder 730. To assist the user in providing the force to position the filter cartridge 732 into the sealed condition in the filter cartridge holder 730, a projection 760 is provided extending from the cylindrical outer surface 756. The projection 760 is positioned in the lock slot 740. As the cartridge 732 is rotated relative to the filter cartridge holder 730, the projection 760 moves along the slot 740, and the cartridge 732 moves into a generally sealed position within the filter holder 730 with the sealing rib 758 in sealing engagement with the sealing step 738 as the projection moves along the inclined surfaces of the slot 740.

The insertion of the filter cartridge 732 into the filter holder 730 may be relatively easier to accomplish by the user, since it involves the exertion of pressing forces. However, the removal of the cartridge 732 from the holder 730 may require more force by the user relative to insertion of the cartridge 732. By twisting the cartridge 732 in an opposite direction from the installation rotation, the user is able to remove the cartridge 732 from its sealed position within the cartridge holder. This is a result of the projection 760 moving along the inclined surfaces of the inclined portion 744 of the locking slot 740. The cartridge 732 may thus be removed more easily by the user.

To facilitate rotation of the cartridge 732 by the user, a ribbed grip ring 762 is provided along the upper end of the filter cartridge 732. The ribbed grip ring 762 projects above and outwardly of the filter holder 730 for easy gripping by the user. The grip ring 762 may be used for both rotation in a first direction to install the cartridge into the holder 730 and rotation in an opposite direction to remove the cartridge from the filter holder 730. The grip ring 762 enables the user to disengage the sealing rib 758 from the sealing step 738, even if the engagement is very tight.

Once the sealing rib 758 is separated from the sealing step 738, the inclined twisting force imparted by the projection 760 riding in the inclined slot 744 is no longer necessary. At this point, the projection 760 is in the axial portion 742 of the slot and the cartridge may be removed easily.

Figure 55:
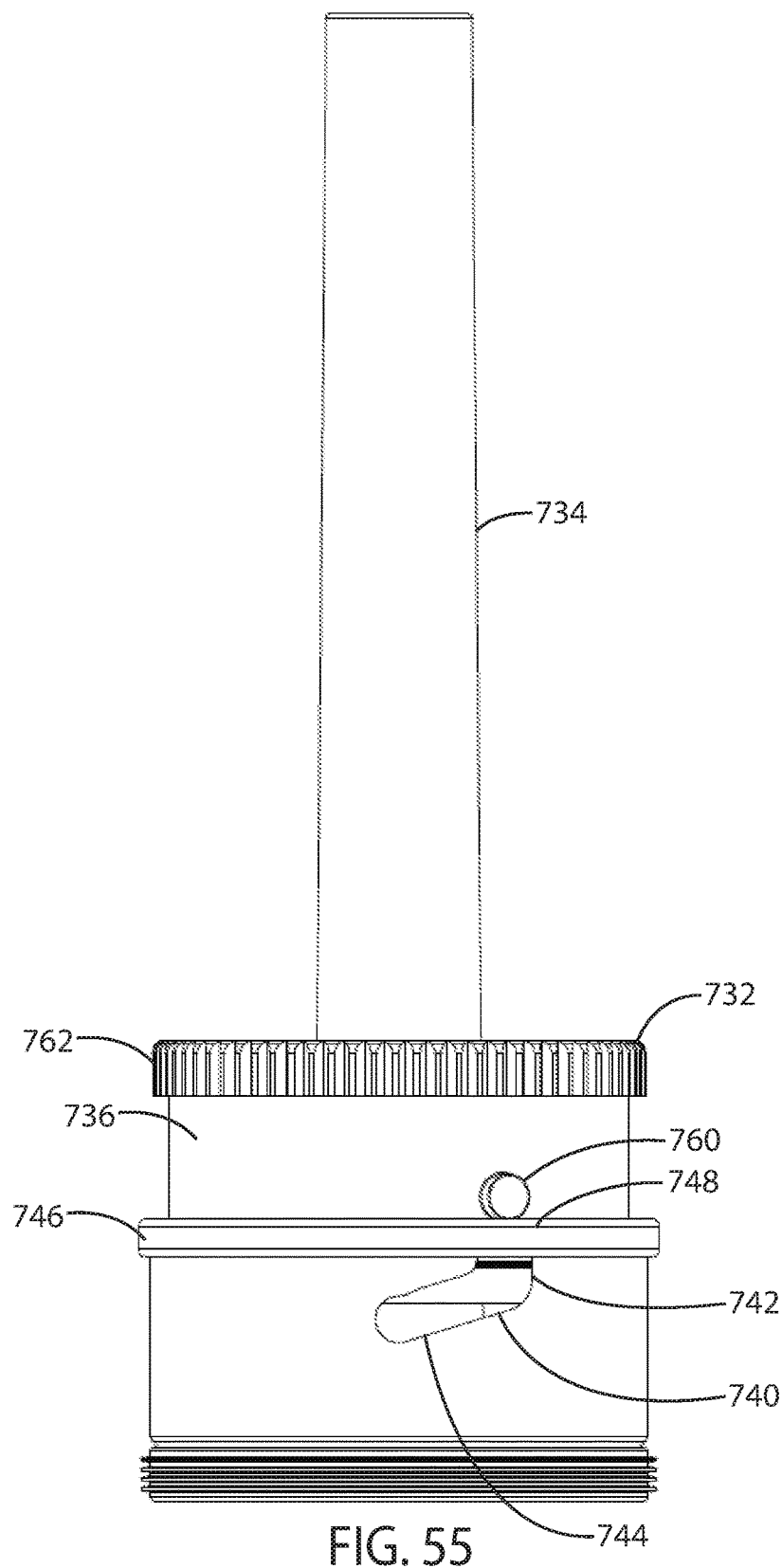
FIG. 55 is a front elevational view of the rotary lock filter cartridge and holder of FIG. 54 in an unlocked position.

FIG. 55 shows the cartridge 732 positioned with the projection 760 at the entrance 748 of the locking slot 740. From the illustrated position, the cartridge 732 will be pressed axially along the transfer tube 734 by the user so that the cylindrical wall 736 of the cartridge 732 fits into the holder 730. The projection 760 enters the slot 740 by moving behind the support ring 746 and moves along the axial portion 742. Upon reaching the inclined portion 744, the projection begins to move both axially and circumferentially, causing the filter cartridge 732 to twist into place in the holder 730. The user may grasp the ribbed grip ring 762 to move the cartridge 732 into place.

Figure 56:
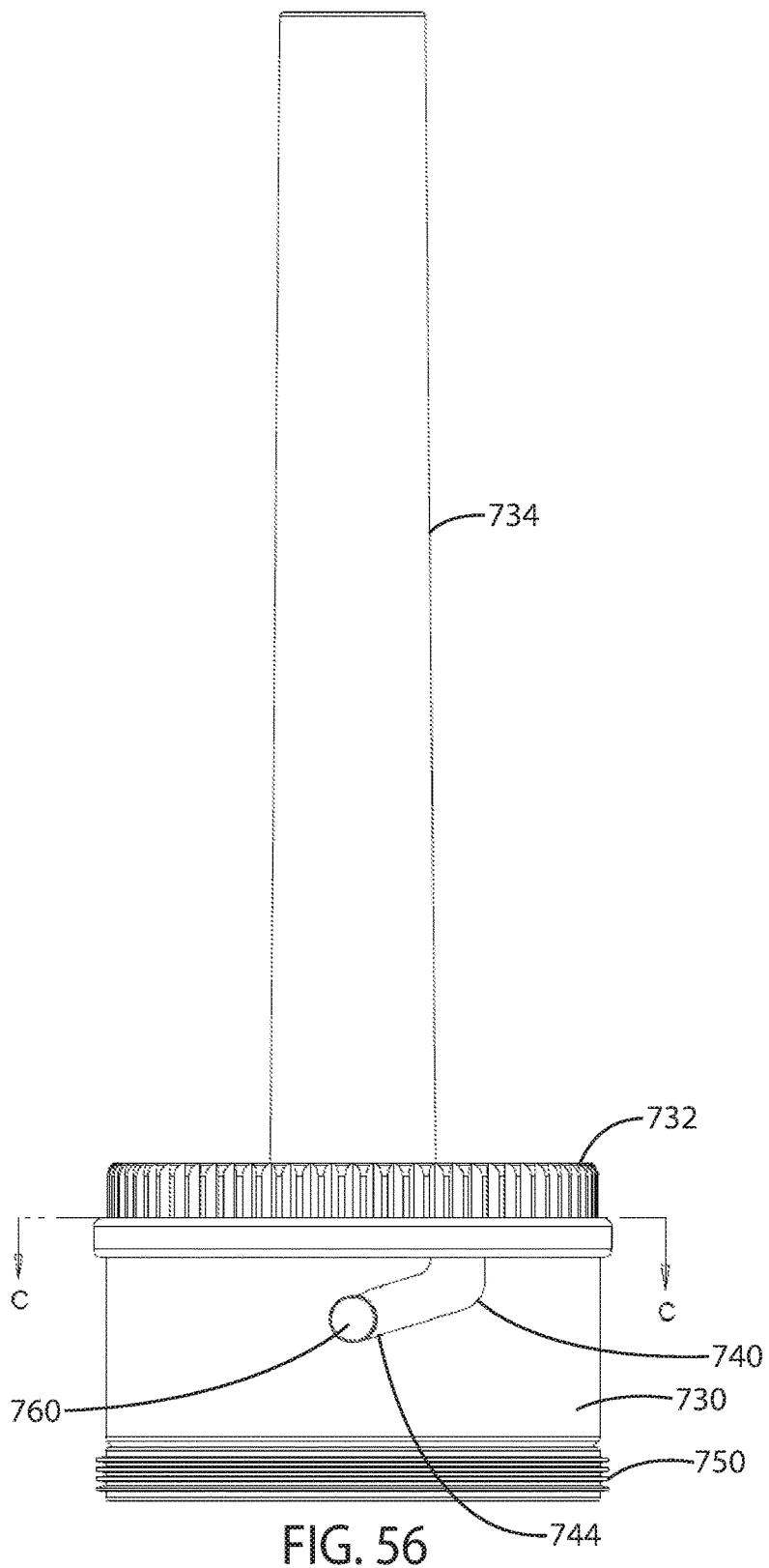
FIG. 56 is a front elevational view of the rotary lock filter cartridge and holder of FIG. 54 in a locked position.

With reference to FIG. 56, the cartridge 732 is fully seated within the cartridge holder 730. The projection 760 is positioned at the end of the inclined portion 744 of the slot 740. This causes the sealing rib on the cartridge 732 to be pressed into a sealing engagement with the sealing step in the holder 730, thereby providing a water-tight seal between the cartridge and the holder. The gasket 750 provides the water-tight seal with the interior of the bottle. The filtered beverage chamber of the bottle is thereby sealed from the unfiltered beverage chamber.

As can be readily seen in FIG. 56, the grip ring 762 extends out of the cartridge holder 730 when the cartridge is fully seated so that the user may readily grasp the grip ring 762 for removal of the cartridge. The filter cartridge may be easily removed so that a new cartridge may be inserted.

Figure 57:
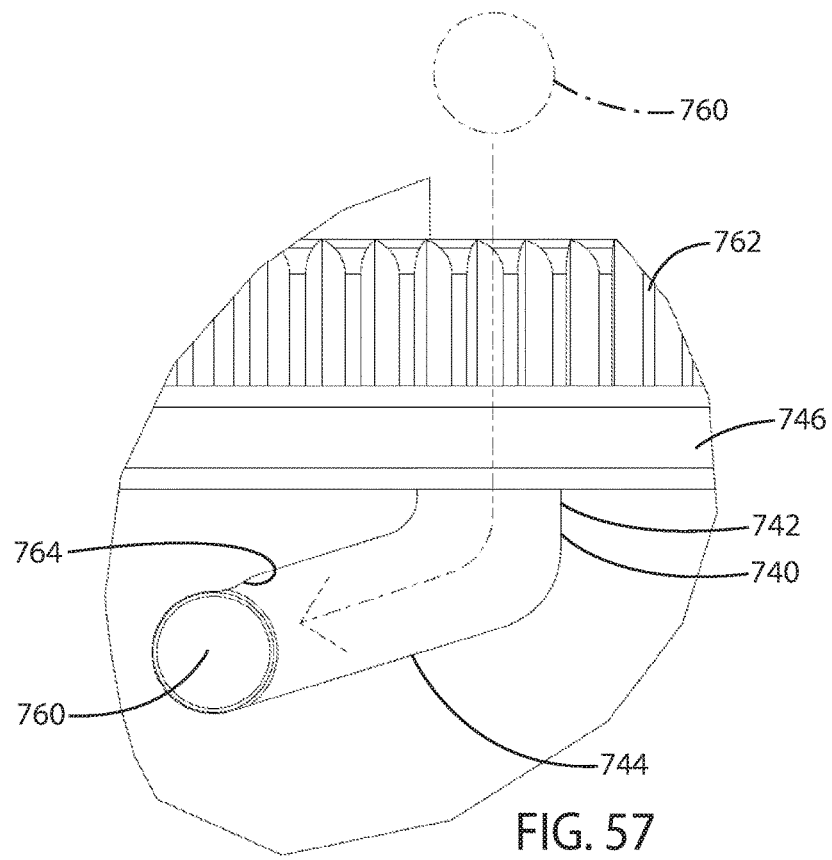
FIG. 57 is an enlarged, fragmentary view of the rotary lock.
Figure 58:
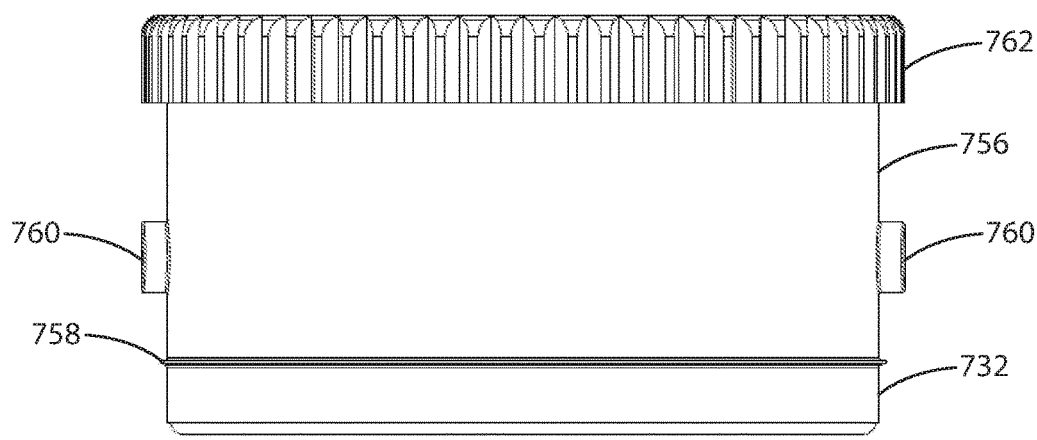
FIG. 58 is a side elevational view of the filter cartridge showing two rotary lock projections.

Turning to FIG. 57, the projection 760 is shown in the fully seated position within the closed end of the lock slot 740. In certain embodiments, the slot 740 is configured to provide free movement of the projection 760 along the slot 740. In an alternate embodiment as shown in this figure, the slot 740 narrows as a result of a bump 764 that extends into the slot 740. The bump 764 constricts the slot 740 sufficiently to provide resistance to passage of the projection 760 along the slot, yet still permit the projection to move along the slot 740 when subject to force. The projection 760 is held in the fully seated position by the bump 764, although only a small twisting force by the user is required to move the projection 760 from the fully seated position and past the bump 764. In certain embodiments, the bump 764 is not present. The path of the projection 760 along an axial and then inclined pathway within the slot 740 is indicated by an arrow.

A side view of the cartridge 732 shows that two projections 760 are provided in the illustrated embodiment. It is envisioned that one projection may be provided, or that more than two projections may be provided. The projections 760 are shown as circular shaped projections, although other shapes are possible. The slot for receiving the projections is shown as a through-opening in the holder, but the slot may instead be formed as a channel closed to the outside of the holder. The slot is shown as having an axial and an inclined portion, but the slot may only have an inclined portion, only an axial portion, or may be of other shapes. The sealing rib 758 is shown on the cartridge, but the sealing rib may instead be provided within the cartridge holder while a step or other sealing surface is provided on the cartridge. Other arrangements of seals between the cartridge and cartridge holder are also possible and are within the scope of this invention.

Figure 59:
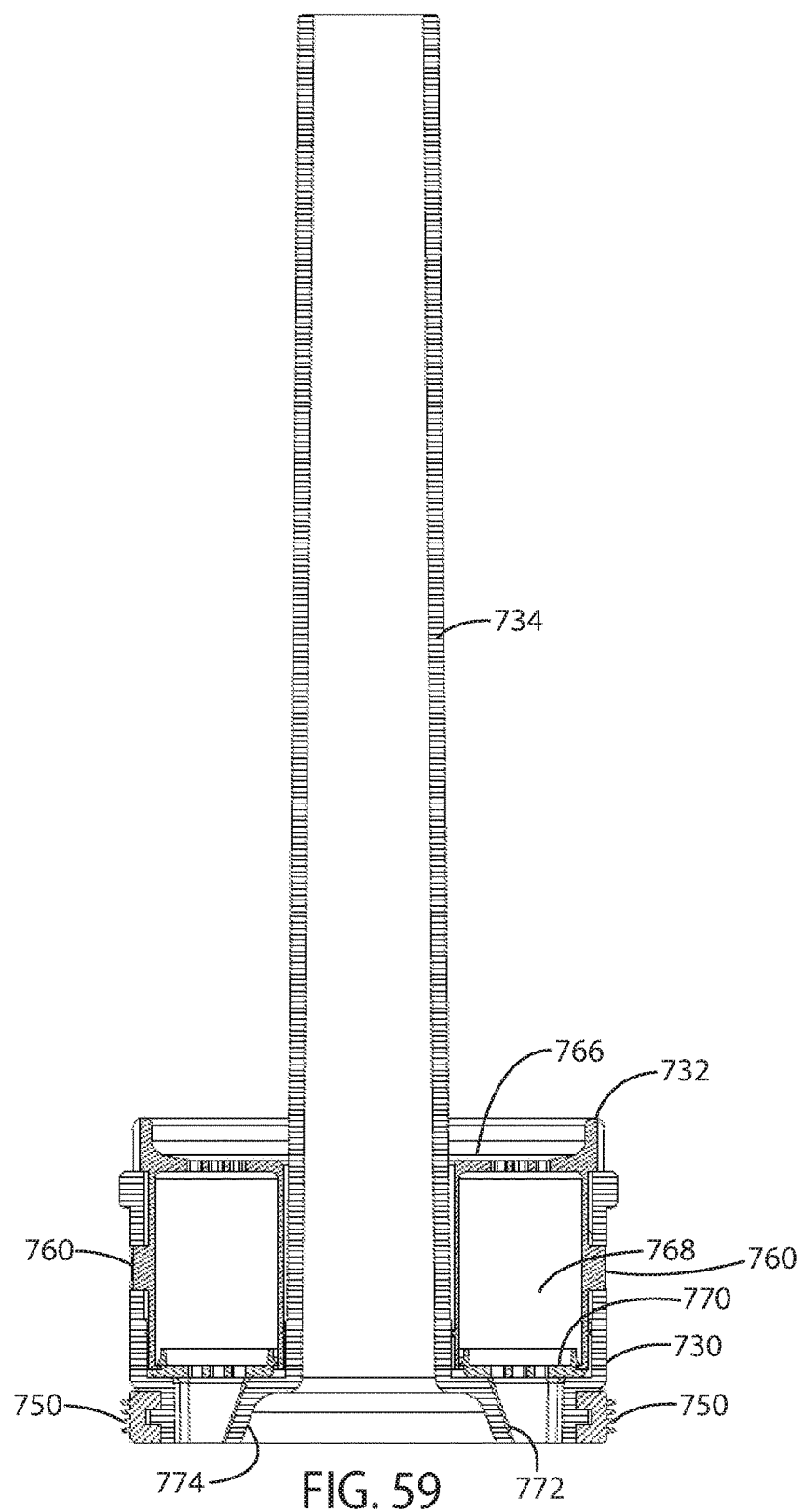
FIG. 59 is a vertical cross-sectional view of the transfer tube and filter holder and a filter cartridge showing the filter cartridge engaged in a locked position in the filter holder.

FIG. 59 shows the filter holder 730 and cartridge 732 in cross section along line C-C of FIG. 56. The cartridge 732 fits over the transfer tube 734 and into the filter holder 730 with the projections 760 extending through the slots 740 in the holder 730. The grip ring 762 extends from the filter holder 730 to a position that permits the user to grasp and rotate the grip ring 762 to thereby remove or replace the filter cartridge 732. The filter cartridge 732 has openings in a top filter cover 766 into which beverage in an unfiltered beverage compartment flow, an interior space 768 within which is provided filter media and/or other materials, and a bottom filter cover 770 that includes openings through which flows the filtered beverage into the filtered beverage compartment of the bottle while retaining the filter media in the interior space 768. The filter holder 730 has a bottom 772 that supports the filter cartridge 732 and is provided with fluid flow openings for the filtered beverage.

The transfer tube 734 has a flared lower end 774 that opens into the filtered beverage compartment and enables a greater quantity of the filtered beverage to enter the transfer tube for drinking by the user. The flared lower end 774 is stepped, although a gradually increasing diameter or other shape is possible. The gasket 750 is affixed to a raised rib disposed in a lesser diameter portion at the lower end of the filter holder 730. The gasket 750 includes a plurality of outwardly extending thin ribs at its outer surface for contact with the interior wall of the bottle into which the filter holder is placed.

Figure 60A:
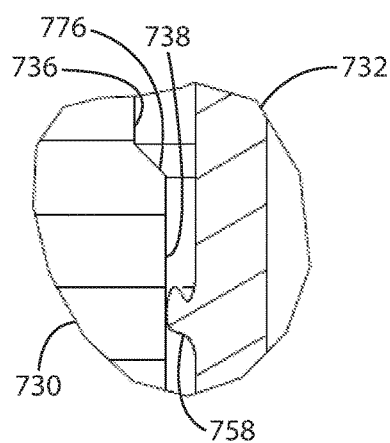
FIGS. 60a and 60b are enlarged fragmentary cross-sectional views showing the seals between the filter cartridge and the filter holder.
Figure 60B:
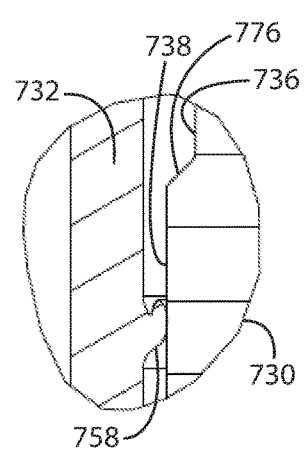

FIGS. 60a and 60b are enlarged views of the sealing rib 758 on the filter cartridge 732 that is pressed against the sealing step 738 of the filter cartridge holder 730. As the filter cartridge 732 is inserted into the cartridge holder 730, the sealing rib 758 may have little or no contact with the interior of the holder 730 until the rib 758 reaches the step 738. At the step 738, the rib 758, also termed a fin, deforms as it presses against the step 738 to form the fluid-tight seal. The force of the deformed rib or fin 758 on the step 738 may be sufficient to require that the user exert a relatively high level of force to remove the cartridge 732 from the holder 730 if not for the aid provided by the inclined slots that move the cartridge both rotationally and axially upon exertion of rotational force. This is particularly true when the seal area is wet and the surface tension of the beverage is added to the stiction that prevents or inhibits initial movement of the surfaces relative to one another.

During insertion of the cartridge 732 into the holder 730, the rib or fin 758 extends radially from the surface of the cartridge until the step 738 is reached. A ramp 776 is provided as a transition between the interior wall 736 of the holder 730 and the step 738. The ramp 776 causes the rib or fin 758 to bend without damage as the rib flexes to rest on the step 738. Of course, several ribs or fins may be provided to seal the space between the cartridge and the holder. The ribs or fins may extend from either component, or from both.

Figure 61:
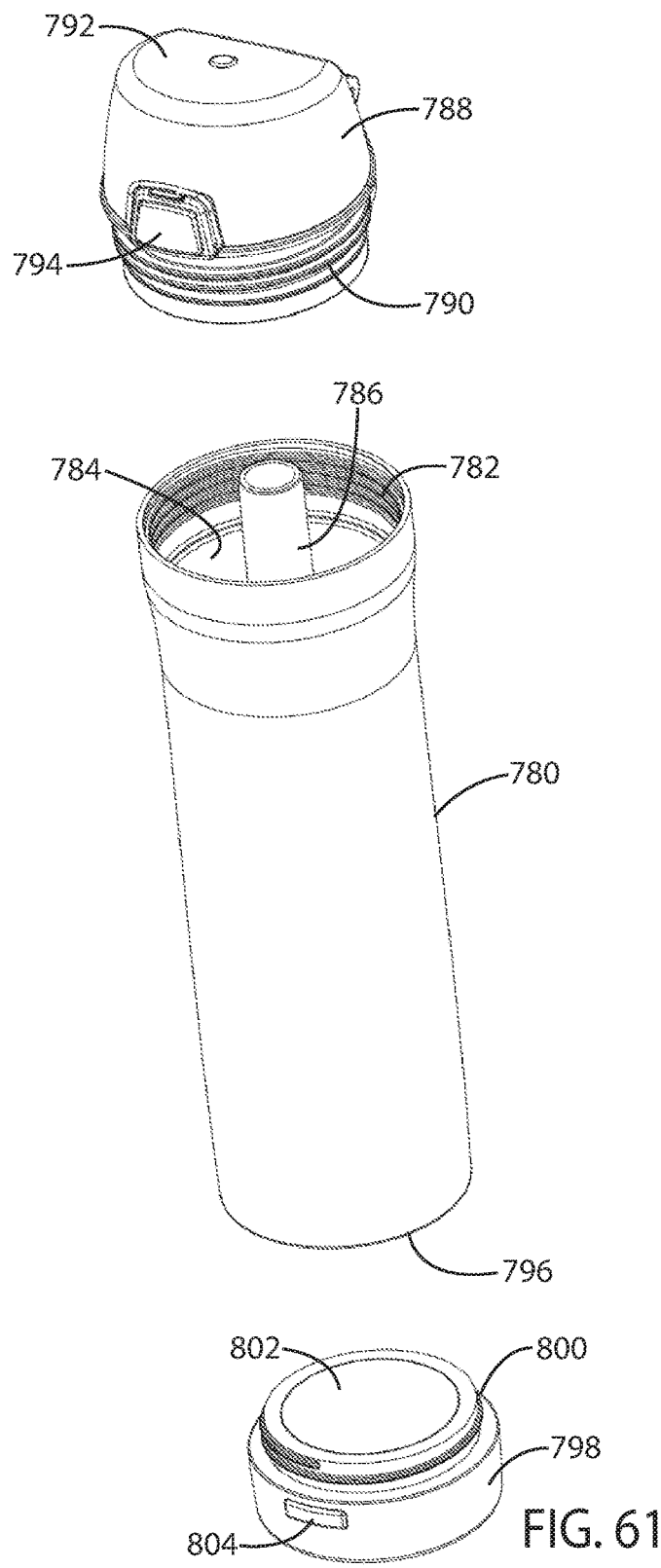
FIG. 61 is an exploded view of an embodiment of the beverage filtering or treatment system with a UV light sterilizer unit.

The filtering or treatment system disclosed herein may remove most or all contaminants from the beverage, including chemical contaminants, bacteria, protozoa, cysts, particulates, and other water contaminants, including possibly viruses. Some viruses may remain in the filtered beverage, however, as a result of their small size. Another embodiment of the filtering or treatment system is shown in FIG. 61, for example, that includes a further means for eliminating viable viruses from the filtered beverage. In this embodiment of the filtering or treatment system, a bottle body 780 includes a threaded opening 782 into an interior space forming an unfiltered beverage chamber 784. The threaded opening is an interior threaded opening. The bottle body 780 has disposed therein a filter holder and filter cartridge which may be of a type as shown herein and which are disposed at an end of a transfer tube 786 that is visible in FIG. 61.

A lid 788 has an exterior threaded portion 790 that fits into the threads 782 of the bottle body 780. A lid cover 792 is releasable from a closed position by operating a release button 794. Under the lid cover 792 is provided a drink nozzle or other dispensing opening for drinking or dispensing the filtered or treated beverage, which flows to the nozzle via the transfer tube 786.

The opposite end of the bottle body 780 is also has an internally threaded opening 796. A UV (ultra-violet) light beverage treatment feature includes a UV sterilizer unit 798 that is configured for fastening into the opening 796. The UV sterilizer unit 798 includes an externally threaded portion 800 configured to engage with the opening 796, a UV transmitting portion 802 that is disposed for transmitting UV light into the interior of the bottle body, and a power switch 804 that is operable to activate or deactivate the UV light. The bottle body 780 preferably has an internal filtered beverage compartment that has no fluid access to the opening 796, but includes a UV transmissive portion that permits UV light generated by the UV sterilizer unit 798 to reach the filtered beverage compartment within the bottle body 780. The UV sterilizer unit 798 is separable from the bottle body to permit servicing, such as for changing the battery, although UV sterilizer units that are not separable from the bottle body are also within the scope of this invention.

Figure 62:
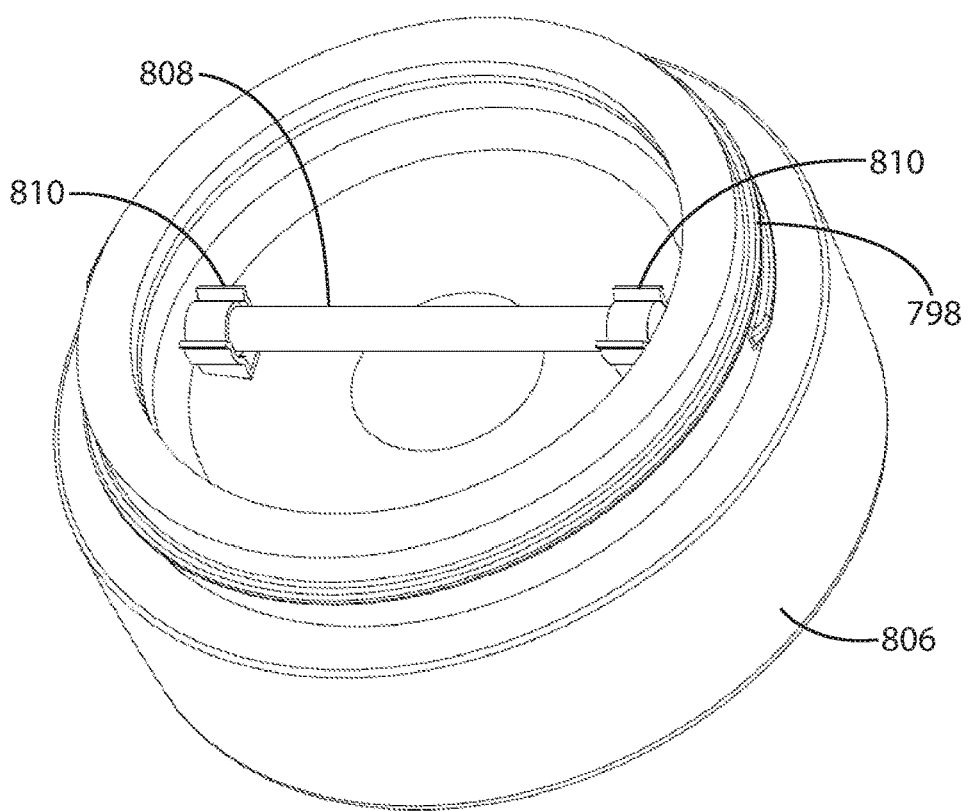
FIG. 62 is a top perspective view of a UV light sterilizer unit for use on the beverage filtering or treatment system of FIG. 61.

FIG. 62 shows an embodiment of the UV sterilizer unit 798. The externally threaded portion 800 extends about the top of the unit 798 on a decreased diameter step portion which fits into the internally threaded opening in the bottle body. An outer cylindrical surface 806 is generally of the same diameter as the bottle body so that the UV sterilizer unit 798 forms a continuous external surface with the bottle body when attached thereto. The UV transmitting portion 802 has been removed from the UV sterilizer unit 798 in this view to reveal a UV emitting bulb 808. The UV emitting bulb 808 is mounted in clips 810 that provide support and electrical power to the UV emitting bulb 808. Below the UV emitting bulb 808 is housing for enclosing a power supply and control circuitry for the UV emitting bulb. The power switch for activating the UV emitting bulb 808 is on the other side of the unit 798, out of view in this figure. Other switch locations are also possible. Other configurations of UV light emitting devices are possible and are within the scope of this invention.

Figure 63:
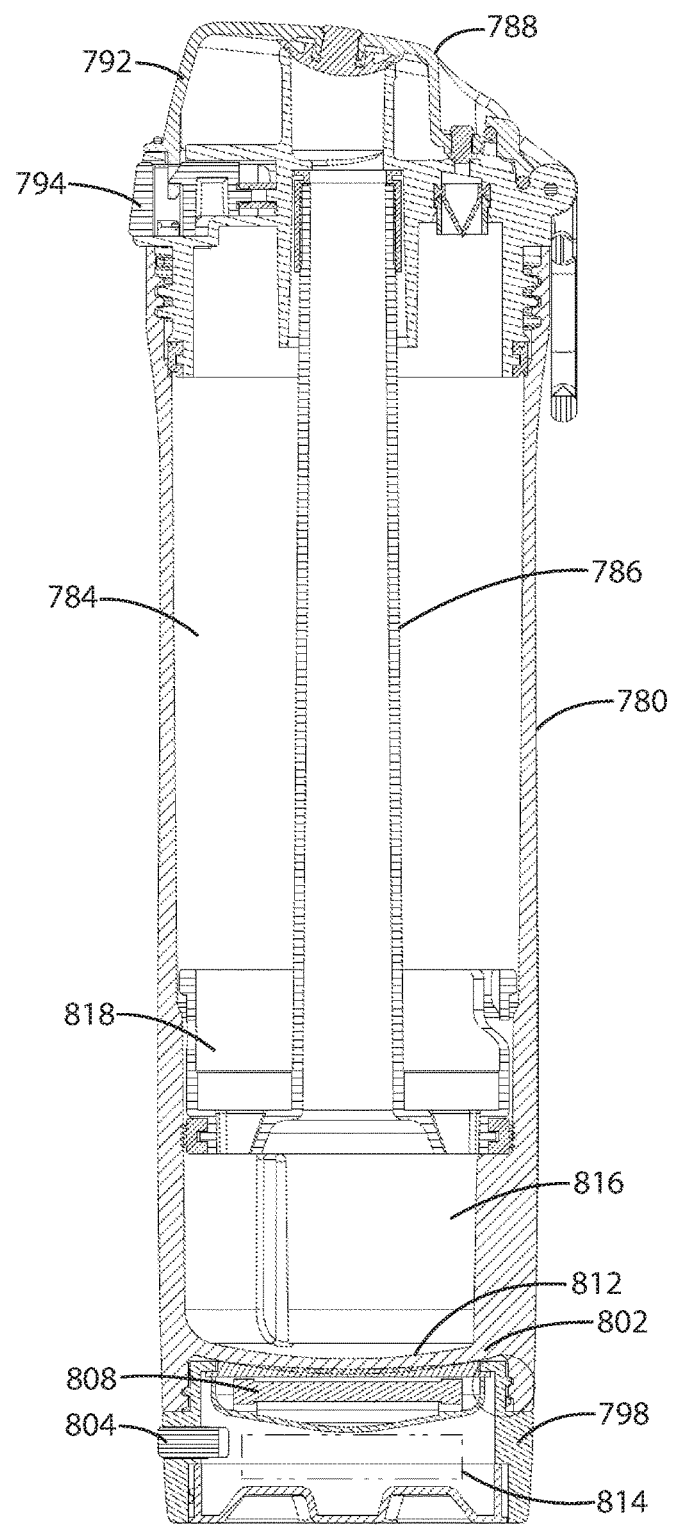
FIG. 63 is a vertical cross-sectional view of the beverage filtering or treatment system with the UV light sterilizer unit.

In FIG. 63, the UV light sterilizer unit 798 is affixed to the internally threaded opening of the bottle body 780. The UV emitting bulb 808 operates to transmit UV light through the UV transmitting portion 802 of the UV sterilizing unit 798 and through a UV transmissive portion 812 of the bottle 780. A power supply and control portion 814 is disposed within the UV sterilizer unit 798 that preferably includes a battery and a UV light control circuit. The power switch 804 is accessible at the side of the sterilizer unit 798. Upon activation of the UV light sterilizer unit 789 by the user, such as by operation of the power switch 804, UV light emitted by the UV emitting bulb 808 is transmitted into any beverage within the filtered beverage compartment 816. The beverage in the filtered beverage compartment 816 may have passed through the filter media of the filter 818 from the unfiltered beverage compartment 784. As such, any particulates and many chemical and biologic contaminants may have been already removed. Viruses and other small contaminants that may have passed through the filter may be killed by the UV light, further sterilizing the beverage. Thus, the water or other beverage is available for drinking or uses with an additional level of safety without resort to chemicals or complex high-pressure filtering mechanisms. The user may drink the beverage from the nozzle of the filtering or treatment system or may dispense the beverage for cooking, washing, or the like. The nozzle, cover release, valves and seals of the lid, carrying loop, internal filter holder support, and other structures of the lid and bottle body are sufficiently similar to those shown in the embodiments described in detail herein that the person of skill in the art understands their structure and operation, and so further explanation is not provided here.

Figure 64:
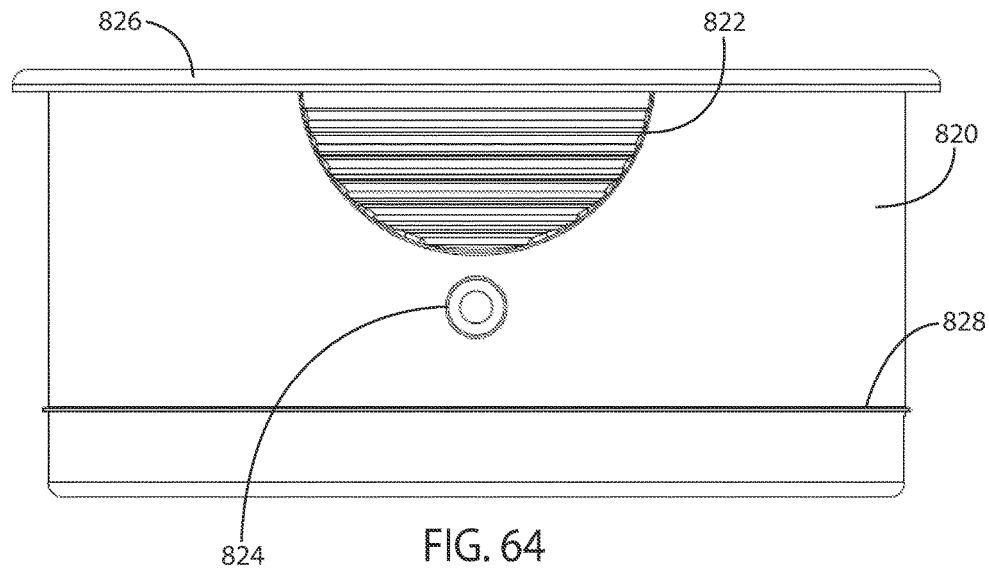
FIG. 64 is a front elevational view of a filter cartridge having a locking feature.

An alternate embodiment is shown in FIG. 64, wherein a filter cartridge 820 has a ribbed grasping portion 822 adjacent a lock button 824. The lock button 824 is deformable inwardly by pressing on the grasping portion 822. A flange 826 is provided about the top end of the filter cartridge 820, and a sealing rib or fin 828 is provided extending from the cylindrical wall of the filter cartridge 820.

Figure 65:
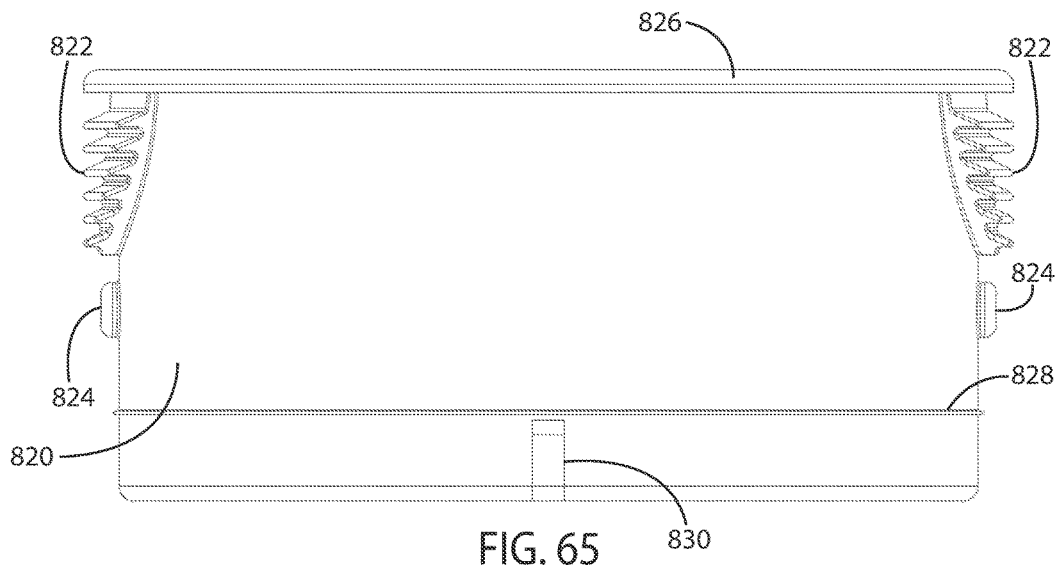
FIG. 65 is a side elevational view of the filter cartridge of FIG. 64.

In FIG. 65, the filter cartridge 820 is shown in a side view. Two ribbed grasping portions 822 are provided, one on either side of the filter cartridge 820. Two lock buttons 824 are provided, each adjacent a grasping portion 822. An alignment notch 830 is formed in the cartridge 820 at the lower end opposite the flange 826.

Figure 66:
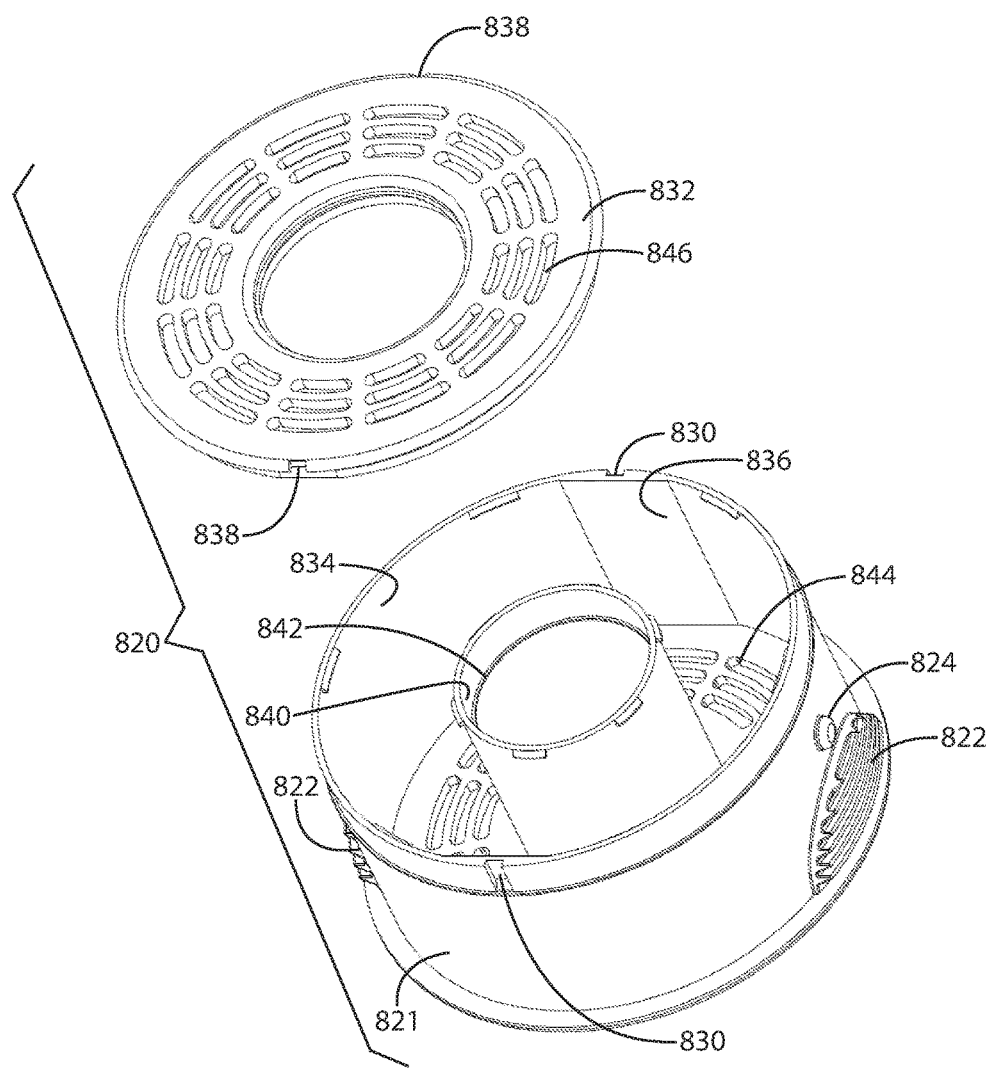
FIG. 66 is an exploded bottom perspective view of the filter cartridge of FIG. 64.

FIG. 66 shows the filter cartridge 820 with the bottom filter cover 832 removed. The bottom filter cover 832 fastens into place to enclose the media compartment 834 of the filter cartridge. The filter cover 832 is preferably permanently attached to the cartridge body 821 of the filter cartridge 820. The alignment notches 830 are provided on opposite sides of the filter cartridge body 821 in a thickened wall portion 836. The filter cover 832 also has notches 838 that are aligned with the notches 830 when the filter cover 832 is affixed to the cartridge body 821. As with the other embodiments, the illustrated filter cartridge 820 has a central opening 840 for accepting the transfer tube of the filter holder, a sealing rib or fin 842 within the opening 840, and fluid flow openings 844 in the cartridge body 821 and fluid flow openings 846 in the filter cover 832.

Figure 67:
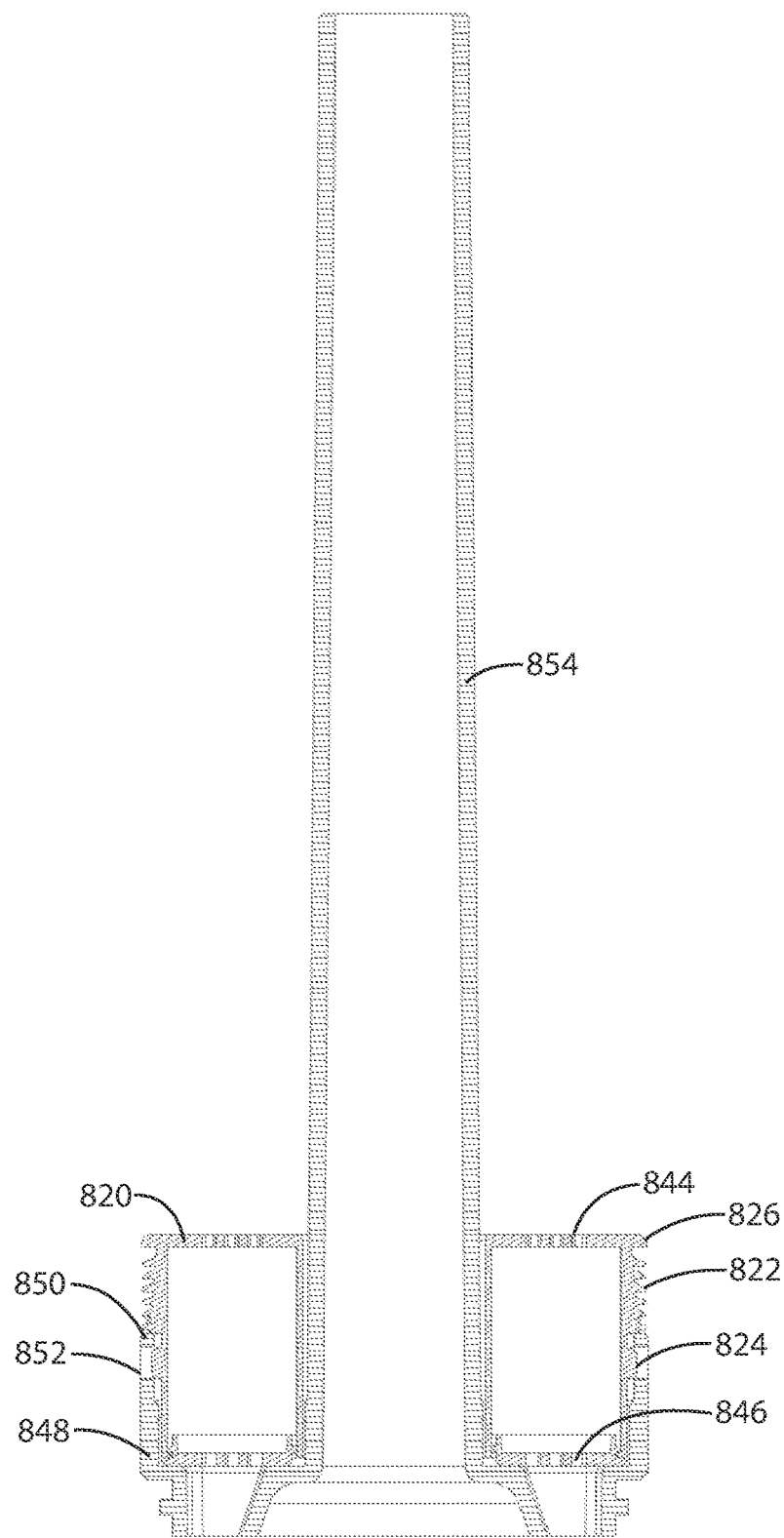
FIG. 67 is a vertical cross-sectional view of a transfer tube and filter holder with the filter cartridge of FIG. 64 shown mounted in the filter holder in a locked condition.

In FIG. 67, the filter cartridge 820 is shown mounted in a filter holder 848 that has recesses 850 for accepting the grasping portions 822 and openings 852 for receiving the lock buttons 824. The filter cartridge 820 snaps into place when inserted into the filter holder 848 as the lock buttons 824 reach the openings 852. The filter cartridge 820 is removed by grasping and pressing inwardly on the ribbed grasping portions 822 while pulling the filter cartridge 820 from the filter holder 848 so that the lock buttons 824 are released from the openings 852. After the filter cartridge 820 is released from the filter holder 848, it may be slid off the transfer tube 854 and a new filter cartridge may be inserted in place of the cartridge that was removed.

Figure 68:
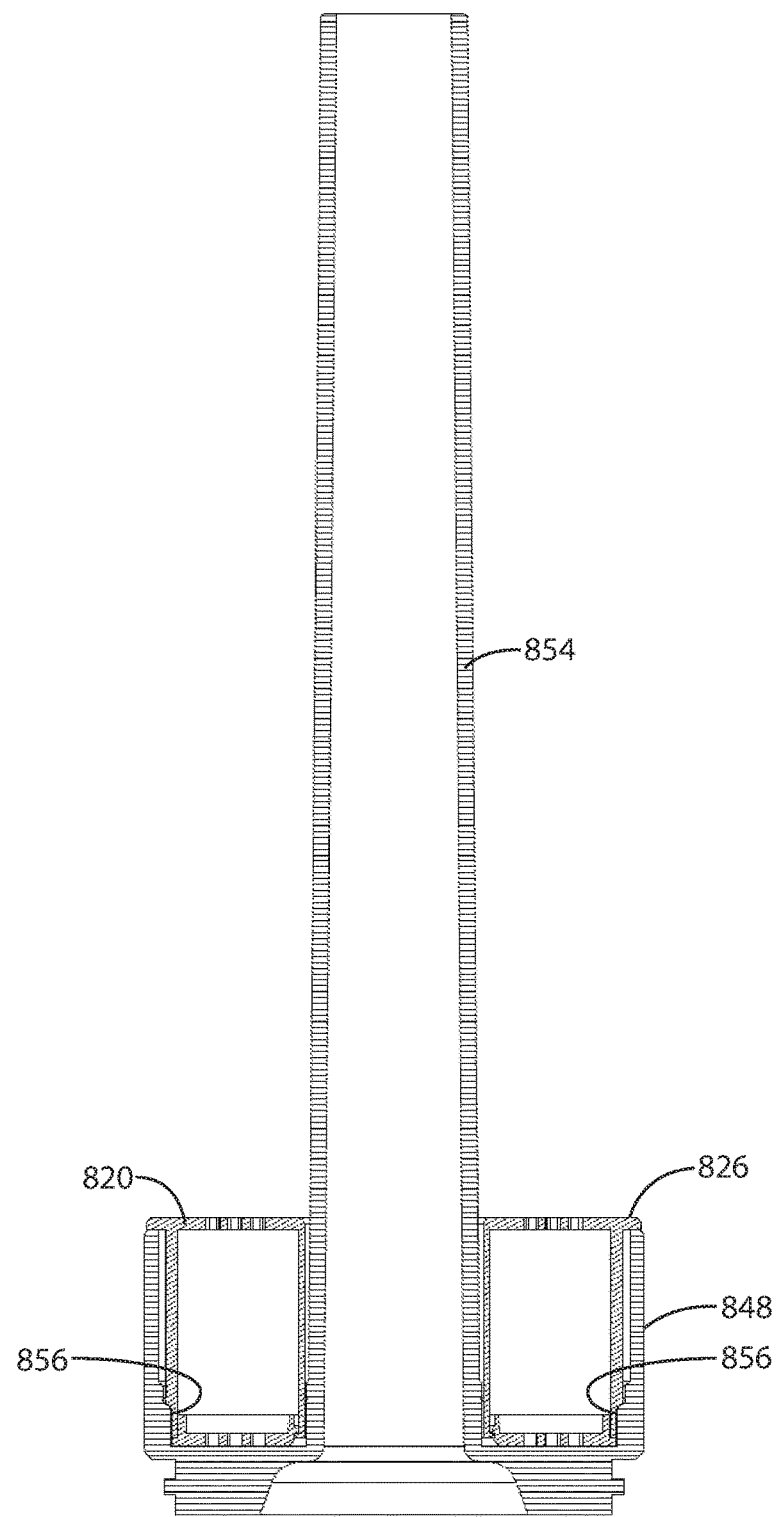
FIG. 68 is a vertical cross-sectional view of the transfer tube and filter holder taken perpendicular to the view of FIG. 67 showing alignment tabs.

FIG. 68 shows projections 856 that are on the lower portion of the interior wall of the filter holder 848. The projections 856 fit into the notches 830 in the filter cartridge 820. The filter holder 848 extends to the flange 826 of the filter cartridge 820 about the circumference of the filter cartridge 820 except where the recesses 850 are provided to accept the ribbed gripping portions 822.

Figure 69:
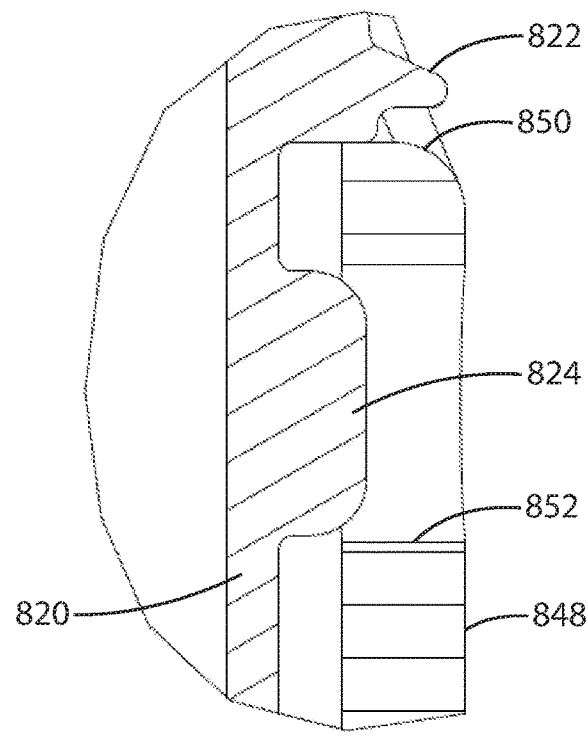
FIG. 69 is an enlarged fragmentary cross section through the locking button of FIG. 67.

FIG. 69 shows the locking button 824 in a position extending into the opening 852 in the filter holder 848. The ribbed grasping portion 822 is disposed in the recess 850. The locking button 824 has rounded corners at the free end that permit the locking button to depress inwardly and deform the wall of the filter cartridge 820 slightly as the filter cartridge 820 is pulled from the holder filter 848. This inward deforming of the filter cartridge wall, possibly coupled with outward deforming of the filter holder wall and inward pressure by the user on the grasping portions 822, results in the release of the filter cartridge 820 from the filter holder 848. The rounded corners of the locking button 824 also facilitate insertion of the filter cartridge 820 into a locked and fully inserted position in the filter holder 848.

Figure 70:
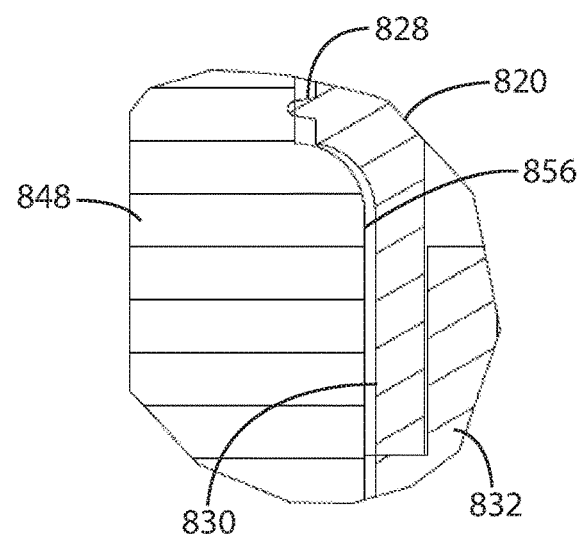
FIG. 70 is an enlarged fragmentary cross section through the alignment tab of FIG. 68.

In FIG. 70, the projection 856 on the interior wall of the filter holder 848 extends into the notch 830 on the filter cartridge 820 when the filter cartridge is aligned in a predetermined position and fully inserted. A filter cartridge that has not been aligned to the predetermined position or that lacks the notches to receive the projections cannot be fully inserted into a fully seated and sealed condition within the holder 848. The grasping portions 822 and lock buttons 824 of the illustrated embodiment are disposed approximately one quarter of the way around the cylindrical filter cartridge from the notches 830 and projections 856. Other arrangements of projections, locking buttons, and/or grasping portions are possible and are within the scope of the present invention. For example, more or fewer notches and/or projections may be provided, other shapes and locations of the notches and projections may be provided, more or fewer locking buttons may be provided. One or more of these elements may be eliminated. These and other alignment and engagement features are configured to ensure proper alignment and positioning of the cartridge in the holder and to ensure that a properly sized and constructed filter cartridge is provided, thereby ensuring a fluid tight seal between the filter holder and the filter cartridge. In the absence of a fluid tight seal, unfiltered, and possibly contaminated, beverage could bypass the filter and reach the filtered beverage compartment.

Figure 71:
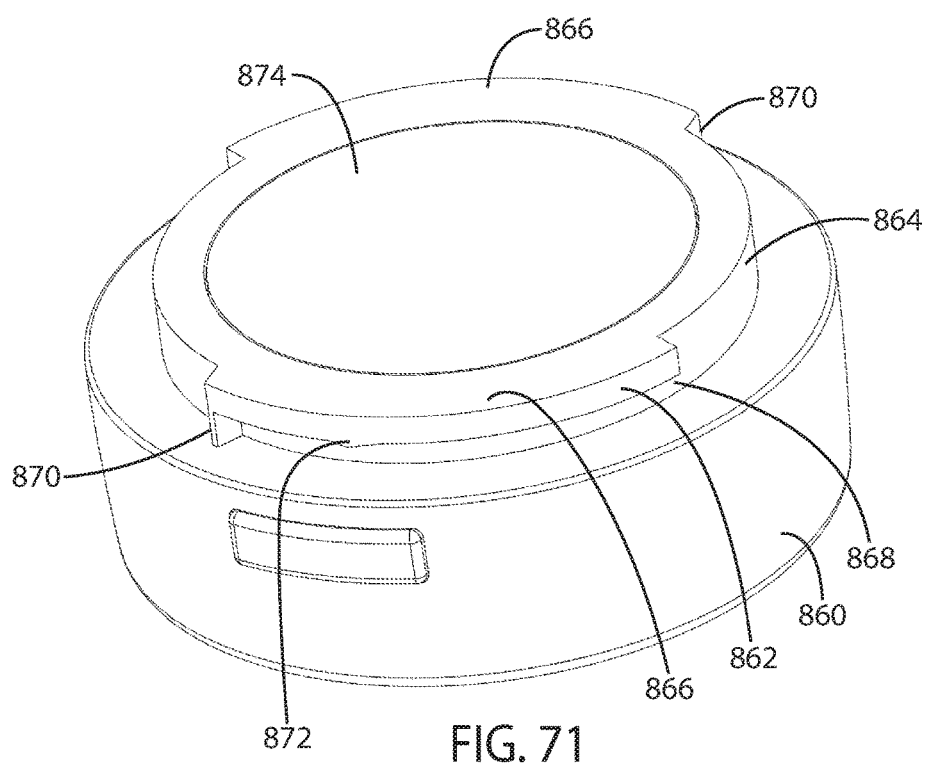
FIG. 71 is a top perspective view of another embodiment of the UV light sterilizer unit.

Turning to FIG. 71, a UV light sterilizer unit 860 is configured to fasten onto a bottom of a bottle body using a locking lug connector 862. The locking lug connector is provided instead of the threaded connector of another embodiment described herein. The lug connector 862 includes a central cylindrical portion 864 from which extends two flanges 866 that project radially outward over a portion of the circumference of the cylindrical portion 864 to define a retaining space 868 below the flanges 866. At the end of the flanges 866 in a first rotational direction is a stop 870. A retaining bump 872 is provided on the underside of each flange 866. A lens 874 through which light is emitted by a UV source within the UV light sterilizer unit 860 is disposed centrally of the cylindrical projection 864.

Figure 72:
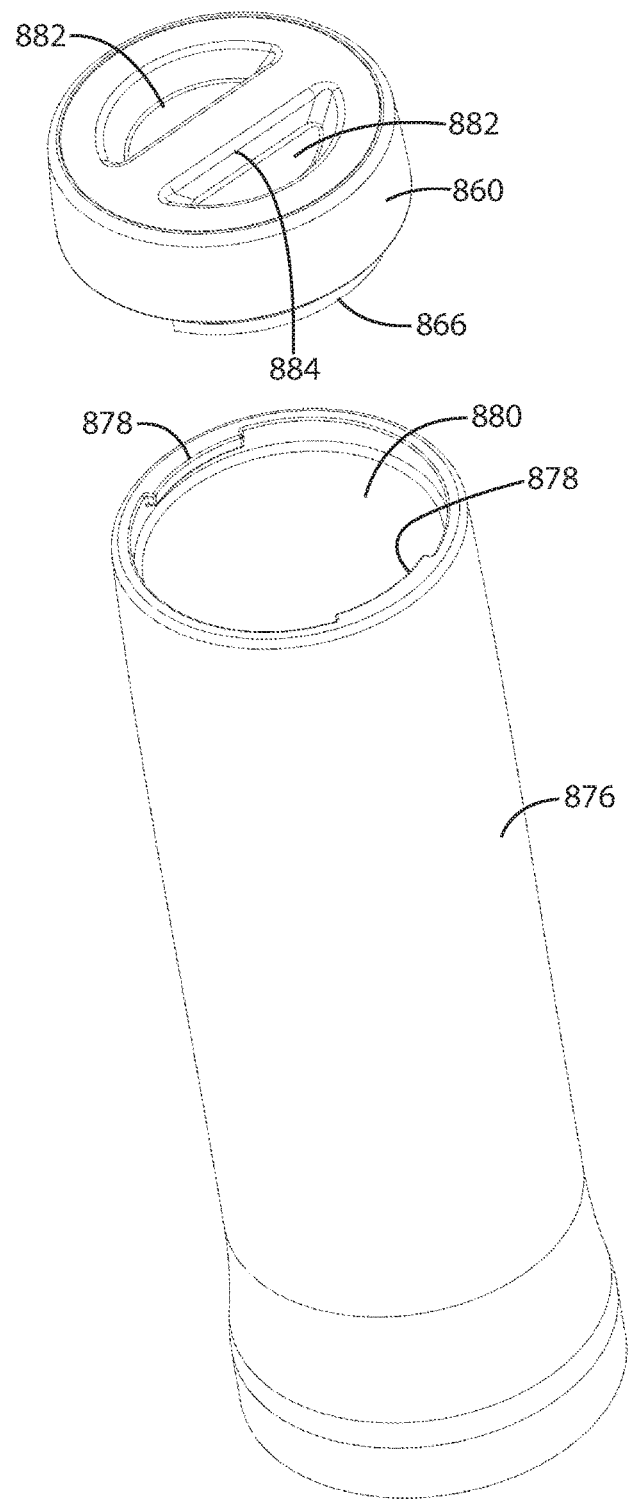
FIG. 72 is a bottom exploded view of the UV light sterilizer unit of FIG. 71 detached from the bottle body.

FIG. 72 shows the UV light sterilizer unit 860 disengaged from a bottle body 876. The bottle body 876 has cooperating lugs 878 extending inwardly from the lower edge of the bottle body 876 over a portion of its circumference. The spaces between the lugs 878 accept the flanges 866 of the UV light sterilizer unit 860 so that the UV light sterilizer unit fits onto the bottom of the bottle body 876. By rotating the UV light sterilizer unit 860 relative to the bottle body 876, the cooperating lugs 878 of the bottle body 876 are moved into the retaining space 868 of the UV light sterilizer unit 860. Continued rotation brings the lugs 878 into contact with the retaining bump 872 and against the stop 870. The UV light sterilizer unit 860 is thereby secured to the bottom of the bottle body 876. UV light emitted through the lens 874 is transmitted through the bottom panel 880 of the bottle body 876 and into the filtered beverage compartment of the bottle body.

Removal of the UV light sterilizer unit 860 from the bottle body 876 is accomplished by a reverse rotation of the UV light sterilizer unit 860 relative to the bottle body 876 to move the lugs 878 out of the retaining space 868 so that the lugs 878 and the flanges 866 clear one another, thereby unfastening the UV light sterilizer unit from the bottle body. Other fastening means for affixing the UV light sterilizer unit to the bottle body are also possible and are within the scope of this disclosure.

The UV light sterilizer unit 860 is rotated for affixing to and removing from the bottle body 876. In certain embodiments, the UV light sterilizer unit has recesses 882 between which is a rotation grip 884 by which the user may grasp the UV light sterilizer unit for an improved grip as the UV light sterilizer unit is moved during affixing and releasing. Other shapes of grip enhancing means are also possible.

Figure 73:
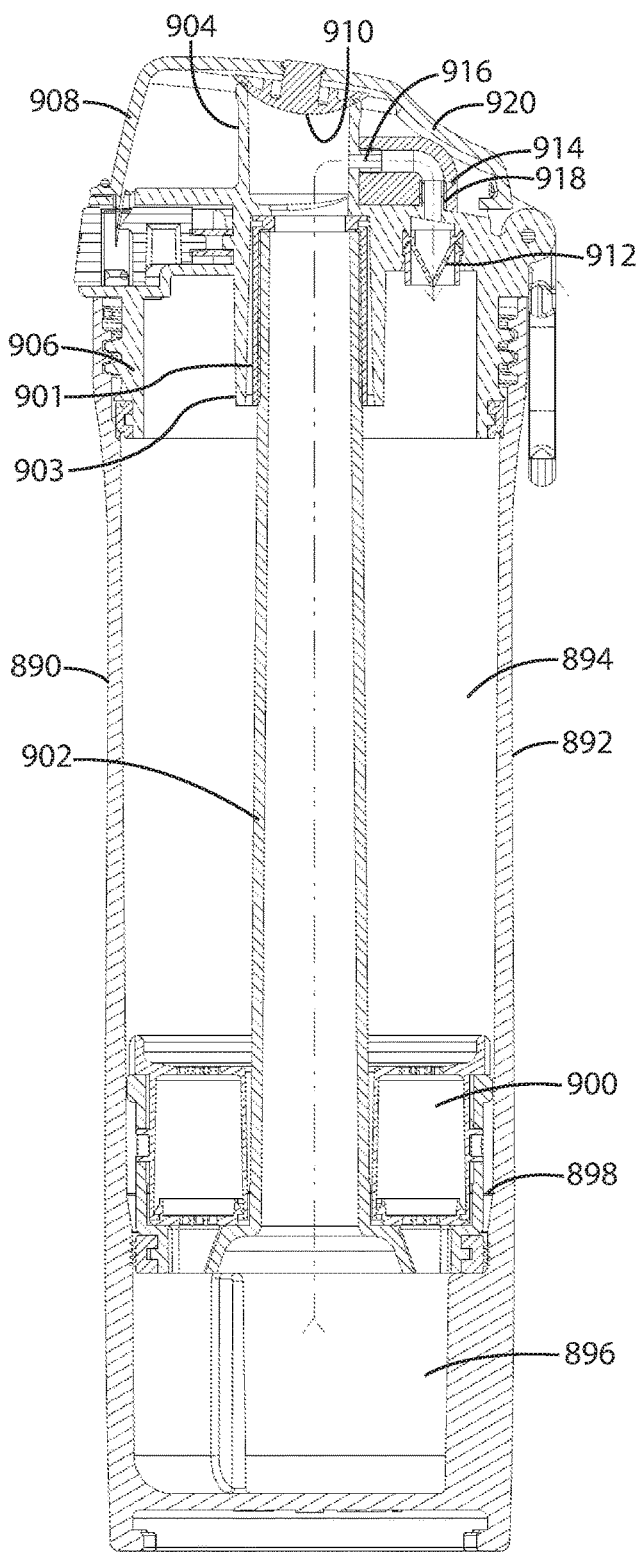
FIG. 73 is a vertical cross-sectional view of an embodiment of the beverage treatment system with an air recirculating channel for balancing any pressure differential that may occur during beverage filtering when the lid cover is closed.

FIG. 73 shows yet another embodiment of a beverage filtering or treatment system 890. The filtering or treatment system 890 includes a bottle body 892 having an unfiltered beverage compartment 894 and a filtered beverage compartment 896 separated by a filter holder 898 containing a filter cartridge 900. A transfer tube 902 extends from the filtered beverage compartment 896 to a nozzle 904 in a lid 906. A lid cover 908 includes a nozzle stopper 910 that engages against the open end of the nozzle 904 to prevent or reduce leakage of the beverage. When the lid cover 908 is open, the unfiltered beverage in the unfiltered beverage compartment 894 passes through the filter cartridge 900 relatively rapidly and air in the filtered beverage compartment that is displaced by the inflowing beverage passes through the transfer tube 902 and out of the bottle 890. Unfiltered beverage in the unfiltered beverage compartment 894 is replaced by air that passes through a vent valve 912 in the lid 906.

In an embodiment such as shown in FIG. 47 and with reference to the part numbers of FIG. 73, when the lid cover 908 is in a closed position and thereby seals the beverage compartments with an air-tight seal so that outside air may not enter or leave the beverage compartments, filtering of the beverage through the filter may result in a pressure differential between the beverage compartments. The pressure differential may be a result of air in the filtered beverage compartment 896 moving slowly or not at all through the filter cartridge 900 in the reverse direction as the beverage in the unfiltered beverage compartment 894 passes through the filter in a filtering direction. The pressure differential may result in a slowing of the beverage filter rate of the beverage. To increase the beverage filter rate, an air recirculating member 914, also termed a bypass tube, is provided connected between the nozzle 904 and the vent valve 912. The air recirculating member 914 is connected to a first air recirculating port 916 on the nozzle 904 and a second air recirculating port 918 on the lid 906 above the vent valve 912. The air recirculating member 914 provides an air recirculating channel for air to flow from the filtered beverage compartment 896, through the transfer tube 902 and through the nozzle 904 to the vent valve 912 and into the unfiltered beverage compartment 894. The flow or recirculating of air through the air recirculating member 914 relieves any air pressure differential that may occur between the unfiltered and filtered beverage compartments so that the beverage may flow at a faster rate through the filter cartridge 900 when the lid cover 908 is closed. The filter rate for embodiments having the air recirculating channel may equal the filtering rate that would occur if the lid cover 908 was open. The vent valve 912 prevents or reduces a reverse flow of air or beverage from the unfiltered beverage compartment 894 to the filtered beverage compartment 896.

The illustrated air recirculating channel is but one embodiment of an air recirculating channel that will permit a higher filtering rate of the beverage with the lid cover closed. The present invention encompasses other embodiments of air bypass or recirculating passages and/or pressure relief means, as will be understood by those of skill in the art. The utilization of the air recirculating channel facilitates rapid filtering of the beverage, even when the lid cover is closed and without increasing the risk of leakage or spilling of the beverage.

FIG. 73 also illustrates a transfer tube gasket 901 disposed over and around a portion of the top end of the transfer tube 902. The transfer tube gasket 901 is configured to provide a seal between the top end of the transfer tube 902 and the sleeve 903 of the lid, when the transfer tube 902 is disposed within the sleeve 903. In certain embodiments, the seal may be a fluid-tight seal such that fluid in the unfiltered beverage container cannot leak out the nozzle 904 when the lid 906 is in place. The transfer tube gasket 901 may be configured to remain on the top end of the transfer tube 902 when the lid 906 is removed from the bottle body 892. The transfer tube gasket 901 may be formed of a soft flexible material to facilitate a liquid tight seal.

Figure 74:
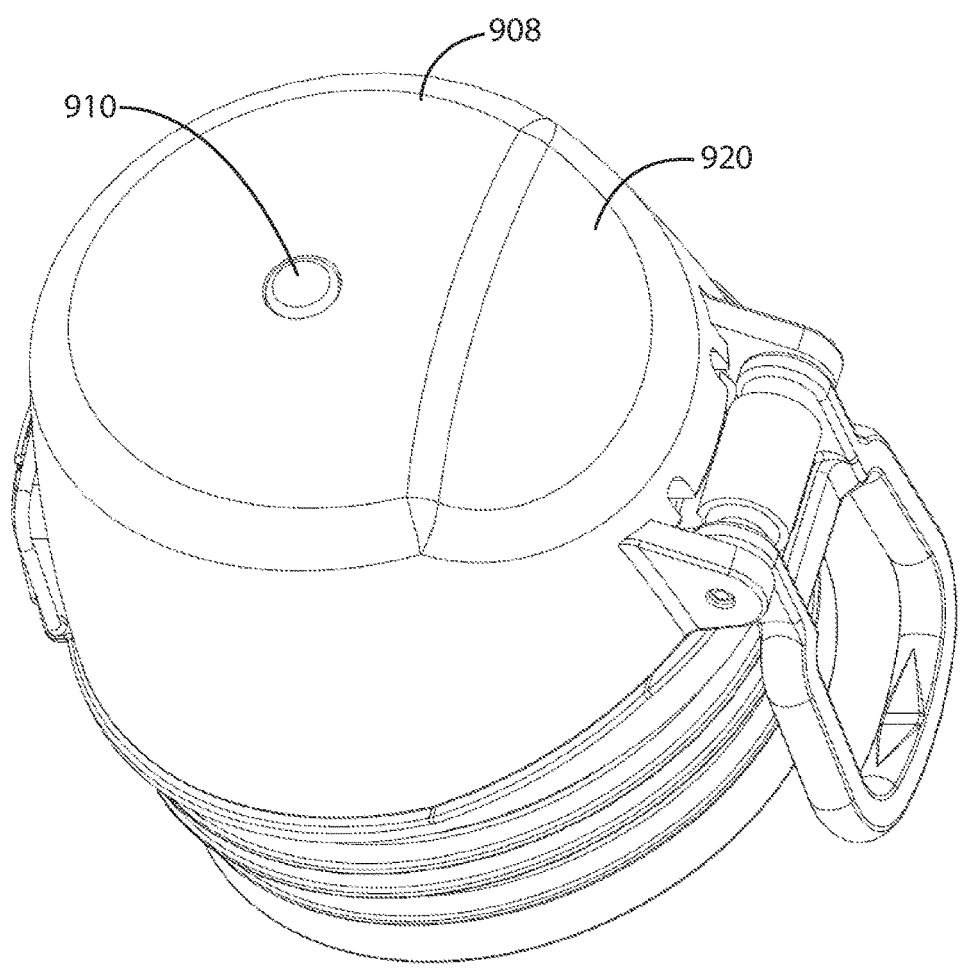
FIG. 74 is a top perspective view of a lid having the air recirculating channel of FIG. 73.

In FIG. 74, the lid cover 908 includes the nozzle stopper 910 that closes the nozzle 904. When compared to the lid cover of FIG. 45, the lid cover 908 of FIG. 74 lacks the recess 644, instead having a sloped surface 920 of a shape to accommodate the air recirculating member or bypass tube 914 when the lid cover 908 is in a closed position. The lid cover 908 has a carry loop, hinge, latch and other features similar to the embodiments described elsewhere in this specification, which will not be described in further detail here.

Figure 75:
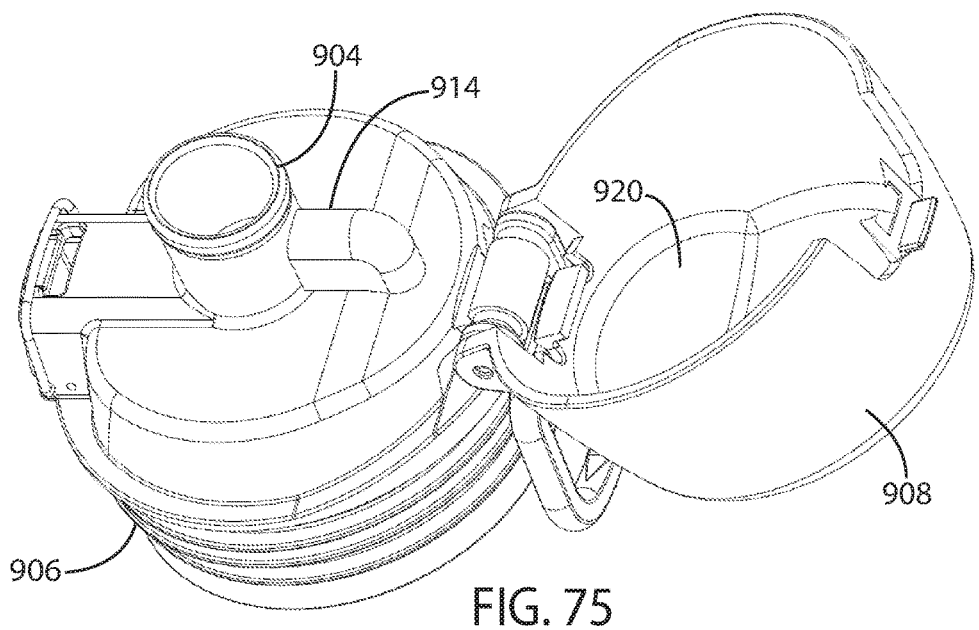
FIG. 75 is a top perspective view of the lid of FIG. 74 shown with the lid cover in an open position.

FIG. 75 shows the lid 906 of FIG. 73 with the lid cover 908 in an open position to reveal the nozzle 904. The bypass tube 914 is provided connected to the nozzle 904 and to the lid 906 in a position that is out of the way of a user drinking from the nozzle 904.

Figure 76:
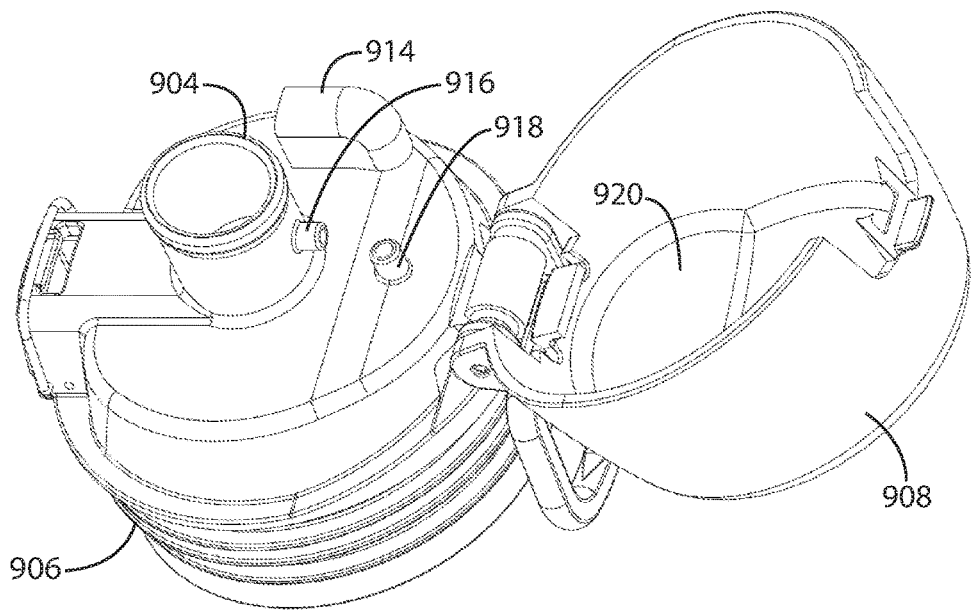
FIG. 76 is a top perspective view of the lid of FIG. 75 with an air recirculating member disconnected from air recirculating ports of the lid.

Referring to FIG. 76, the bypass tube 914 is shown removed from the nozzle 904 and the lid 906 to reveal the air recirculating ports 916 and 918. The air recirculating ports 916 and 918 may include tubular connectors that extend into openings in the air recirculating member 914.

The air recirculating member or bypass tube 914 ordinarily remains affixed to the nozzle and lid but may be removed for cleaning, for example.

The lids shown herein are preferably used with bottle bodies having filtering capabilities so that water or other liquids or beverages are filtered or treated within the bottle body and the filtered or treated liquids are drunk from the bottle through the nozzle or are dispensed from the bottle body. However, the lids and their various features and components may be used with bottle bodies or other containers that need not include filter or treatment elements. Likewise, features, constructions, components, aspects and functions of the lids, bottles, filter holders, seals, gaskets or other elements disclosed herein may be provided interchangeably with other such features, constructions, components, aspects and functions disclosed herein as well as being provided on bottles, lids, containers or the like in general.

Thus, there has been shown and described a beverage filtering or treatment system by which a user may add an unfiltered beverage or untreated beverage quickly and easily and, after at least some of the beverage passes through the filter element or treatment element, the user may drink filtered or treated beverage from the bottle. The user need not attempt to suck the beverage through the filter element while drinking, the filtered beverage simply pours out uninhibited by the filter. The filtered or treated beverage may be drunk directly from the nozzle or other opening, or may be poured into a glass, cup or other vessel. The beverage filter element is easily changed by the user. The central location of the drinking tube avoids the user having to orient the bottle in a certain way to drink the filtered beverage. The same motion for drinking is applied to the bottle no matter what the rotational orientation of the bottle.

The embodiments of the present disclosure encompass a gravity fed beverage filtering or treatment system that positions a column of beverage over a beverage filter or treatment element within the bottle and permits a user to drink from a filtered or treated beverage compartment below the filter or treatment element. The centrally disposed transfer tube of the illustrated embodiments is but one means by which the filtered or treated beverage may be obtained from the filtered or treated beverage compartment. Other means for obtaining the beverage from the filtered or treated beverage compartment are within the scope of the disclosure.

Although other modifications and changes may be suggested by those skilled in the art, it is the intention of the inventors to embody within the patent warranted hereon all changes and modifications as reasonably and properly come within the scope of their contribution to the art.

I claim:

1. A beverage bottle system, comprising:
    a bottle body defining a beverage compartment within the bottle body and a body mouth;
    a filter disposed in the beverage compartment of the bottle body thereby separating the beverage compartment into a filtered beverage compartment and an unfiltered beverage compartment;
    a transfer tube extending from the filtered beverage compartment approximately to the body mouth, the transfer tube passing through the unfiltered beverage compartment without being in fluid communication with the unfiltered beverage compartment; and
    a lid removably fastenable onto the bottle body and configured to cover the body mouth, the lid including a drinking opening defined by a drinking edge, the drinking opening being in fluid communication with the filtered beverage compartment via the transfer tube so that filtered beverage from the filtered beverage compartment may flow from the filtered beverage compartment and out of the drinking opening through the transfer tube when the lid is fastened onto the bottle body;
    the transfer tube has a first end and a second end, the first end being disposed within the bottle body and the second end being configured in fluid communication with the drinking opening when the lid is fastened onto the bottle body; and,
    a filter holder connected to the first end of the transfer tube, the filter holder being configured to position the filter in the bottle body so that the filter and filter holder separate the beverage compartment of the bottle body into the filtered beverage compartment and the unfiltered beverage compartment.

2. A beverage bottle system as claimed in claim 1, wherein the filter holder is affixed to and encircles the first end of the transfer tube, and wherein the filter defines an opening through which the transfer tube extends when the filter is mounted in the filter holder.

3. A beverage bottle system as claimed in claim 2, wherein the filter includes a unitary body of filter material defining a central opening through which extends the transfer tube when the filter is mounted in the filter holder.

4. A beverage bottle system as claimed in claim 2, further comprising:
    a filter cartridge removably disposed in the filter holder, the filter cartridge including filter media configured to filter a beverage as the beverage passes through the filter media from the unfiltered beverage compartment to the filtered beverage compartment.

5. A beverage bottle system as claimed in claim 4, wherein the filter cartridge includes a cartridge body and a filter cover, the filter cover being fastenable onto the cartridge body to enclose a filter media in a filter space within the cartridge body.

6. A beverage bottle system as claimed in claim 5, wherein the cartridge body includes an inner substantially cylindrical wall and an outer substantially cylindrical wall disposed to be substantially coaxial with the inner substantially cylindrical wall, the cartridge body including a first perforate wall extending between the inner and outer substantially cylindrical walls, and wherein the filter cover includes a second perforate wall.

7. A beverage bottle system as claimed in claim 6, wherein the cartridge body comprises:
    a first lip extending between the outer substantially cylindrical wall and the filter holder, and
    a second lip extending between the inner substantially cylindrical wall and the transfer tube.

8. A beverage bottle system as claimed in claim 6, wherein the transfer tube includes a step configured to receive the inner substantially cylindrical wall of the cartridge body, and wherein the filter housing includes a step configured to receive the outer substantially cylindrical wall of the cartridge body.

9. A beverage bottle system as claimed in claim 4, wherein the filter cartridge includes an outer wall, and wherein the filter holder defines recesses in the filter holder that expose portions of the outer wall of the filter cartridge, the exposed portions of the outer wall of the filter cartridge comprising grip portions of the filter cartridge that are configured for gripping by a user during removal of the filter cartridge from the filter holder.

10. A beverage bottle system as claimed in claim 1, wherein the bottle body includes a removable bottle body component defining an interior space that includes the filtered beverage compartment.

11. A beverage bottle system as claimed in claim 1, further comprising:
a support element located within the beverage compartment of the bottle body, the support element configured to receive a filter holder to support the filter holder in a predetermined position in the bottle body.

12. A beverage bottle system as claimed in claim 11, wherein the support element includes at least one support projection extending inwardly from a wall of the bottle body to define a surface against which the filter holder is disposed.

13. A beverage bottle system as claimed in claim 12, wherein the at least one support projection includes a fin extending from a bottom of the filtered beverage compartment.

14. A beverage bottle system as claimed in claim 1, further comprising:
a sleeve connected in fluid communication with the drinking opening, the sleeve being configured to receive the second end of the transfer tube when the lid is fastened to the bottle body.

15. A beverage bottle system as claimed in claim 14, further comprising:
a gasket disposed within the sleeve, the sleeve being configured for sealing engagement with the second end of the transfer tube.

16. A beverage bottle system as claimed in claim 1, further comprising:
a vent valve disposed at a vent opening in the lid, the vent valve being structured to permit air to flow into the beverage compartment of the bottle body but block liquid from exiting the beverage compartment of the bottle body via the vent valve.

17. A beverage bottle system as claimed in claim 16, wherein the vent valve is an umbrella valve including a central stem connected in the vent opening so as to define air flow openings between the central stem and the lid, the umbrella valve including an umbrella membrane extending from the central stem and into contact with the lid, the membrane configured to flex to permit air to flow into the beverage compartment of the bottle body but remain sealed to block liquid from flowing from the beverage compartment of the bottle body via the vent opening.

18. A beverage bottle system as claimed in claim 16, wherein the vent valve includes at least one leaf member in sealing contact with a sealing surface to inhibit liquid from flowing out of the beverage compartment of the bottle body via the vent opening, the at least one leaf member configured to flex and move out of sealing contact to provide an air inlet to the beverage compartment of the bottle body when an air pressure within the bottle body falls below an outside air pressure.

19. A beverage bottle system as claimed in claim 24, wherein the at least one leaf member includes first and second leaf elements in sealing contact with one another at the sealing surface, the first and second leaf elements configured to flex and move out of sealing contact with one another to provide an air inlet to the beverage compartment of the bottle body when an air pressure within the beverage compartment of the bottle body falls below an outside air pressure.

20. A beverage bottle system as claimed in claim 18, further comprising: a retaining ring holding the at least one leaf member in the lid.

21. A beverage bottle system as claimed in claim 1, wherein the transfer tube includes at least one vent tube extending substantially along a length of the transfer tube and configured to form an air passageway.

22. A beverage bottle system as claimed in claim 1, further comprising:
a gasket in sealing engagement between the transfer tube and the lid and configured to substantially prevent unfiltered beverage within the unfiltered beverage compartment from contact with filtered beverage passing through the transfer tube and into the nozzle.

23. A beverage bottle system as claimed in claim 1, wherein the bottle body is a vacuum insulated bottle body having a double wall construction.

24. A beverage bottle system as claimed in claim 1, wherein the bottle body is substantially cylindrical, and wherein the transfer tube is disposed substantially along a longitudinal axis of the substantially cylindrical bottle body.

25. A beverage bottle system as claimed in claim 24, wherein the drinking opening is offset from the axis of the bottle body.

26. A beverage bottle system as claimed in claim 1, further comprising:
a UV light sterilizer unit configured for attachment to the bottle body and operable to emit UV light into the filtered beverage compartment of the bottle body.

27. A beverage bottle system as claimed in claim 1, further comprising:
an air recirculating channel structured to provide an air passageway between the filtered beverage compartment and the unfiltered beverage compartment.

28. A beverage bottle system as claimed in claim 27, wherein the lid defines a vent opening to the beverage compartment, and wherein the air recirculating channel is connected in fluid communication with the transfer tube and the vent opening, and further comprising:
a vent valve in fluid communication with the air recirculating channel, the vent valve being structured to permit air to flow from the filtered beverage compartment to the unfiltered beverage compartment and to block fluid flow from the unfiltered beverage compartment to the filtered beverage compartment.

29. A beverage bottle system as claimed in claim 1, the filter comprising:
one of a filter element and a filter cartridge having an outer substantially cylindrical wall configured to fit into the filter holder, the one of the filter element and the filter cartridge having an inner substantially cylindrical wall configured to fit around a portion of the transfer tube, the one of the filter element and the filter cartridge including filter media for filtering a beverage flowing therethough.

30. A beverage bottle system as claimed in claim 29, wherein the inner substantially cylindrical wall is substantially coaxial with the outer substantially cylindrical wall.

31. A beverage bottle system as claimed in claim 29, wherein the filter element comprises a biodegradable material.

32. A beverage bottle system as claimed in claim 29, wherein the one of the filter element and the filter cartridge comprises:
first and second perforate walls extending between the inner substantially cylindrical wall and the outer substantially cylindrical wall, the one of the filter element and the filter cartridge defining an interior filter space within which is disposed the filter media.

33. A beverage bottle system as claimed in claim 32, wherein the filter cartridge comprises a biodegradable material.

34. A beverage bottle system as claimed in claim 1, wherein the filter is replaceable.

35. A beverage bottle system, comprising:
a bottle body defining a beverage compartment within the bottle body and a body mouth;
a filter disposed in the beverage compartment of the bottle body thereby separating the beverage compartment into a filtered beverage compartment and an unfiltered beverage compartment;
a transfer tube extending from the filtered beverage compartment approximately to the body mouth, the transfer tube passing through the unfiltered beverage compartment without being in fluid communication with the unfiltered beverage compartment; and
a lid fastenable onto the bottle body and configured to cover the body mouth, the lid including a drinking opening defined by a drinking edge, the drinking opening being in fluid communication with the filtered beverage compartment via the transfer tube so that filtered beverage from the filtered beverage compartment may flow from the filtered beverage compartment and out of the drinking opening through the transfer tube when the lid is fastened onto the bottle body;
the transfer tube has a first end and a second end, the first end being disposed within the bottle body and the second end being configured in fluid communication with the drinking opening when the lid is fastened onto the bottle body; and,
a filter holder connected to the first end of the transfer tube, the filter holder being configured to position the filter in the bottle body so that the filter and filter holder separate the beverage compartment of the bottle body into the filtered beverage compartment and the unfiltered beverage compartment
wherein the filter holder includes an annular outer wall and a plurality of ribs connecting the annular outer wall to the transfer tube.

36. A beverage bottle system as claimed in claim 35, wherein the plurality of ribs includes curved lower edges of the ribs to define a drip zone at a lower end of the filter holder.

37. A beverage bottle system, comprising:
a bottle body defining a beverage compartment within the bottle body and a body mouth;
a filter disposed in the beverage compartment of the bottle body thereby separating the beverage compartment into a filtered beverage compartment and an unfiltered beverage compartment;
a transfer tube extending from the filtered beverage compartment approximately to the body mouth, the transfer tube passing through the unfiltered beverage compartment without being in fluid communication with the unfiltered beverage compartment; and
a lid fastenable onto the bottle body and configured to cover the body mouth, the lid including a drinking opening defined by a drinking edge, the drinking opening being in fluid communication with the filtered beverage compartment via the transfer tube so that filtered beverage from the filtered beverage compartment may flow from the filtered beverage compartment and out of the drinking opening through the transfer tube when the lid is fastened onto the bottle body;
the transfer tube has a first end and a second end, the first end being disposed within the bottle body and the second end being configured in fluid communication with the drinking opening when the lid is fastened onto the bottle body;
a filter holder connected to the first end of the transfer tube, the filter holder being configured to position the filter in the bottle body so that the filter and filter holder separate the beverage compartment of the bottle body into the filtered beverage compartment and the unfiltered beverage compartment and,
a lock operable between the filter holder and the filter cartridge to selectively secure the filter cartridge into the filter holder.

38. A beverage bottle system as claimed in claim 37, wherein the lock is configured to operate at least partially by rotational movement between the filter holder and the filter cartridge.

39. A beverage bottle system as claimed in claim 38, wherein the lock includes a projection extending from the filter cartridge, and an inclined channel in the filter holder for engagement with the projection extending from the filter cartridge.

40. A beverage bottle system, comprising:
a bottle body defining a beverage compartment within the bottle body and a body mouth;
a filter disposed in the beverage compartment of the bottle body thereby separating the beverage compartment into a filtered beverage compartment and an unfiltered beverage compartment;
a transfer tube extending from the filtered beverage compartment approximately to the body mouth, the transfer tube passing through the unfiltered beverage compartment without being in fluid communication with the unfiltered beverage compartment; and
a lid fastenable onto the bottle body and configured to cover the body mouth, the lid including a drinking opening defined by a drinking edge, the drinking opening being in fluid communication with the filtered beverage compartment via the transfer tube so that filtered beverage from the filtered beverage compartment may flow from the filtered beverage compartment and out of the drinking opening through the transfer tube when the lid is fastened onto the bottle body;
the transfer tube has a first end and a second end, the first end being disposed within the bottle body and the second end being configured in fluid communication with the drinking opening when the lid is fastened onto the bottle body;
a filter holder connected to the first end of the transfer tube, the filter holder being configured to position the filter in the bottle body so that the filter and filter holder separate the beverage compartment of the bottle body into the filtered beverage compartment and the unfiltered beverage compartment;
a lid cover pivotally affixed to the lid; and
a latch engagable between the lid and the lid cover to secure the lid cover in a closed position on the lid, the latch being selectively operable to release the lid cover from the closed position.

41. A beverage bottle system as claimed in claim 40, further comprising:
a nozzle stopper disposed within the lid cover and configured to seal the drinking opening when the lid cover is secured in the closed position.

42. A beverage bottle system as claimed in claim 40, further comprising:

an O-ring spring connected between the lid and the lid cover so as to retain the lid cover in a fully open position after the lid cover is moved to an open position.

43. A beverage bottle system as claimed in claim 42, further comprising:
a hinge connecting the lid cover to the lid, the O-ring spring being wrapped at least partially around the hinge when the lid cover is in the closed position.

44. A beverage bottle system as claimed in claim 40, wherein the lid defines a
vent opening to the beverage compartment; and further comprising:
a recess in the lid cover, the recess having a recess floor; and
a vent seal disposed at the recess floor and configured to make sealing contact with the vent opening when the lid cover is in the closed position.

45. A beverage bottle system as claimed in claim 40, further comprising:
a hinge connecting the lid to the lid cover;
a carry loop connected to the hinge, the carry loop including pivot connectors in pivoting contact with one of the lid and the lid cover, the pivot connectors defining a central opening extending axially of the hinge; and
a hinge pin disposed in the central opening.

46. A beverage bottle system as claimed in claim 1, wherein bottle body includes a generally cylindrical body having a supporting surface and a body mouth on opposite ends of the generally cylindrical body, the unfiltered beverage compartment being disposed above the filtered beverage compartment when the bottle body is standing upright with the supporting surface resting on a substantially horizontal surface, wherein the filter is configured to allow beverage within the unfiltered beverage compartment to flow through the filter by force of gravity and into the filtered beverage compartment when the bottle body is standing upright.

47. A beverage bottle system as claimed in claim 1, further comprising:
a gasket mounted on the filter holder and disposed in sealing engagement with an interior surface of the bottle body to form a liquid tight seal between the unfiltered beverage compartment and the filtered beverage compartment.

48. A beverage bottle system, comprising:
a bottle body defining a beverage compartment within the bottle body and a body mouth, the bottle body including a supporting surface;
a filter disposed in the beverage compartment of the bottle body so as to separate the beverage compartment into a filtered beverage compartment and an unfiltered beverage compartment, the unfiltered beverage compartment being disposed above the filtered beverage compartment when the bottle body is supported on the supporting surface, wherein the filter is configured to allow a beverage within the unfiltered beverage compartment to flow by a force of gravity through the filter and into the filtered beverage compartment;
a transfer tube extending from the filtered beverage compartment approximately to the body mouth and configured to provide fluid communication between the filtered beverage compartment and a drinking opening, the transfer tube extending generally from a bottom of the unfiltered beverage compartment to a top of the unfiltered beverage compartment when the bottle body is supported on the supporting surface without being in fluid communication with any beverage in the unfiltered beverage compartment; and
a lid fastenable onto the bottle body, the lid removable from the bottle body, the lid defining the drinking opening, the drinking opening being in fluid communication to the transfer tube so that filtered beverage from the filtered beverage compartment may flow from the filtered beverage compartment, through the transfer tube and out of the drinking opening.

49. A beverage bottle system as claimed in claim 48, wherein the bottle body is substantially cylindrical with the body mouth at a first end and the supporting surface at a second end.

50. A beverage bottle system as claimed in claim 48, wherein the transfer tube extends substantially through a center of the unfiltered beverage compartment.

51. A beverage bottle system, comprising:
a bottle body defining an beverage compartment within the bottle body and a body mouth;
a filter holder disposed in the beverage compartment of the bottle body so as to separate the beverage compartment into a filtered beverage compartment and an unfiltered beverage compartment;
a filter in the filter holder, one of the filter and the filter holder including a projecting lip in contact with the other of the filter and the filter holder so as to form a fluid tight seal between the filter and the filter holder;
a transfer tube extending from the filtered beverage compartment approximately to the body mouth to provide fluid communication with the filtered beverage compartment, the transfer tube passing through the unfiltered beverage compartment without being in fluid communication with the unfiltered beverage compartment; and
a lid removably engaged onto the bottle body, the lid defining a drinking opening, the drinking opening being in fluid communication to the transfer tube so that filtered beverage from the filtered beverage compartment may flow from the filtered beverage compartment through the transfer tube and out of the drinking opening.

52. A beverage bottle system as claimed in claim 51, wherein the filter comprises: a filter cartridge configured to be held by the filter holder and defining an interior space; and a filter media disposed in the interior space of the filter cartridge.

53. A beverage bottle system as claimed in claim 51, wherein the filter comprises a cylindrical outer wall in contact with the filter holder, and a cylindrical inner wall defining an opening through which extends the transfer tube.

* * * * *